US011402950B2

(12) United States Patent
Khajeh et al.

(10) Patent No.: US 11,402,950 B2
(45) Date of Patent: Aug. 2, 2022

(54) METHODOLOGY AND APPLICATION OF ACOUSTIC TOUCH DETECTION

(71) Applicant: Apple Inc., Cupertino, CA (US)

(72) Inventors: Ehsan Khajeh, San Jose, CA (US); Mohammad Yeke Yazdandoost, San Jose, CA (US); Giovanni Gozzini, Berkeley, CA (US); Brian Michael King, Saratoga, CA (US); Marduke Yousefpor, San Jose, CA (US); Marcus Yip, San Carlos, CA (US); Aaron Scott Tucker, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 822 days.

(21) Appl. No.: 15/663,588

(22) Filed: Jul. 28, 2017

(65) Prior Publication Data

US 2018/0032211 A1   Feb. 1, 2018

Related U.S. Application Data

(60) Provisional application No. 62/398,651, filed on Sep. 23, 2016, provisional application No. 62/399,227, (Continued)

(51) Int. Cl.
*G06F 3/043* (2006.01)
*G06F 1/3231* (2019.01)
(Continued)

(52) U.S. Cl.
CPC .......... *G06F 3/0436* (2013.01); *G06F 1/1694* (2013.01); *G06F 1/1698* (2013.01);
(Continued)

(58) Field of Classification Search
None
See application file for complete search history.

(56) References Cited

U.S. PATENT DOCUMENTS

| 3,673,327 A | 6/1972 | Johnson |
| 4,506,354 A | 3/1985 | Hansen |

(Continued)

FOREIGN PATENT DOCUMENTS

| EP | 2 385 446 A1 | 11/2011 |
| EP | 2 725 459 A2 | 4/2014 |

(Continued)

OTHER PUBLICATIONS

Lee, S.K et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — William Boddie
*Assistant Examiner* — Alecia D English
(74) *Attorney, Agent, or Firm* — Kubota & Basol LLP

(57) ABSTRACT

Acoustic touch detection (touch sensing) system architectures and methods can be used to detect an object touching a surface. Position of an object touching a surface can be determined using time-of-flight (TOF) bounding box techniques, or acoustic image reconstruction techniques, for example. Acoustic touch sensing can utilize transducers, such as piezoelectric transducers, to transmit ultrasonic waves along a surface and/or through the thickness of an electronic device. Location of the object can be determined, for example, based on the amount of time elapsing between the transmission of the wave and the detection of the reflected wave. An object in contact with the surface can interact with the transmitted wave causing attenuation, redirection and/or reflection of at least a portion of the transmitted wave. Portions of the transmitted wave energy after interaction with the object can be measured to determine the touch location of the object on the surface of the device.

18 Claims, 42 Drawing Sheets

Related U.S. Application Data filed on Sep. 23, 2016, provisional application No. 62/368,984, filed on Jul. 29, 2016, provisional application No. 62/368,998, filed on Jul. 29, 2016, provisional application No. 62/368,873, filed on Jul. 29, 2016.

(51) Int. Cl.

| | | |
|---|---|---|
| *G06F 1/16* | (2006.01) | |
| *G06F 1/3234* | (2019.01) | |
| *G06F 3/041* | (2006.01) | |
| *H01Q 1/00* | (2006.01) | |
| *H01Q 1/52* | (2006.01) | |
| *H01Q 7/00* | (2006.01) | |

(52) U.S. Cl.
CPC ............ *G06F 1/325* (2013.01); *G06F 1/3231* (2013.01); *G06F 1/3262* (2013.01); *G06F 3/0433* (2013.01); *G06F 3/04186* (2019.05); *H01Q 1/002* (2013.01); *H01Q 1/52* (2013.01); *H01Q 7/005* (2013.01); *G06F 2200/1637* (2013.01); *G06F 2203/04104* (2013.01); *G06F 2203/04106* (2013.01); *Y02D 10/00* (2018.01)

(56) References Cited

U.S. PATENT DOCUMENTS

| | | | |
|---|---|---|---|
| 4,746,914 | A | 5/1988 | Adler |
| 4,825,212 | A | 4/1989 | Adler |
| 5,177,327 | A | 1/1993 | Knowles |
| 5,483,261 | A | 1/1996 | Yasutake |
| 5,488,204 | A | 1/1996 | Mead et al. |
| 5,591,945 | A | 1/1997 | Kent |
| 5,766,493 | A | 6/1998 | Shin |
| 5,816,225 | A | 10/1998 | Koch et al. |
| 5,825,352 | A | 10/1998 | Bisset et al. |
| 5,835,079 | A | 11/1998 | Shieh |
| 5,854,450 | A | 12/1998 | Kent |
| 5,880,411 | A | 3/1999 | Gillespie et al. |
| 6,078,315 | A | 6/2000 | Huang |
| 6,091,406 | A | 7/2000 | Kambara |
| 6,188,391 | B1 | 2/2001 | Seely et al. |
| 6,225,985 | B1 | 5/2001 | Armstrong |
| 6,229,529 | B1 | 5/2001 | Yano |
| 6,310,610 | B1 | 10/2001 | Beaton et al. |
| 6,323,846 | B1 | 11/2001 | Westerman et al. |
| 6,327,011 | B2 | 12/2001 | Kim |
| 6,690,387 | B2 | 2/2004 | Zimmerman et al. |
| 6,856,259 | B1 | 2/2005 | Sharp |
| 7,015,894 | B2 | 3/2006 | Morohoshi |
| 7,079,118 | B2 | 7/2006 | Benard |
| 7,098,891 | B1 | 8/2006 | Pryor |
| 7,184,064 | B2 | 2/2007 | Zimmerman et al. |
| 7,324,096 | B2 | 1/2008 | Nakazawa et al. |
| 7,489,308 | B2 | 2/2009 | Blake |
| 7,499,039 | B2 | 3/2009 | Roberts |
| 7,573,466 | B1 | 8/2009 | Marzen |
| 7,656,393 | B2 | 2/2010 | King et al. |
| 7,663,607 | B2 | 2/2010 | Hotelling et al. |
| 7,800,592 | B2 | 9/2010 | Kerr et al. |
| 7,907,129 | B2 | 3/2011 | Idzik |
| 8,169,404 | B1 | 5/2012 | Boillot |
| 8,479,122 | B2 | 7/2013 | Hotelling et al. |
| 8,743,091 | B2 | 6/2014 | Bernstein |
| 8,970,501 | B2 | 3/2015 | Hotelling et al. |
| 9,008,725 | B2 | 4/2015 | Schmidt |
| 9,262,003 | B2 | 2/2016 | Kitchens et al. |
| 2003/0034439 | A1* | 2/2003 | Reime .................. G06F 3/0421 250/221 |
| 2004/0164970 | A1 | 8/2004 | Benard |
| 2005/0017959 | A1 | 1/2005 | Kraus |
| 2005/0052432 | A1 | 3/2005 | Kraus |
| 2005/0083313 | A1 | 4/2005 | Hardie-bick |
| 2005/0219228 | A1 | 10/2005 | Alameh et al. |
| 2005/0248548 | A1 | 11/2005 | Tsumura |
| 2006/0125804 | A1 | 6/2006 | Kent |
| 2006/0197753 | A1 | 9/2006 | Hotelling |
| 2007/0211031 | A1 | 9/2007 | Marc |
| 2007/0240913 | A1 | 10/2007 | Schermerhorn |
| 2008/0059761 | A1 | 3/2008 | Norman |
| 2008/0114251 | A1 | 5/2008 | Weymer |
| 2008/0266266 | A1 | 10/2008 | Kent |
| 2010/0026656 | A1 | 2/2010 | Hotelling et al. |
| 2010/0026667 | A1 | 2/2010 | Bernstein |
| 2011/0148798 | A1 | 6/2011 | Dahl |
| 2012/0178503 | A1 | 7/2012 | Merz et al. |
| 2012/0274610 | A1 | 11/2012 | Dahl |
| 2013/0154955 | A1 | 6/2013 | Guard |
| 2014/0104196 | A1 | 4/2014 | Haungs et al. |
| 2014/0204059 | A1 | 7/2014 | Geaghan |
| 2014/0362055 | A1 | 12/2014 | Altekar et al. |
| 2015/0097468 | A1 | 4/2015 | Hajati et al. |
| 2015/0249819 | A1 | 9/2015 | Jiang |
| 2015/0303568 | A1 | 10/2015 | Yarga et al. |
| 2016/0357279 | A1* | 12/2016 | Choi ...................... G06F 3/043 |

FOREIGN PATENT DOCUMENTS

| | | |
|---|---|---|
| JP | 2000-163031 A | 6/2000 |
| JP | 2002-342033 A | 11/2002 |
| WO | 2005103872 A2 | 11/2005 |
| WO | WO-2011/058528 A1 | 5/2011 |
| WO | WO-2013/132244 A1 | 9/2013 |
| WO | WO-2018/023080 A2 | 2/2018 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Jan. 29, 2018, for PCT Application No. PCT/US2017/044533, filed Jul. 28, 2017, nine pages.

International Preliminary Report on Patentability received for PCT Patent Application No. PCT/US2017/044533, dated Feb. 7, 2019, 16 pages.

Final Office Action dated Feb. 20, 2013, for U.S. Appl. No. 12/184,232, filed Jul. 31, 2008, 24 pages.

Final Office Action dated Aug. 27, 2013, for U.S. Appl. No. 12/184,232, filed Jul. 31, 2008, 25 pages.

Non-Final Office Action dated Nov. 18, 2011, for U.S. Appl. No. 12/184,232, filed Jul. 31, 2008, 21 pages.

Non-Final Office Action dated Jul. 25, 2012, for U.S. Appl. No. 12/184,232, filed Jul. 31, 2008, 18 pages.

Notice of Allowance dated Mar. 14, 2014, for U.S. Appl. No. 12/184,232, filed Jul. 31, 2008, eight pages.

\* cited by examiner

TIME

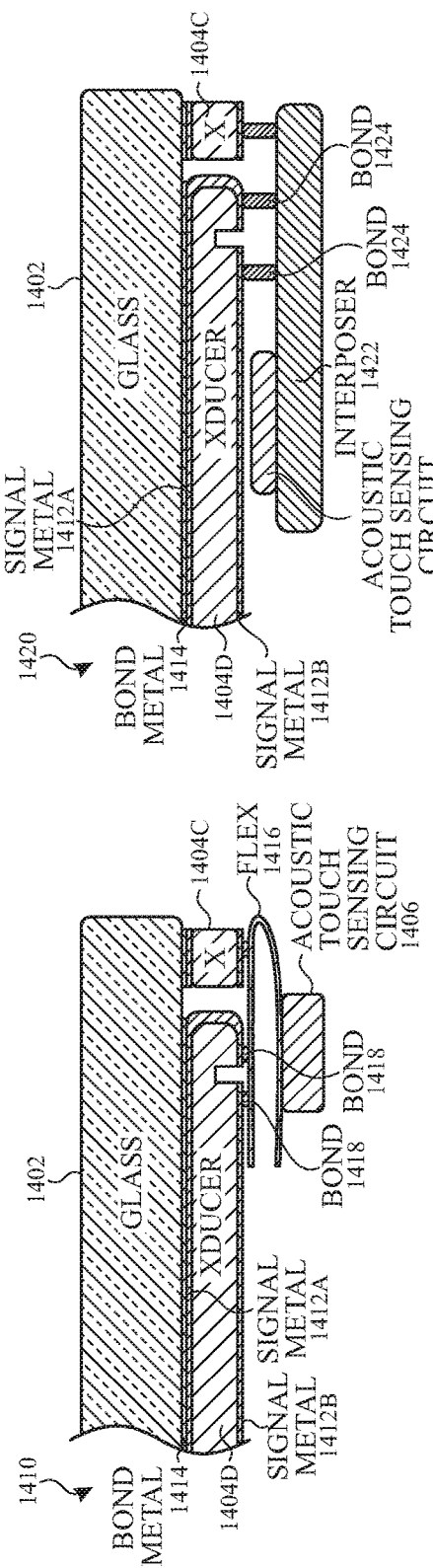
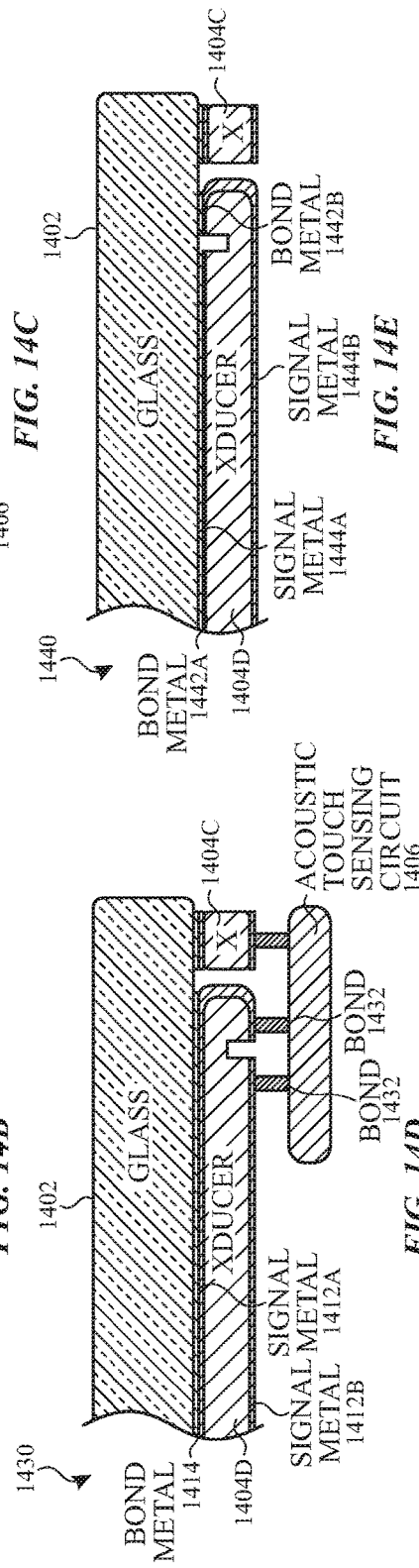
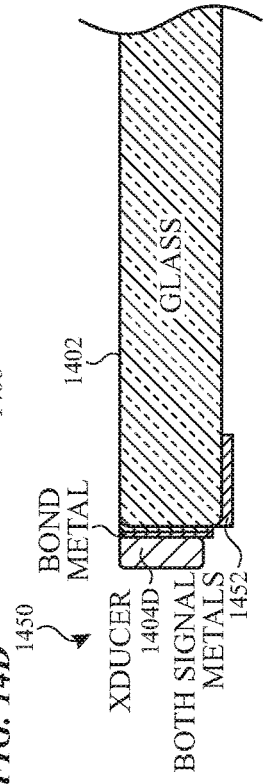

METHODOLOGY AND APPLICATION OF ACOUSTIC TOUCH DETECTION

CROSS REFERENCE TO RELATED APPLICATIONS

This application claims the benefit under 35 U.S.C. § 119(e) of U.S. Provisional Patent Application No. 62/368,998, filed Jul. 29, 2016, and claims benefit to U.S. Provisional Patent Application No. 62/368,984, filed Jul. 29, 2016, and claims benefit to U.S. Provisional Patent Application No. 62/368,873, filed Jul. 29, 2016, and claims benefit to U.S. Provisional Patent Application No. 62/399,227, filed Sep. 23, 2016, and claims benefit to U.S. Provisional Patent Application No. 62/398,651, filed Sep. 23, 2016, the contents of which are incorporated by reference herein in their entireties for all purposes.

FIELD OF THE DISCLOSURE

This relates generally to touch sensing, and more particularly, to various methodologies and applications of acoustic touch detection.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing system, however, can experience reduced performance due to floating objects (e.g., water droplets) in contact with the touch-sensitive surface.

SUMMARY

This relates to system architectures, apparatus and methods for acoustic touch detection (touch sensing) and exemplary applications of the system architectures, apparatus and methods. Position of an object touching a surface can be determined using time-of-flight (TOF) bounding box techniques, acoustic image reconstruction techniques, acoustic tomography techniques, attenuation of reflections from an array of barriers, or a two dimensional piezoelectric receiving array, for example. Acoustic touch sensing can utilize transducers, such as piezoelectric transducers, to transmit ultrasonic waves along a surface and/or through the thickness of an electronic device. As the wave propagates along the surface, one or more objects (e.g., finger, stylus, etc.) in contact with the surface can interact with the transmitted wave causing attenuation, redirection and/or reflection of at least a portion of the transmitted wave. Portions of the transmitted wave energy after interaction with the one or more objects can be measured to determine the touch location(s) of the one or more objects on the surface of the device. For example, one or more transducers (e.g., acoustic transducers) coupled to a surface of a device can be configured to transmit an acoustic wave along the surface and/or through the thickness of a device and can receive a portion of the wave reflected back when the acoustic wave encounters a finger touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that are likely to become wet or fully submerged in water. The present disclosure also relates to methods and apparatus for optimizing radio frequency (RF) performance using acoustic touch sensing.

BRIEF DESCRIPTION OF THE DRAWINGS

FIGS. 14A-14F illustrate exemplary integration of an acoustic touch sensing circuit and/or one or more processors with transducers mechanically and acoustically coupled to a surface.

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to system architectures, apparatus and methods for acoustic touch detection (touch sensing) and exemplary applications of the system architectures, apparatus and methods. Position of an object touching a surface can be determined using time-of-flight (TOF) bounding box techniques, acoustic image reconstruction techniques, acoustic tomography techniques, attenuation of reflections from an array of barriers, or a two dimensional piezoelectric receiving array, for example. Acoustic touch sensing can utilize transducers, such as piezoelectric transducers, to transmit ultrasonic waves along a surface and/or through the thickness of an electronic device. As the wave propagates along the surface, one or more objects (e.g., finger, stylus, etc.) in contact with the surface can interact with the transmitted wave causing attenuation, redirection and/or reflection of at least a portion of the transmitted wave. Portions of the transmitted wave energy after interaction with the one or more objects can be measured to determine the touch location(s) of the one or more objects on the surface of the device. For example, one or more transducers (e.g., acoustic transducers) coupled to a surface of a device can be configured to transmit an acoustic wave along the surface and/or through the thickness of a device and can receive a portion of the wave reflected back when the acoustic wave encounters a finger touching the surface. The location of the object can be determined, for example, based on the amount of time elapsing between the transmission of the wave and the detection of the reflected wave. Acoustic touch sensing can be used instead of, or in conjunction with, other touch sensing techniques, such as resistive and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that are likely to become wet or fully submerged in water. The present disclosure also relates to methods and apparatus for optimizing radio frequency (RF) performance using acoustic touch sensing.

Figure 1A:
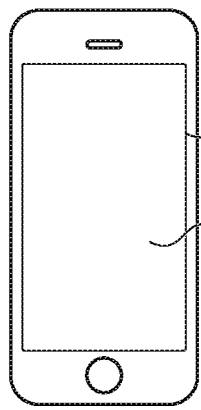
FIGS. 1A-1E illustrate exemplary electronic devices that can include an acoustic touch sensing/system according to examples of the disclosure.
Figure 1B:
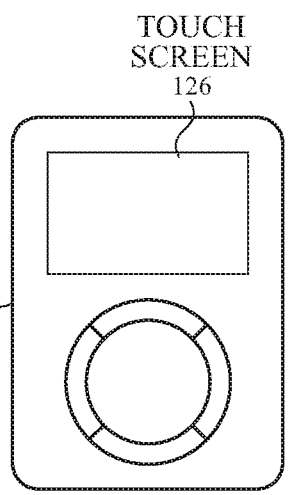
Figure 1C:
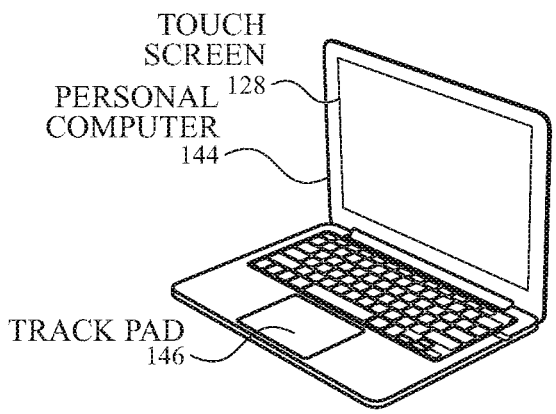
Figure 1D:
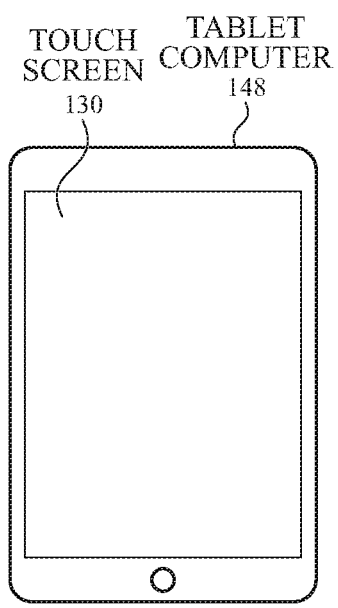
Figure 1E:
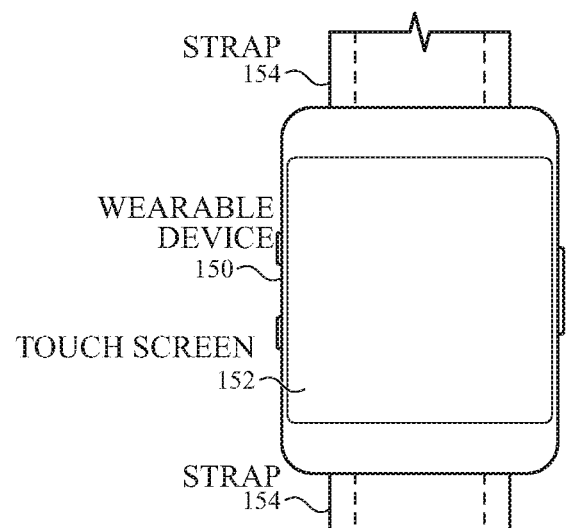

FIGS. 1A-1E illustrate examples of systems with touch screens that can include acoustic sensors for detecting contact between an object (e.g., a finger or stylus) and a surface of the system. FIG. 1A illustrates an exemplary mobile telephone 136 that includes a touch screen 124 and can include an acoustic touch sensing system according to examples of the disclosure. FIG. 1B illustrates an example digital media player 140 that includes a touch screen 126 and can include an acoustic touch sensing system according to examples of the disclosure. FIG. 1C illustrates an example personal computer 144 that includes a touch screen 128 and a track pad 146, and can include an acoustic touch sensing system according to examples of the disclosure. FIG. 1D illustrates an example tablet computing device 148 that includes a touch screen 130 and can include an acoustic touch sensing system according to examples of the disclosure. FIG. 1E illustrates an example wearable device 150 (e.g., a watch) that includes a touch screen 152 and can include an acoustic touch sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch sensing system for detecting contact between an object and a surface of the device. Additionally, although the devices illustrated in FIGS. 1A-1E include touch screens, in some examples, the devices may have a non-touch-sensitive display.

Acoustic sensors can be incorporated in the above described systems to add acoustic touch sensing capabilities to a surface of the system. For example, in some examples, a touch screen (e.g., capacitive, resistive, etc.) can be augmented with acoustic sensors to provide a touch sensing capability for use in wet environments or under conditions where the device may get wet (e.g., exercise, swimming, rain, washing hands). In some examples, an otherwise non-touch sensitive display screen can be augmented with acoustic sensors to provide a touch sensing capability. In such examples, a touch screen can be implemented without the stack-up required for a capacitive touch screen. In some examples, the acoustic sensors can be used to provide touch sensing capability for a non-display surface. For example, the acoustic sensors can be used to provide touch sensing capabilities for a track pad 146, a button, a scroll wheel, part or all of the housing or any other surfaces of the device (e.g., on the front, rear or sides).

Figure 2:
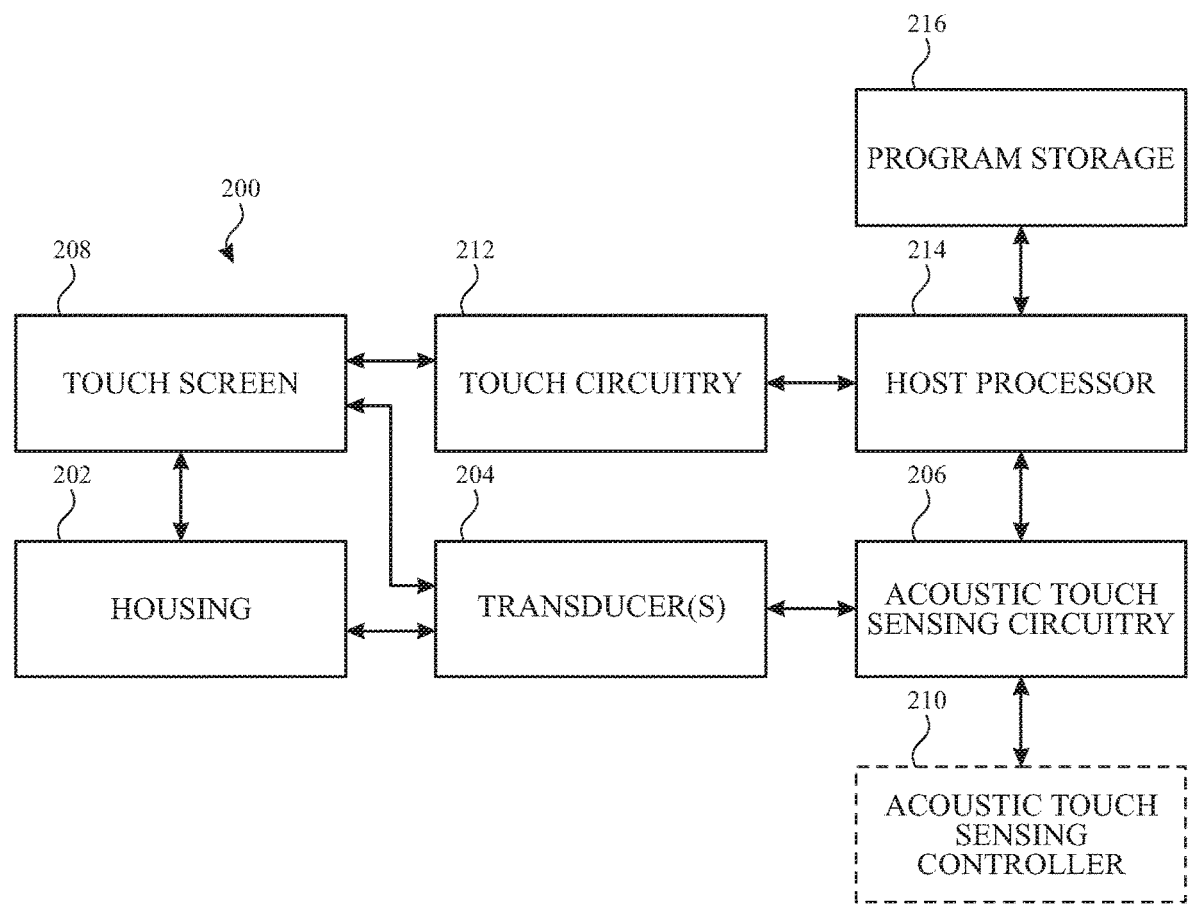
FIG. 2 illustrates an exemplary block diagram of an electronic device including an acoustic touch sensing system according to examples of the disclosure.

FIG. 2 illustrates an exemplary block diagram of an electronic device including an acoustic touch sensing system according to examples of the disclosure. In some examples, housing 202 of device 200 (which can correspond to devices 136, 140, 144, 148, and 150 above) can be coupled with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, the transducers 204 can be formed from a piezoelectric ceramic material (e.g., PZT or KNN) or a piezoelectric plastic material (e.g., PVDF). Similarly, transducers 204 can produce electrical energy as an output when vibrated. In some examples, the transducers 204 can be bonded to the housing 202 by a bonding agent (e.g., a thin layer of stiff epoxy). In some examples, the transducers 204 can be deposited on the surface through processes such as deposition, lithography, or the like. In some examples, the transducers 204 can be bonded to the surface using conductive or non-conductive bonding materials. When electrical energy is applied to the transducers 204 it can cause the transducers to vibrate, the surface material in contact with the transducers can also be caused to vibrate, and the vibrations of the molecules of the surface material can propagate as an acoustic wave through the surface material. In some examples, vibration of the traducers 204 can be used to produce ultrasonic acoustic waves at a selected frequency over a broad frequency range (e.g., 400 kHz-10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can also be partially or completely disposed on (or coupled to) a portion of a touch screen 208. For example, the touch screen 208 (e.g., capacitive) may comprise a glass panel (cover glass), and a display region of the touch screen may be surrounded by a non-display region (e.g., a black border region surrounding the periphery of the display region of touch screen). In some examples, transducers 204 can be disposed partially or completely in the black mask region of the touch screen 208 glass panel (e.g., on the back side of the glass panel behind the black mask) such that the transducers are not visible (or are only partially visible) to a user.

Device 200 can further comprise acoustic touch sensing circuitry 206, which can include circuitry for driving electrical signals to stimulate vibration of the transducers 204 (e.g., transmit circuitry), as well as circuitry for sensing electrical signals output by the transducers (e.g., receive circuitry) when the transducer is stimulated by received acoustic energy. In some examples, timing operations for the acoustic touch sensing circuitry 206 can optionally be provided by a separate acoustic touch sensing controller 210 that can control timing of acoustic touch sensing circuitry 206 operations. In some examples, touch sensing controller 210 can be coupled between acoustic touch sensing circuitry 206 and host processor 214. In some examples, controller functions can be integrated with the acoustic touch sensing circuitry 206 (e.g., on a single integrated circuit). Output data from acoustic touch sensing circuitry 206 can be output to a host processor 214 for further processing to determine a location of an object contacting the device as will be described in more detail below. In some examples, the processing for determining location of a contacting object can be performed by the acoustic touch sensing circuitry 206, controller 210 or a separate sub-processor of device 200 (not shown).

In addition to acoustic touch sensing, the device can include additional touch circuitry 212 and optionally a touch controller (not shown) that can be coupled to the touch screen 208. In examples including a touch controller, the touch controller can be disposed between the touch circuitry 212 and the host processor 214. The touch circuitry 212 can, for example, be capacitive or resistive touch sensing circuitry, and can be used to detect contact and/or hovering of objects (e.g., fingers, styli) in contact with and/or in proximity to the touch screen 208, particularly in the display region of the touch screen. Thus, device 200 can include multiple types of sensing circuitry (e.g., touch circuitry 212 and acoustic touch sensing circuitry 206) for detecting objects (and their positions) in different regions of the device and/or for different purposes, as will be described in more detail below. Although described herein as including a touch screen, it should be understood that touch circuitry 212 can be omitted and touch screen 208 can be replaced by an otherwise non-touch-sensitive display (e.g., but-for the acoustic sensors).

Host processor 214 can receive acoustic or other touch outputs (e.g., capacitive) and perform actions based on the touch outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 and/or acoustic touch sensing circuitry 206 (and, in some examples, their respective controllers) to detect a touch on or near touch screen 208, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by the touch circuitry 212 and/or acoustic touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
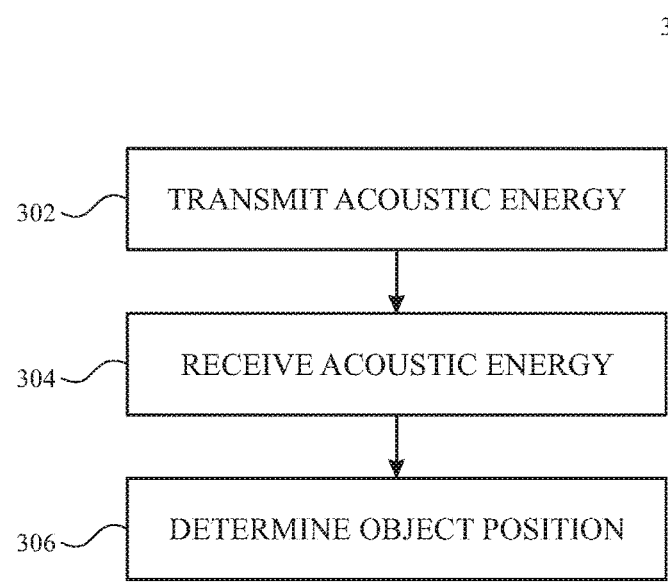
FIG. 3A illustrates an exemplary method for acoustic touch sensing to determine a position of an object in contact with a surface according to examples of the disclosure.

FIG. 3A illustrates an exemplary method 300 for acoustic touch sensing of an object contact position according to examples of the disclosure. At 302, acoustic energy can be transmitted (e.g., by one or more transducers 204) along a surface of a device in the form of an ultrasonic wave, for example. In some examples, the wave can propagate as a compressive wave, a shear horizontal wave, a Rayleigh wave, a Lamb wave, a Love wave, a Stonely wave, or a surface acoustic wave. Other propagation modes for the transmitted acoustic energy can also exist based on the properties of the surface material and the manner of energy transmission from the transducers to the surface of the device. In some examples, the surface can be formed from glass or sapphire crystal (e.g., touch screen 208) or the surface can formed from metal, plastic, or wood (e.g., housing 202). Transmitted energy can propagate along the surface until a discontinuity in the surface is reached, which can cause a portion of the energy to reflect. In some examples, a discontinuity can be an irregularity in the shape of the surface (e.g., a groove or pattern etched into the surface). In some examples, a discontinuity can be a reflective material coupled to the surface (e.g., deposited). In some examples, an object in contact with the surface (e.g., a user's finger) can also be a discontinuity. In some examples, a discontinuity can occur at edges of the surface material (e.g., when the ultrasonic wave propagates to the edge of the surface opposite the transducer). When the transmitted energy reaches one of the discontinuities described above, some of the energy can be reflected, and a portion of the reflected energy can be directed to the one or more transducers 204. In some examples, water or other fluids in contact with the surface of the device (e.g., device 200) will not act as a discontinuity to the acoustic waves, and thus the acoustic touch sensing method can be effective for detecting the presence of an object (e.g., a user's finger) even in the presence of water drops (or other low-viscosity fluids) on the surface of the device or even while the device is fully submerged.

At 304, returning acoustic energy can be received, and the acoustic energy can be converted to an electrical signal by one or more transducers 204. At 306, the acoustic sensing system can determine whether one or more objects is contacting the surface of the device, and can further detect the position of one or more objects based on the received acoustic energy. In some examples, a distance of the object from the transmission source (e.g., transducers 204) can be determined from a time-of-flight between transmission and reception of reflected energy, and a propagation rate of the ultrasonic wave through the material. In some examples, baseline reflected energy from one or more intentionally included discontinuities (e.g., barriers, ridges, grooves, etc.) can be compared to a measured value of reflected energy. The baseline reflected energy can be determined during a measurement when no object (e.g., finger) is in contact with the surface. Timing of measured deviations of the reflected energy from the baseline can be correlated with a location of the object. In some examples, amplitudes along a plurality of arcs of the transmitted and received waves can be recorded and processed to reconstruct an image of amplitude for each location. Although method 300, as described above, generally refers to reflected waves received by the transducers that transmitted the waves, in some examples, the transmitter and receiver functions can be separated such that the transmission of acoustic energy at 302 and receiving acoustic energy at 304 may not occur at the same transducer. Exemplary device configurations and measurement timing examples that can be used to implement method 300 will be described in further detail below.

Figure 3B:
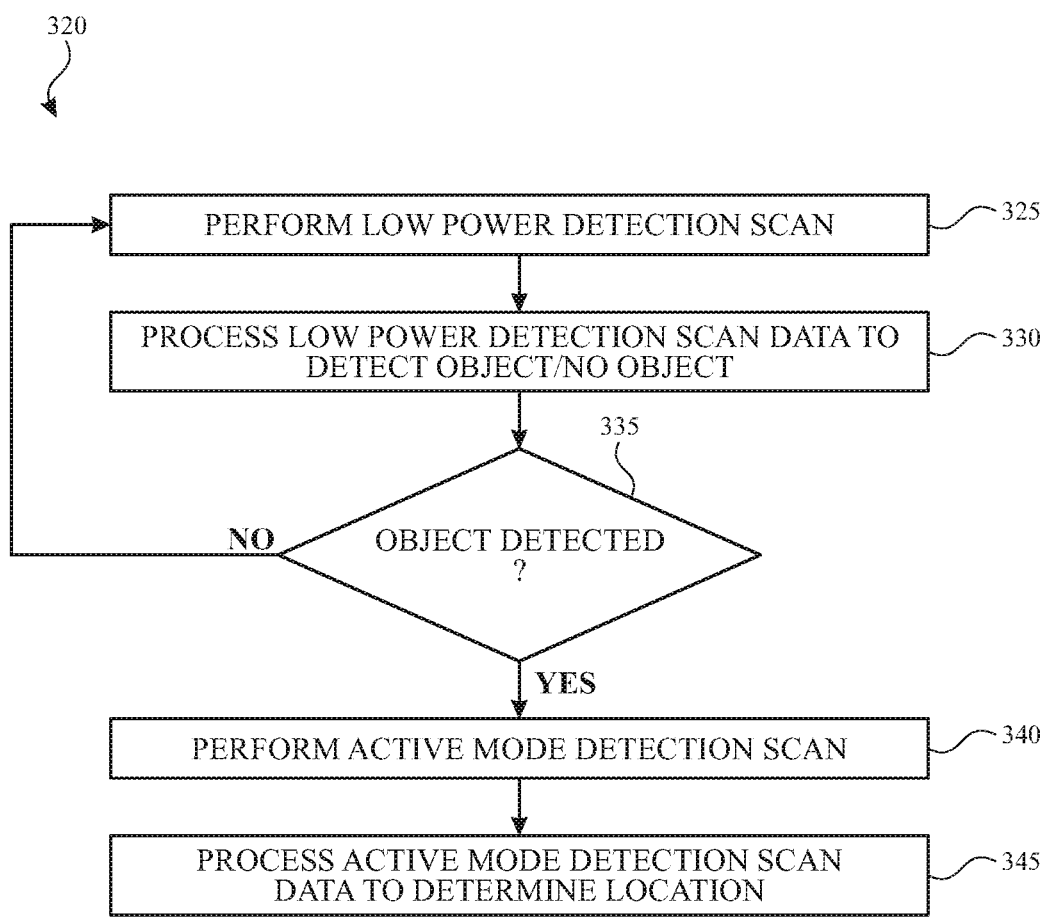
FIG. 3B illustrates an exemplary process for acoustic touch sensing of an object presence and contact position in various modes according to examples of the disclosure.

In some examples, the acoustic touch sensing can be performed differently in different operating modes. For example, the acoustic touch sensing can include a low power mode (e.g., when objects are not detected, when display is turned off) and an active mode (e.g., when an object is detected). FIG. 3B illustrates an exemplary process 320 for acoustic touch sensing of an object presence and contact position in various modes (e.g., a low power mode and an active mode) according to examples of the disclosure. At 325, the acoustic touch sensing system can perform a low power detection scan. In some examples, the low power detection scan can include sensing with fewer (in comparison to the active mode scan) of the transducers of the acoustic touch sensing system (e.g., four transducers may be used for the active mode detection scan as described below with respect to FIG. 5A, and fewer than four transducers may be used for the low power detection scan). In some examples, the acoustic touch sensing system can use a single transducer to transmit acoustic waves and receive reflections to determine the presence of an object touching. Additionally or alternatively, in some examples, the low power detection scan can include sensing energy or waves received by one or more transducers for a shorter (in comparison to the active mode scan) period of time. For example, the low power scan can sense the energy or waves for the period of time corresponding to a reflection of an opposite edge of the touch sensing surface (rather than for a period that may include other reflections). Attenuation in the reflected energy or wave corresponding to the opposite edge compared with a no-touch baseline of reflected energy or wave corresponding to the opposite edge can be an indication that an object is touching the surface. Additionally or alternatively, low power detection scan can be performed at a reduced frame rate (e.g., 10-30 Hz for the low power detection scans rather than 30-120 Hz for active mode detection scans), thereby reducing the power consumption by the various ADC and DAC components. At 330, the acoustic touch sensing system can process data from the low power detection scan and detect whether an object is or is not touching the surface. When no object is detected on the surface at 335, the acoustic touch sensing system can remain in a low power mode, and continue to perform low power detection scans (in the same or in subsequent scan frames). When an object is detected on the surface at 335, the acoustic touch sensing system can transition into an active mode and, at 340, perform an active mode detection scan. At 345, the data from the active mode detection scan can be processed to determine a location (e.g., centroid) of the object(s) contacting the surface (e.g., as described below with reference to FIG. 5A).

Although process 300 is described as a low power detection scan and an active mode detection scan, it should be understood that process 300 can generally provide a coarse detection scan (e.g., indicating the presence or absence of a touch) and a fine detection scan (e.g., indicating the location of the touch) without limiting the system to low power mode and/or active mode operation.

Figure 4:
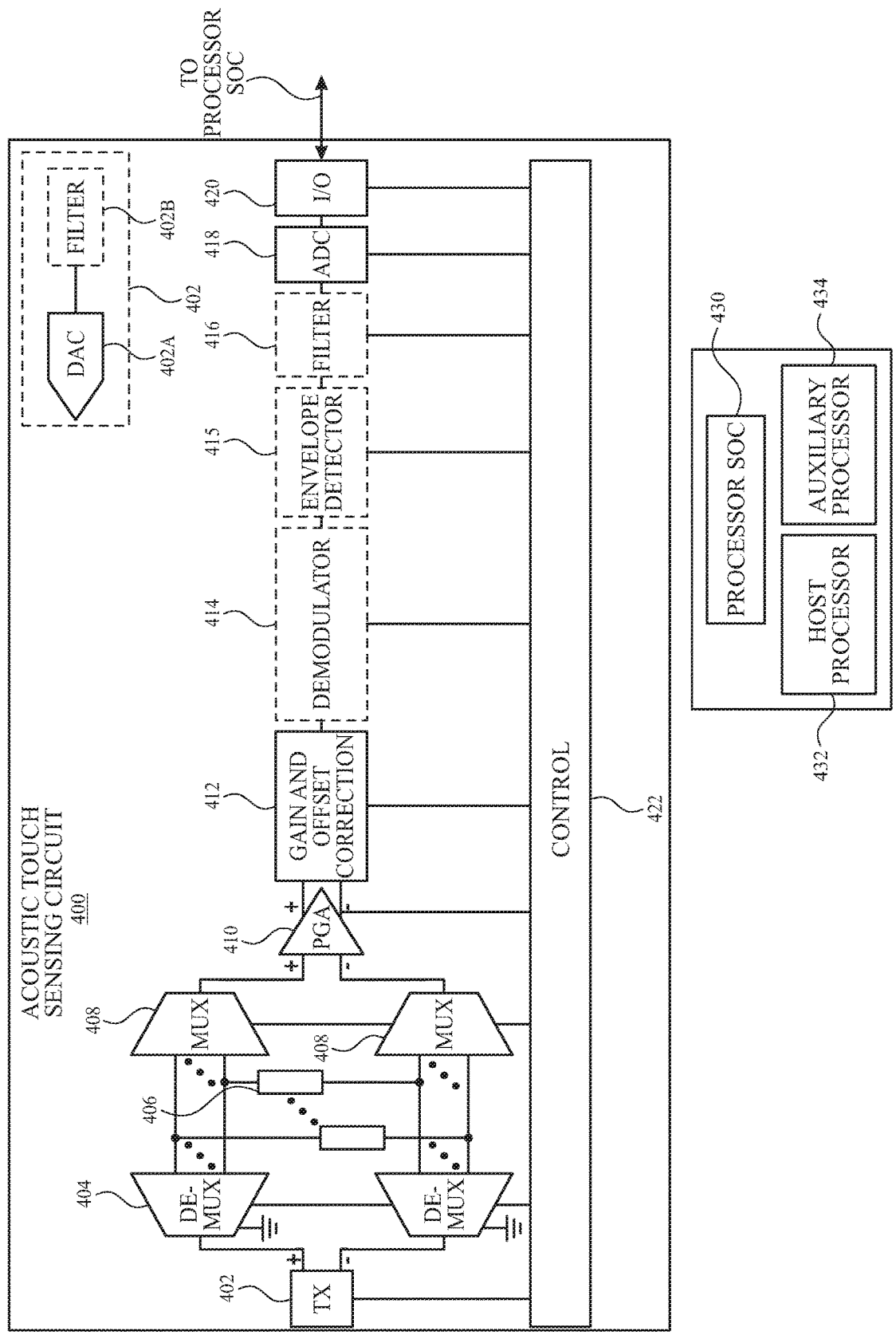
FIG. 4 illustrates an exemplary configuration of an acoustic touch sensing circuit according to examples of the disclosure.

FIG. 4 illustrates an exemplary configuration of an acoustic touch sensing circuit 400 according to examples of the disclosure. Acoustic touch sensing circuit 400 can include acoustic touch sensing circuitry 402-404 and 408-420 (which can correspond to acoustic touch sensing circuitry 206 above) and control logic 422 (which can correspond to acoustic touch sensing controller 210 above). In some examples, acoustic touch sensing circuit 400 can also optionally include transducers 406 (which can correspond to transducers 204 above). In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate an arbitrary transmit waveform. In some examples, the arbitrary waveform can pre-distort the transmit signal to equalize the channel. In some examples, the characteristics of each channel, such as the properties of the surface material coupled to transducers 406, the discontinuities in the surface material, and the reflection characteristics of an edge of the device can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the arbitrary transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation.

A pair of demultiplexers 404 (e.g., in a differential implementation) can be used to selectively couple transmitter 402 to one of transducers 406 that can be the active transducer for a particular measurement step in a measurement cycle. In some examples, demultiplexers 404 can have a ground connection, and the non-selected demultiplexer outputs can be shorted, open, or grounded. As described above, transducers 406 can also generate output electrical signals when motion is induced in the transducers by acoustic energy. A pair of multiplexers 408 (e.g., in a differential implementation) can be used to select a transducer 406 for coupling to a programmable gain amplifier 410 configured to amplify the received signals. In some examples, the same transducer 406 can be coupled to transmitter 402 by demultiplexers 404 during the drive mode and coupled to programmable gain amplifier 410 by multiplexers 408 during the receive mode. Thus, a single transducer 406 can be used both for transmitting and receiving acoustic energy. In some examples, a first transducer can be coupled to transmitter 402 by demultiplexers 404 and a second transducer can be coupled by multiplexers 408 to programmable gain amplifier 410. For example, the transmitting transducer and the receiving transducer can be discrete piezoelectric elements, where the transmitting transducer can be designed for being driven by higher voltages (or currents) to produce sufficient motion in transducer 406 to generate an acoustic wave in the surface of a device (e.g., device 200 above), and the receiving transducer can be designed for receiving smaller amplitude reflected energy. In such an architecture, the transmit side circuitry (e.g., 402 and 404) can be optionally implemented on a high voltage circuit, and the receive side circuitry (e.g., 408-420) can be optionally implemented on a separate low voltage circuit. In some examples, multiplexers 408 can also be implemented on the high voltage circuit to properly isolate the remaining receive side circuitry (e.g., 410-420) during transmission operations by transmit side circuitry. Additionally or alternatively, in some examples, the transmit circuit can include an energy recovery architecture that can be used to recover some of the energy required for charging and discharging the transducer. In some examples, the programmable gain amplifier output can be coupled to gain and offset correction circuit 412. It should be understood that for a single-ended implementation, a single demultiplexer 404 and a single multiplexer 408 can be used, and transmitter 402, programmable gain amplifier 410, and the input to gain and offset correction circuit 412 can be single-ended as well. Differential implementations, however, can provide improved noise suppression over a single-ended implementation.

In some examples, the acoustic touch sensing circuit can be used in a system include multiple transmit transducers and one receive transducer. In such examples, demultiplexer 404 can be unnecessary and omitted from the acoustic touch sensing circuit. In some examples, the acoustic touch sensing circuit can be used in a system including multiple receive transducers and one transmit transducer. In such examples, multiplexer 408 can be unnecessary and omitted from the acoustic touch sensing circuit.

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks can be placed in a different order. In some examples, the processing of these analog processing circuits can be performed in the digital domain.

The received signals, whether raw or processed by one or more of demodulation circuit 414, envelope detection circuit 415 or filter 416 can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by acoustic touch sensing circuit 400) before transmitting the data to other processors in the system (e.g., processor SoC 430). A control circuit 422 can be used to control timing and operations of the acoustic touch sensing circuitry 402-420. In some examples, the I/O circuit is not only used for data transfer to processor SoC 430 (e.g., host processor 432), but also is used for writing the control registers and/or firmware download from processor SoC 430.

It is to be understood that the configuration of FIG. 4 is not limited to the components and configuration of FIG. 4, but can include other or additional components in multiple configurations according to various examples. Additionally, some or all of the components 402-404 and 408-420 can be included in a single circuit, or can be divided among multiple circuits while remaining within the scope of the examples of the disclosure.

Figure 5A:
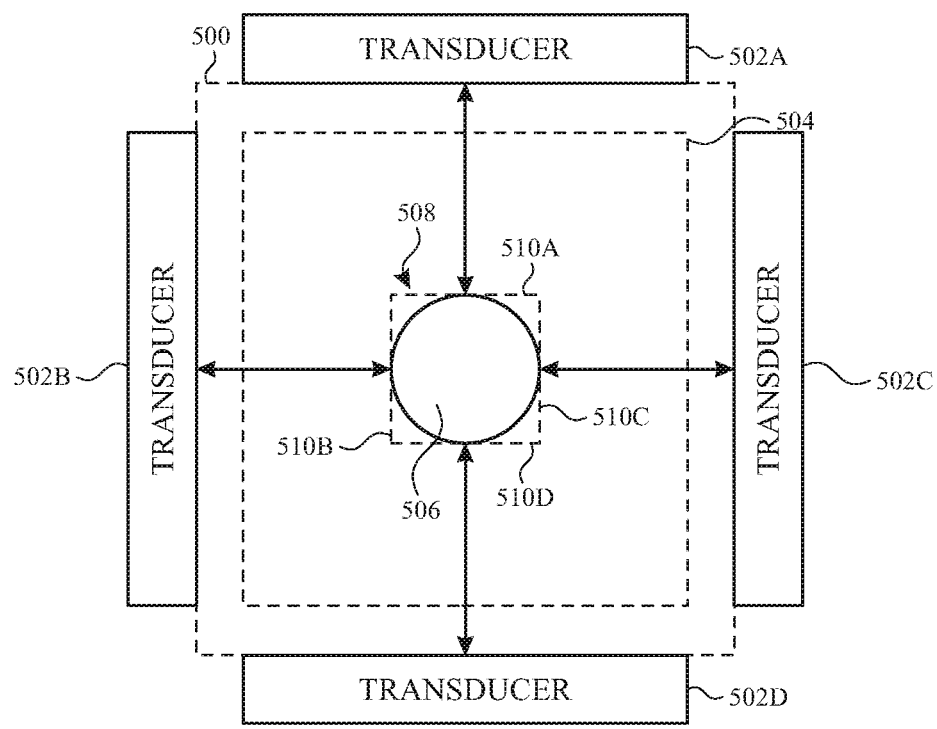
FIGS. 5A-5F illustrate exemplary system configurations and timing diagrams for acoustic touch sensing to determine position using a bounding box technique according to examples of the disclosure.

As described herein, various acoustic sensing techniques can be used to determine position of an object in touching a surface. In some examples, one or more time-of-flight (TOF) measurements can be performed using one or more acoustic transducers to determine boundaries of the position that the object is touching. FIGS. 5A-5F illustrate exemplary system configurations and timing diagrams for acoustic touch sensing to determine position using a bounding box technique according to examples of the disclosure. FIG. 5A illustrates an exemplary acoustic touch sensing system configuration using four acoustic transducers 502A-D mounted along (or otherwise coupled to) four edges of a surface 500 (e.g., cover glass). Transducers 502A-D can be configured to generate acoustic waves (e.g., shear horizontal waves) and to receive the reflected acoustic waves. Propagation of shear horizontal waves can be unaffected by water on surface 500 because low viscosity fluids and gases (such as water and air) have a very low shear modulus, and therefore do not perturb the boundary conditions that affect wave propagation. Shear horizontal waves can be highly directional waves such that the active detection region (or active area) 504 can be effectively defined based on the position and dimensions of the acoustic transducers 502A-D. It should be understood, however, that active area can change based on the directionality property of the acoustic waves and the size and placement of acoustic transducers 502A-D. Additionally, it should be understood that although illustrated as transmit and receive transducers, in some examples, the transmit and receive functions can be divided (e.g., between two transducers in proximity to one another, rather than one transmit and receive transducer transducer).

The position of a touch 506 from an object in contact with surface 502 can be determined by calculating TOF measurements in a measurement cycle using each of acoustic transducers 502A-D. For example, in a first measurement step of the measurement cycle, acoustic transducer 502A can transmit an acoustic wave and receive reflections from the acoustic wave. When no object is present, the received reflection will be the reflection from the acoustic wave reaching the opposite edge of surface 500. However, when an object is touching surface 500 (e.g., corresponding to touch 506), a reflection corresponding to the object can be received before receiving the reflection from the opposite edge. Based on the received reflection corresponding to the object received at transducer 502A, the system can determine a distance to the edge (e.g., leading edge) of touch 506, marked by boundary line 510A. Similar measurements can be performed by transducers 502B, 502C and 502D to determine a distance to the remaining edges of touch 506, indicated by boundary lines 510B, 510C and 510D. Taken together, the measured distances as represented by boundary lines 510A-510D can form a bounding box 508. In some examples, based on the bounding box, the acoustic touch sensing system can determine the area of the touch (e.g., the area of the bounding box). Based on the bounding box, the acoustic touch sensing system can determine position of touch 506 (e.g., based on a centroid and/or area of the bounding box).

The acoustic touch sensing scan described with reference to FIG. 5A can correspond to the active mode detection scan, described above with reference to FIG. 3B, that can be used to determine the position/location of an object touching the surface.

Figure 5B:
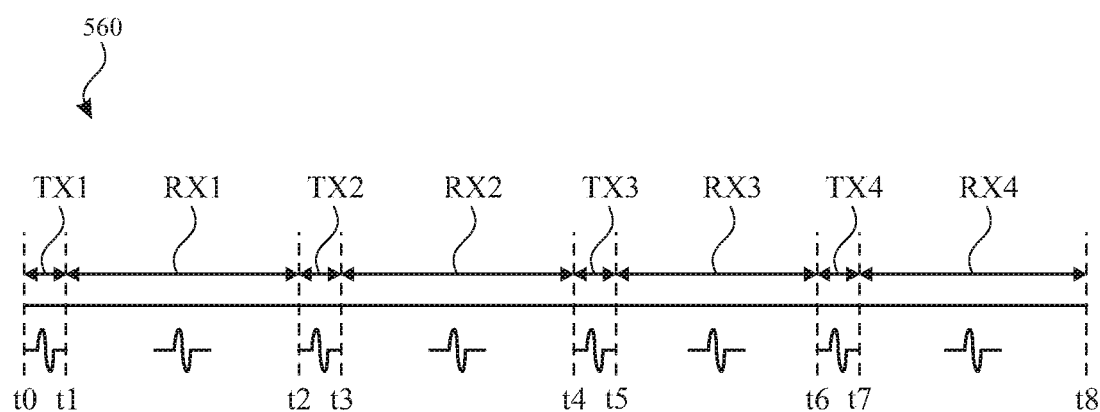

FIG. 5B illustrates an exemplary timing diagram 560 for an acoustic touch sensing scan described in FIG. 5A according to examples of the disclosure. As illustrated in FIG. 5B, each of the transducers can transmit acoustic waves and then receive reflected waves in a series of measurement steps. For example, from t0 to t1 a first transducer (e.g., acoustic transducer 502A) can be stimulated, and reflections at the first transducer can be received from t1 to t2. From t2 to t3 a second transducer (e.g., acoustic transducer 502B) can be stimulated, and reflections at the second transducer can be received from t3 to t4. From t4 to t5 a third transducer (e.g., acoustic transducer 502C) can be stimulated, and reflections at the third transducer can be received from t5 to t6. From t6 to t7 a fourth transducer (e.g., acoustic transducer 502D) can be stimulated, and reflections at the fourth transducer can be received from t7 to t8. Although the transmit (Tx) and receive (Rx) functions are shown back-to-back in FIG. 5B for each transducer, in some examples, gaps can be included between Tx and Rx functions for a transducer (e.g., to minimize capturing portions of the transmitted wave at the receiver), and or between the Tx/Rx functions of two different transducers (such that acoustic energy and the transients caused by multiple reflections from a scan by one transducer does not impact a scan by a second transducer). In some examples, unused transducers can be grounded (e.g., by multiplexers/demultiplexers).

Figure 5C:
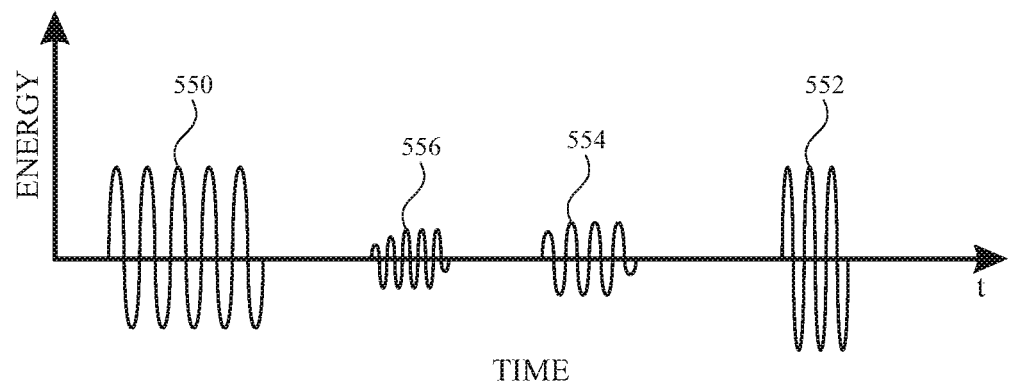

The distance between an object touching the surface and a transducer can be calculated based on TOF principles. The acoustic energy received by transducers can be used to determine a timing parameter indicative of a leading edge of a touch. The propagation rate of the acoustic wave through the material forming the surface can be a known relationship between distance and time. Taken together, the known relationship between distance and time and the timing parameter can be used to determine distance. FIG. 5C illustrates an exemplary timing diagram according to examples of the disclosure. FIG. 5C illustrates the transducer energy output versus time. Signal 550 can correspond to the acoustic energy at the transducer from the generation of the acoustic wave at a first edge of the surface. Signal 552 can correspond to the acoustic energy at the transducer received from the wave reflected off of a second edge opposite the first edge of the surface. Due to the known distance across the surface from the first edge to the opposite the second edge and the known or measured propagation rate of the acoustic signal, the reflection off of the opposite edge of the surface occurs at a known time. Additionally, one or more objects (e.g., fingers) touching the surface can cause reflections of energy in the time between the generation of the wave and the edge reflection (i.e., between signals 550 and 552). For example, signals 556 and 554 can correspond to reflections of two objects touching the surface (or a leading and trailing edge of one object). It should be understood that signals 550-556 are exemplary and the actual shape of the energy received can be different in practice.

In some examples, the timing parameter can be a moment in time that can be derived from the reflected energy. For example, the time can refer to that time at which a threshold amplitude of a packet of the reflected energy is detected. In some examples, rather than a threshold amplitude, a threshold energy of the packet of reflected energy can be detected, and the time can refer to that time at which a threshold energy of the packet is detected. The threshold amplitude or threshold energy can indicate the leading edge of the object in contact with the surface. In some examples, the timing parameter can be a time range rather than a point in time. To improve the resolution of a TOF-based sensing scheme, the frequency of the ultrasonic wave and sampling rate of the receivers can be increased (e.g., so that receipt of the reflected wave can be localized to a narrower peak that can be more accurately correlated with a moment in time).

In some examples, transducers 502A-D can operate in a time multiplexed manner, such that each transducer transmits and receives an acoustic wave at a different time during a measurement cycle so that the waves from one transducer do not interfere with waves from another transducer. In other examples, the transducers can operate in parallel or partially in parallel in time. The signals from the respective transducers can then be distinguished based on different characteristics of the signals (e.g., different frequencies, phases and/or amplitudes).

Figure 5D:
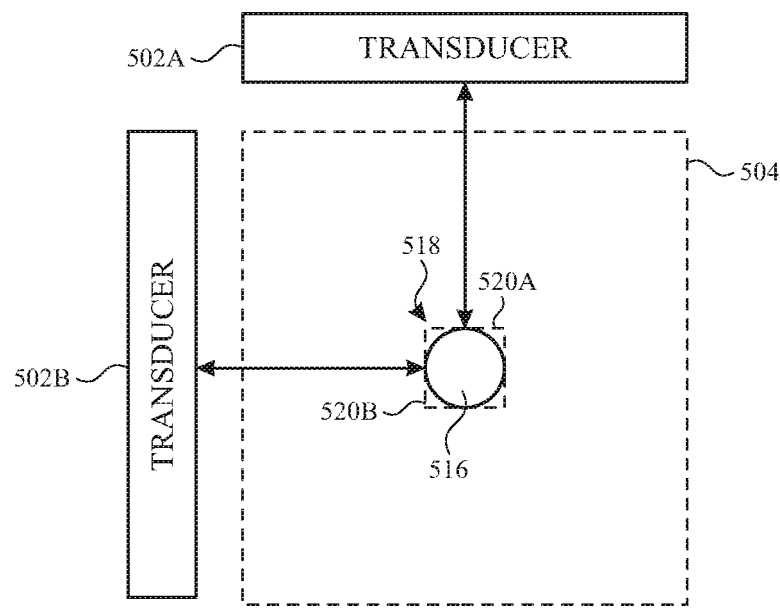

Although four transducers are illustrated in FIG. 5A, in some examples, fewer transducers can be used. For example, when using an input object with known dimensions, as few as two transducers can be used. FIG. 5D illustrates an exemplary acoustic touch sensing system configuration using two acoustic transducers 502A and 50B mounted along two perpendicular edges (e.g., one horizontal edge and one vertical edge) of a surface 500 (surface 500 is omitted for clarity of illustration). An object in contact within the active region 504 of the surface (represented by touch 516) can be an object with known dimensions. For example, a stylus tip can have a known size and shape (e.g., a diameter of 1-2 mm). As described above with respect to FIG. 5A, a first distance illustrated by boundary line 520A can be measured by the TOF of an acoustic wave transmitted and received by transducer 502A, and a second distance illustrated by boundary line 520B can be measured by the TOF of an acoustic wave transmitted and received by transducer 502B. Based on the known dimensions of object, bounding box 518 can be formed (e.g., by adding the diameter of object to the first and second distances). Based on the bounding box, the acoustic touch sensing system can determine position of touch 516 (e.g., based on a centroid). In some examples, the position can be determined based on the two measured distances without requiring forming the bounding box (e.g., the position estimating algorithm can use the dimensions of the object and the two measured distances to calculate the centroid).

In some examples, a user's finger(s) can be characterized such that a two transducer scheme can be used to detect touches by one or more fingers. In some examples, user input can be primarily from an index finger. The user's index finger can be characterized (e.g., dimensions or size) and the bounding box scheme can be applied using two TOF measurements and the finger characteristics. In some examples, multiple fingers can be characterized. During operation, the finger(s) can be identified and then the characteristics of the identified finger(s) can be used with two TOF measurements to determine position.

Figure 5E:
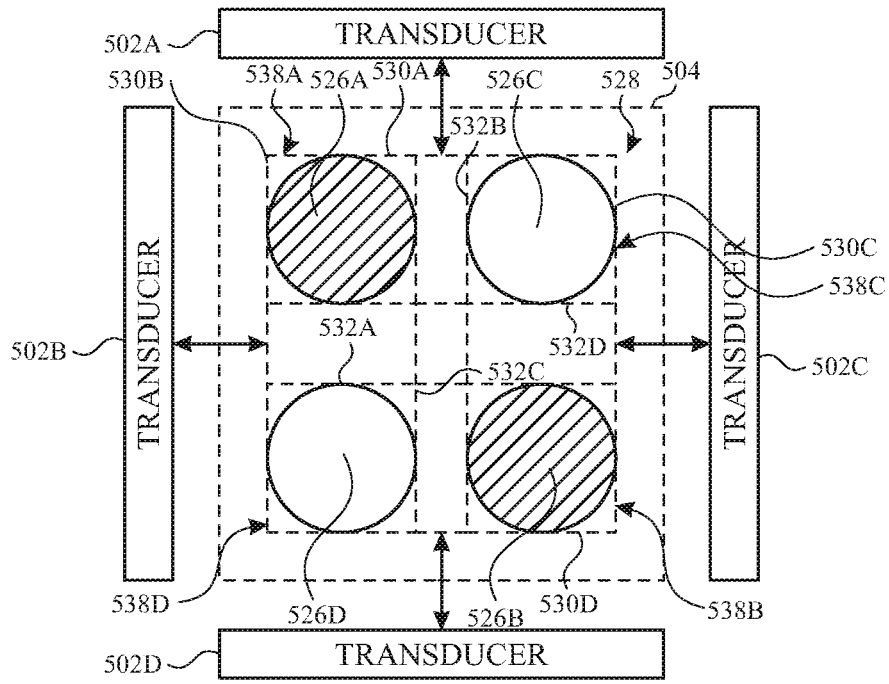

FIGS. 5A and 5D illustrate detection of a single object. In some examples, however, the acoustic touch sensing system can be configured to detect multiple touches. FIG. 5E illustrates an exemplary acoustic touch sensing system configuration configured to detect multiple touches. The acoustic touch sensing system can include four acoustic transducers 502A-502D and an active area 504 as described above with respect to FIG. 5A. Instead of one object touching within active area 504, in FIG. 5E two objects can be touching within the active area 504. The two objects, however, can create an ambiguity in the acoustic touch sensing system regarding the positions of the two objects. The two objects can correspond to either touches 526A and 526B or to touches 526C and 526D. Two of the touches can be actual touches and the other two of the touches can be phantom touches.

For example, TOF measurements can be performed by using transducers 502A, 502B, 502C and 502D to determine a distance to the two objects. For example, transducer 502A can receive two packets of reflected acoustic energy corresponding to the two objects (e.g., as illustrated in FIG. 5C, for example). A first TOF distance to the edge of either touch 526A or touch 526C can be marked by boundary line 530A, and a second TOF distance to the edge of either touch 526B or touch 526D can be marked by boundary line 532A. Likewise, transducer 502B can be used to determine a boundary line 530B corresponding to touch 526A or touch 526D, and a boundary line 532B corresponding to touch 526B or touch 526C. Transducer 502C can be used to determine a boundary line 530C corresponding to touch 526B or touch 526C, and a boundary line 532C corresponding to touch 526A or touch 526D. Transducer 502D can be used to determine a boundary line 530D corresponding to touch 526B or touch 526D, and a boundary line 532D corresponding to touch 526A or touch 526C. Taken together, boundary lines 530A-D and 532A-D can form bounding boxes 538A-D. For example, bounding box 538A can be formed from boundary lines 530A, 530B, 532C and 532D. Similarly, bounding box 538D can be formed from boundary lines 532A, 530B, 532C and 530D.

In some examples, the two actual touches can be disambiguated when they are sequential. The first touch can be registered and then the second sequential touch can be disambiguated based on the first touch. For example, in the example illustrated in FIG. 5E, if touch 526A is detected first, then in the subsequent measurement cycle the two touches can be determined to be touches 526A and 526B. In contrast, if touch 526C is detected first, then in the subsequent measurement cycle the two touches can be determined to be touches 526C and 526D. As long as the touches remain far enough apart to be resolved into separate bounding boxes (and assuming the touch contact moves only small amounts between each measurement interval), the two touches can be tracked. In practice, the apparently simultaneous multi-touch by a user can be viewed as sequential touches if the acquisition time (measurement cycle) of the acoustic sensors is short enough to register the sequence. Thus, if the measurement cycle repeats frequently enough, the acoustic touch sensing system can disambiguate the multiple touches with four transducers.

In some examples, e.g., when multiple touches cannot be resolved, bounding box 528 can be used to determine the position of touch. Bounding box 528 can be formed from boundary lines 530A-D.

Figure 5F:
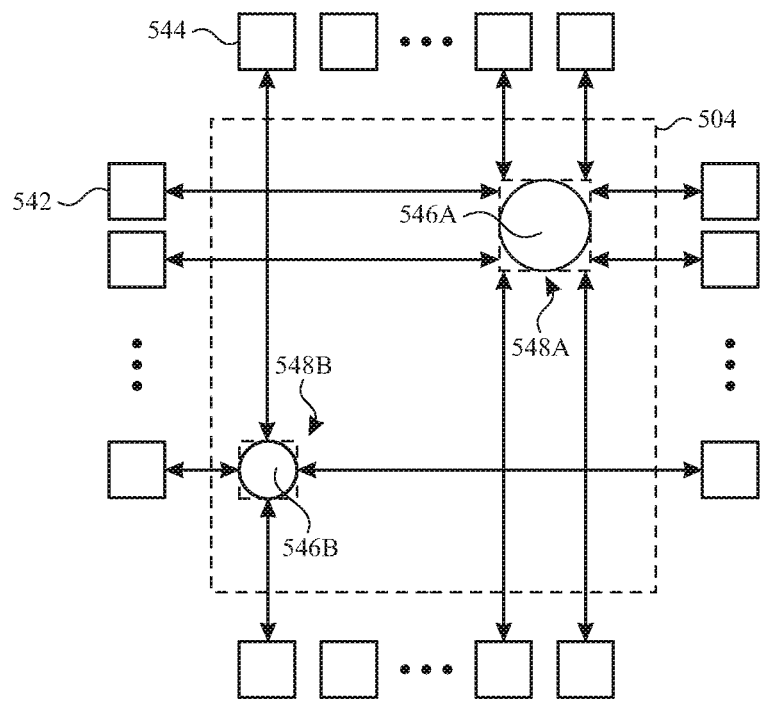

The multi-touch capabilities described with reference to FIG. 5E can be limited based on the disambiguation requirements (e.g., sequential contact and tracking). In some examples, multi-touch capabilities can be provided by increasing the number of transducers in the system. FIG. 5F illustrates an exemplary acoustic touch sensing system configuration configured to detect multiple touches. The acoustic touch sensing system in FIG. 5F can include one or more transducers 542 and 544 arranged along edges of the surface and forming active area 504. Each of the transducers 542 and 544 can transmit acoustic waves and measure the reflections to determine the presence and location of one or more objects. For example, as illustrated, bounding box 548A can be formed around touch 546A based on TOF measurements from eight transmitters, and bounding box 548B can formed around touch 546B based on TOF measurements from four of the transmitters. Multiple transducers can also be implemented in place of the two transducers illustrated in FIG. 5D.

In some examples, the arrangement of multiple transducers illustrated in FIG. 5F can be implemented without the multi-touch capability described with respect to FIG. 5F. Instead, the multiple transducers on each of the sides can be coupled together and can act as a single transducer on each of the four sides as described with reference to FIGS. 5A and 5E (or on two sides as described with reference to FIG. 5D).

TOF schemes described with reference to FIGS. 5A-5F can provide for touch sensing capability using a limited number of transducers (e.g., as compared with capacitive touch sensing) which can simplify the transmitting and receiving electronics, and can reduce time and memory requirements for processing. Although FIGS. 5A-5F discuss using a bounding box based on TOF measurements to determine position of an object, in other examples, different methods can be used, including applying matched filtering to a known transmitted ultrasonic pulse shape, and using a center of mass calculation on the filtered output (e.g., instead of a centroid).

Figure 6:
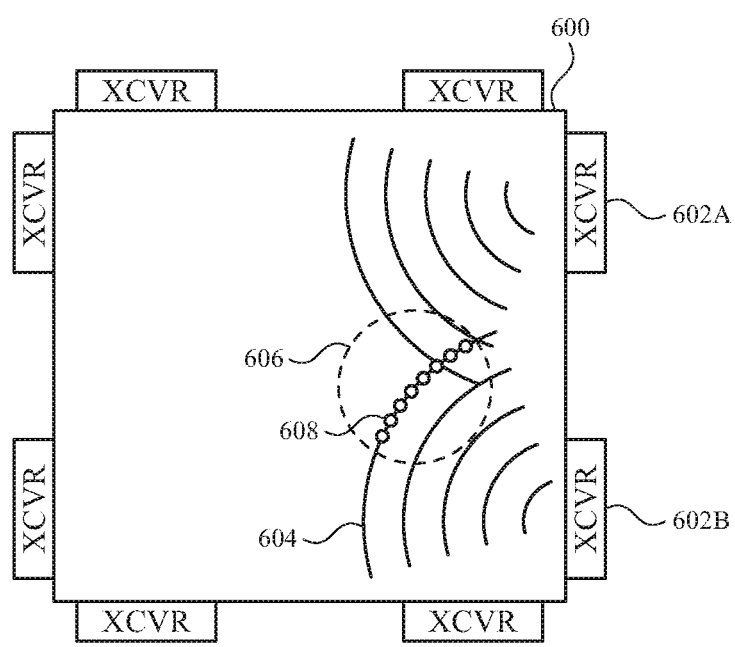
FIG. 6 illustrates an exemplary acoustic touch sensing system configuration using image reconstruction techniques to determine position according to examples of the disclosure.

In some examples, position can be detected by amplitude image reconstruction using different phase acoustic waves. FIG. 6 illustrates an exemplary acoustic touch sensing system configuration using image reconstruction techniques to determine position according to examples of the disclosure. FIG. 6 illustrates a surface 600 and multiple transceivers coupled thereto. For example, as illustrated, eight transceivers can be distributed such that two transceivers can be coupled to each side of surface 600. Each of the transceivers can generate an ultrasonic wave and receive reflections of the ultrasonic wave. In single pitch and catch examples, one transceiver can launch and receive the wave. In single pitch multiple catch examples, multiple receiver can receive the wave launched from a transceiver. The amplitude and TOF of reflected waves from an object, such as a finger, touching surface 600 can be received and used to reconstruct an image of the touch. For example, transceiver 602B can generate an ultrasonic wave (illustrated as a multiple arcs 604). When the ultrasonic wave comes into contact with an object (shown by touch 606), a reflected wave can be returned to transceiver 602B. The amplitude of the reflected wave along each arc 604 can be coherently added (e.g., using a circular arc integration path for single pitch and catch examples and using an ellipsoidal arc integration path for single pitch multiple catch examples), such that the amplitude of the reflected wave along each arc received by the transceiver can represent the sum of the amplitudes of each of multiple points 608 along the arc. Each arc 604 can be associated with a given position and time using the TOF principles discussed herein. TOF of flight can be used to associate the measured amplitude of the received signal with each of the arcs. For arcs corresponding to locations in which there is no touch, the amplitude can be negligible or zero. For arcs corresponding to locations in which there is a touch, the amplitude can increase as the arc intersects more with the touch 606. The transmit and receive functions can be repeated for one or more of the transceivers. Each transceiver transmitting the ultrasonic wave can transmit along a different angle. The combined data from all of the transceivers can be processed to determine the reflected amplitude for each of the multiple points corresponding to the touch 606 and corresponding to the rest of surface 600.

In some examples, the resolution of image reconstruction can change depending on the application. For example, a coarse image reconstruction (which can require fewer transceiver measurements) may be sufficient to detect a coarse location, but a finer image reconstruction (which can require more transceiver measurements) may be required to detect finer location information. To reduce processing time and reduce power consumption, coarse image reconstruction (relying on fewer transducers and less processing) can be used unless finer image reconstruction is required.

Figure 7A:
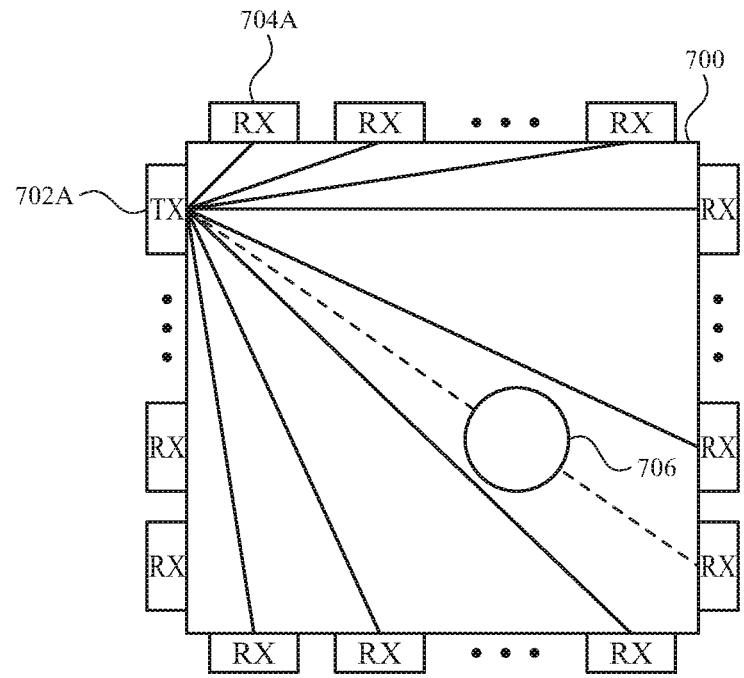
FIGS. 7A and 7B illustrate an exemplary acoustic touch sensing system configuration using acoustic tomography techniques to determine position according to examples of the disclosure.
Figure 7B:
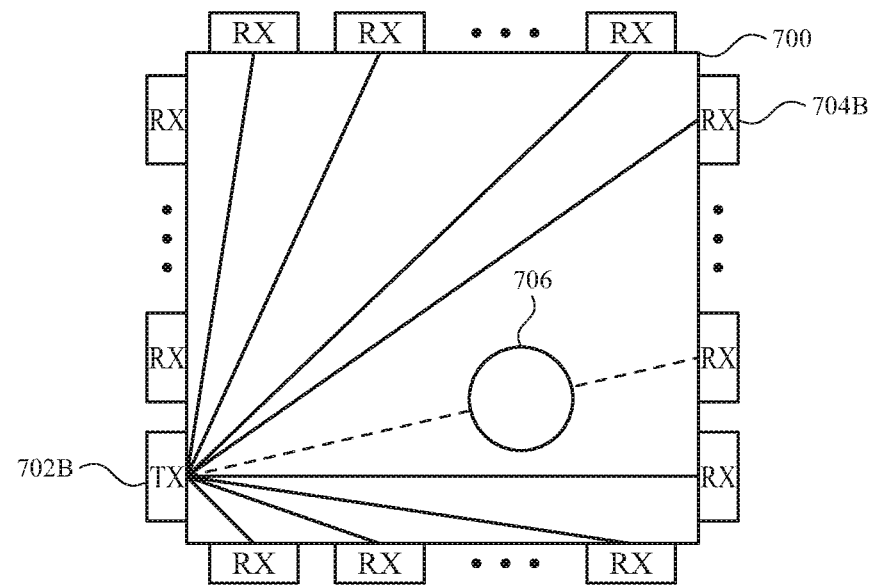

In some examples, acoustic tomography techniques can be used to determine the position of one or more objects contacting a surface. FIGS. 7A and 7B illustrate an exemplary acoustic touch sensing system configuration using acoustic tomography techniques to determine position according to examples of the disclosure. FIGS. 7A and 7B illustrate a surface 700 including multiple acoustic transceivers couple to the edges of the surface. In each step of a measurement cycle, one of the acoustic transceivers can be configured to transmit acoustic waves, and one or more of the remaining transceivers can be configured to receive the acoustic waves. For example, in the step illustrated in FIG. 7A, one transceiver 702A (labeled "TX") can generate an acoustic wave in surface 700, and one or more of transceivers 704A (labeled "RX") can receive the acoustic wave. When no object is present on surface 700 in the path between the transmitter and a receiver, the waves can propagate freely and be received undisturbed by the receivers (illustrated by solid lines between TX and RX). However, when an object is touching the surface 700 (illustrated by touch 706), the touch can disturb the transmission of the acoustic wave between the transmitter and receiver (illustrated by the broken line between TX and RX). Based on the received acoustic energy, the acoustic touch sensing system can detect a touch along the disturbed path. In the measurement step illustrated in FIG. 7B, a different transceiver 702B (labeled "TX") can generate an acoustic wave in surface 700, and one or more of transceivers 704B (labeled "RX") can receive the acoustic wave. When no object is present on surface 700 in the path between the transmitter and a receiver, the waves can propagate freely and be received undisturbed by the receivers. However, when an object is touching the surface 700, the touch 706 can disturb the transmission of the acoustic wave between the transmitter and receiver (illustrated by the broken line between TX and RX). Based on the received acoustic energy, the acoustic touch sensing system can detect a touch along the disturbed path. Subsequent measurement steps in the measurement cycle can adjust which transceiver acts as a transmitter and which transceivers act as receivers. Based on the results of the multiple steps of a measurement cycle, the position of the object(s) can be resolved.

In some examples, the resolution of image reconstruction by acoustic tomography can change depending on the application. For example, a coarse image reconstruction may be sufficient to detect a coarse location, but a finer image reconstruction may be required to detect finer location information. To reduce processing time and reduce power consumption, coarse image reconstruction (relying on fewer transducers and less processing) can be used unless finer image reconstruction is required.

Figure 8A:
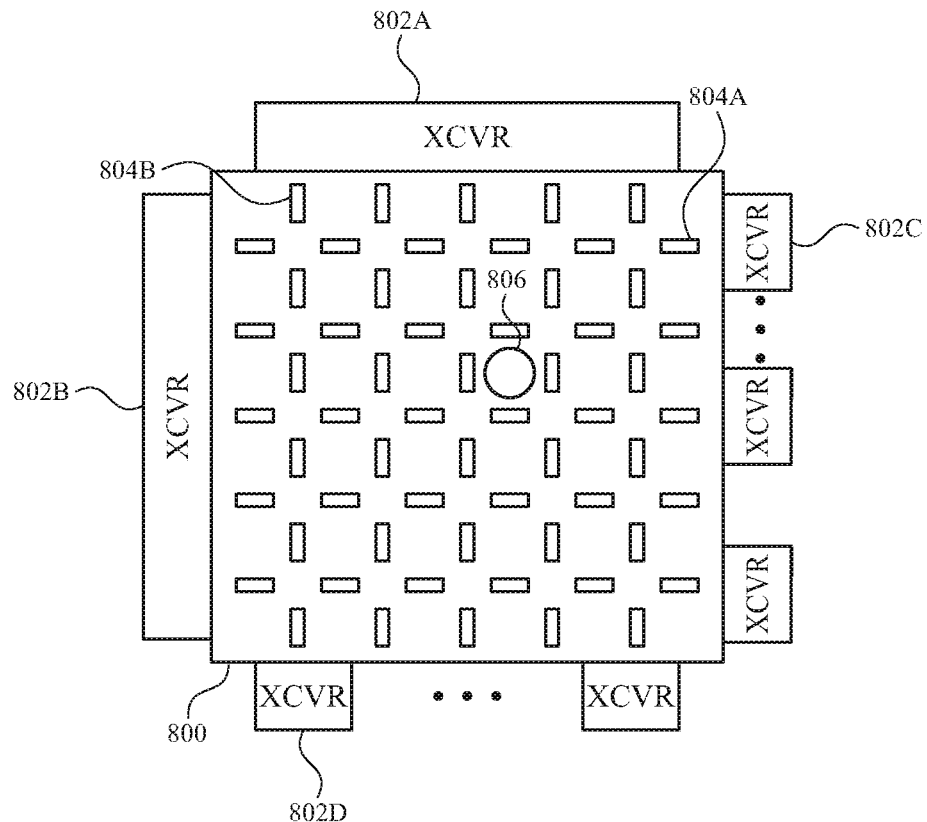
FIG. 8A illustrates an exemplary acoustic touch sensing system configuration using changes in amplitudes of reflections from an array of barriers to determine position according to examples of the disclosure.

In some examples, a position one or more objects can be determined based on acoustic waves propagating in a surface including an array of barriers coupled to (or patterned in or on) a surface. The barriers can create a pattern of reflections, and attenuation in the amplitude of reflections can be detected to determine the location of a touch. FIG. 8A illustrates an exemplary acoustic touch sensing system configuration using changes in amplitudes of reflections from an array of barriers to determine position according to examples of the disclosure. FIG. 8A illustrates a surface 800 (e.g., cover glass) including an array of barriers 804A and 804B arranged in the vertical and horizontal directions. Transceivers 802A and 802B can be coupled to surface 800 and can be configured to transmit an acoustic wave in surface 800. In some examples, barriers 804A and 804B can be coupled to (or patterned in or on) the same surface as the transceivers 802A and 802B, and can cause a portion of energy transmitted by a nearby transmitting transducer to reflect and return to the transmitting transducer. It should be understood that fewer or more barriers can be included in the array of barriers. Additionally, it should be understood that the barriers can have different shapes (e.g., lines, dots, etc.) and patterns.

Transceiver 802A can, for example, transmit an acoustic wave that can propagate into surface 800. Each barrier 804A can reflect a portion of the transmitted wave back toward the transceiver. The reflected waves can be received at known times (i.e., based on the distance and propagation rate in the surface medium) and with known amplitudes (based on empirical observation) in a no-touch condition. However, when an object is contacting the surface (as illustrated by touch 806), the reflected waves from barriers between the touch and the transceiver can be received without attenuation, but the reflected waves from barriers divided from the transceiver by the touch can be attenuated. Likewise, transceiver 802B can, for example, transmit an acoustic wave that can propagate into surface 800. Each barrier 804B can reflect a portion of the transmitted wave back toward the transceiver. The reflected waves can be received, and based on the received signal level (e.g., amplitude), a presence and location of a touch can be detected.

In some examples, a transceiver, such as transceiver 802A and 802B can be included along each edge of surface 800 (i.e., four transceivers, one on each side). By generating an acoustic wave from each of the transceivers, boundaries of a touch can be detected from four sides and a centroid can be calculated. In some examples, more than one transceiver can be included along each edge of the surface (e.g., 3 or more). For example, FIG. 8A illustrates a configuration including transceivers 802C or 802D. It should be understood that the configuration of FIG. 8A can include transceivers like 802A and 802B on four sides, transceivers like 802C and 80D on four sides, or a mix of transceivers 802A-D on the four sides. The introduction of additional transceivers can enable the detection of multiple objects touching surface 800 in a similar way as described with reference to FIG. 5D (but using barriers to detect boundary lines).

Figure 8B:
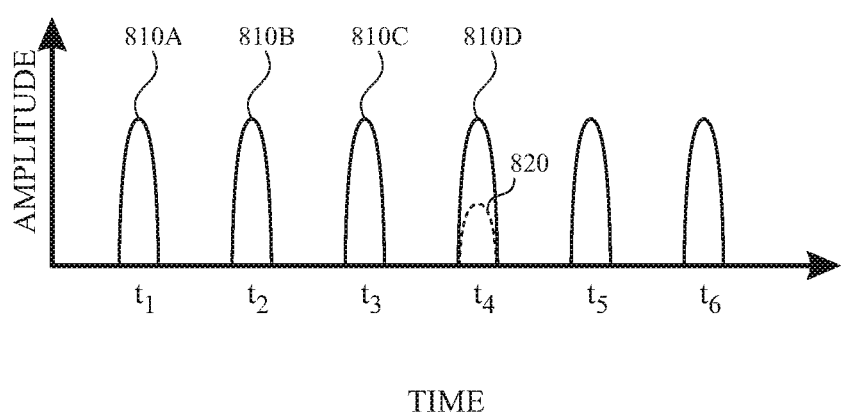
FIG. 8B illustrates an exemplary timing diagram of reflection received from an array of barriers according to examples of the disclosure.

FIG. 8B illustrates an exemplary timing diagram of reflections received from an array of barriers according to examples of the disclosure. In a no-touch condition, the transceiver can receive reflections from the barriers at known times and with known amplitudes. For example, reflection 810A can be received at t1, reflection 810B can be received at t2, reflection 810C can be received at t3, reflection 810D can be received at t4, and so on for the remaining barriers in the path of a transceiver. The reflections 810A-810D can correspond to the expected amplitude for a no-touch condition. However, when a finger is in contact with the surface, the finger can cause attenuation in the reflected wave. For example, reflection 820, having an amplitude attenuated when compared with the baseline amplitude of reflection 810D at t4 can be indicative of a finger touching the surface. Although not shown, the attenuation in reflection 820 can also appear at downstream barriers as well when a touch is present between the transceiver and the downstream barriers. As a result, attenuation in the reflections at t5 and t6 can be measured as well.

It should be understood that the representations of reflections 810A-D are examples of the reflections received at a transceiver, but that the actual reflections at the transceiver may have a different form. Additionally, the amplitudes of reflections 810A-D are shown as being uniform, but the reflections 810A-D can have different amplitudes. For example, the reflections from barriers further from the transceiver can have a reduced amplitude compared with barriers closer to the transceiver due to the reflections caused by the closer barriers.

Figure 9A:
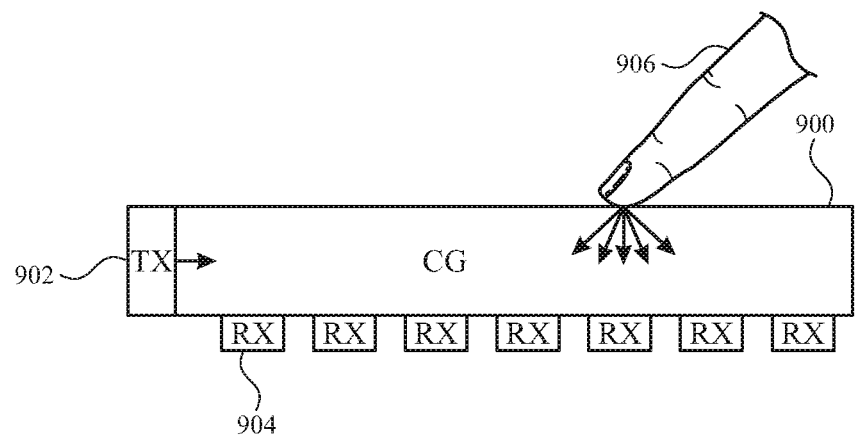
FIGS. 9A and 9B illustrate an exemplary acoustic touch sensing system configuration using a two dimensional piezoelectric receiver array to determine position according to examples of the disclosure.
Figure 9B:
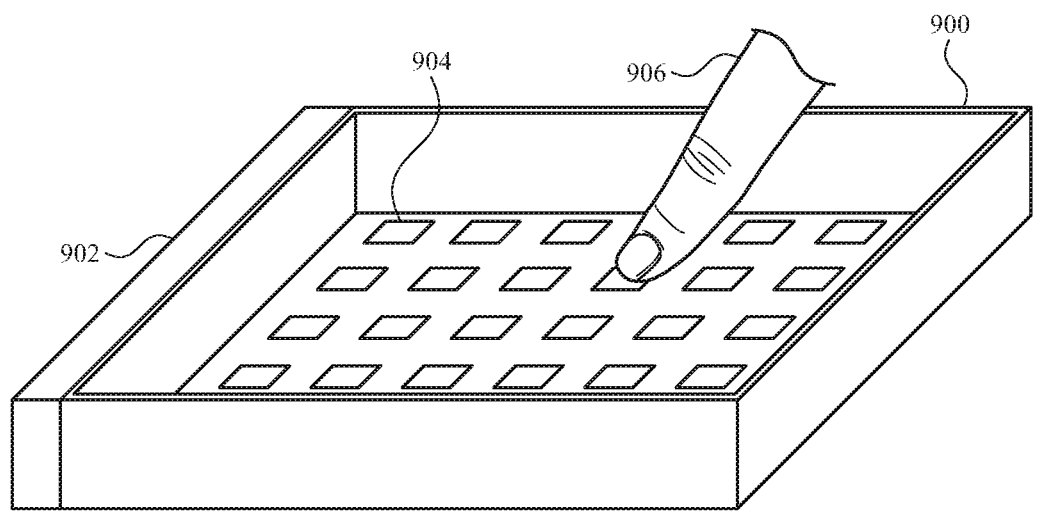

In some examples, position can be determined using one (or more) transmitters and an array of receivers. FIGS. 9A and 9B illustrate an exemplary acoustic touch sensing system configuration using a two dimensional piezoelectric receiver array to determine position according to examples of the disclosure. FIG. 9A illustrates a cross-section view of an acoustic touch sensing device. FIG. 9B illustrates a perspective view of the acoustic touch sensing device. Surface 900 can be an upper surface of a cover glass of a device (e.g., one of the devices illustrated in FIGS. 1A-1E). Surface 900 can be stimulated with an acoustic wave from transmitter 902. An array of receivers 904 can be coupled to the bottom of the cover glass. The acoustic wave can propagate in surface 900 and an object, such as finger 906, in contact with surface 900 can cause the wave to scatter. The scattered waves can be received by receivers 904 arranged in a two-dimensional pattern. The receivers proximate to finger 906 can receive the scattered waves and, based on the received profile, a position of the finger can be determined. For example, the receivers most proximate to the object can receive the largest amounts of reflected or scattered acoustic energy.

Although often described herein as an ultrasonic wave or as an acoustic wave, the various methodologies and applications for touch detection described herein can be applied with acoustic waves in the sonic or ultrasonic range.

Figure 10:
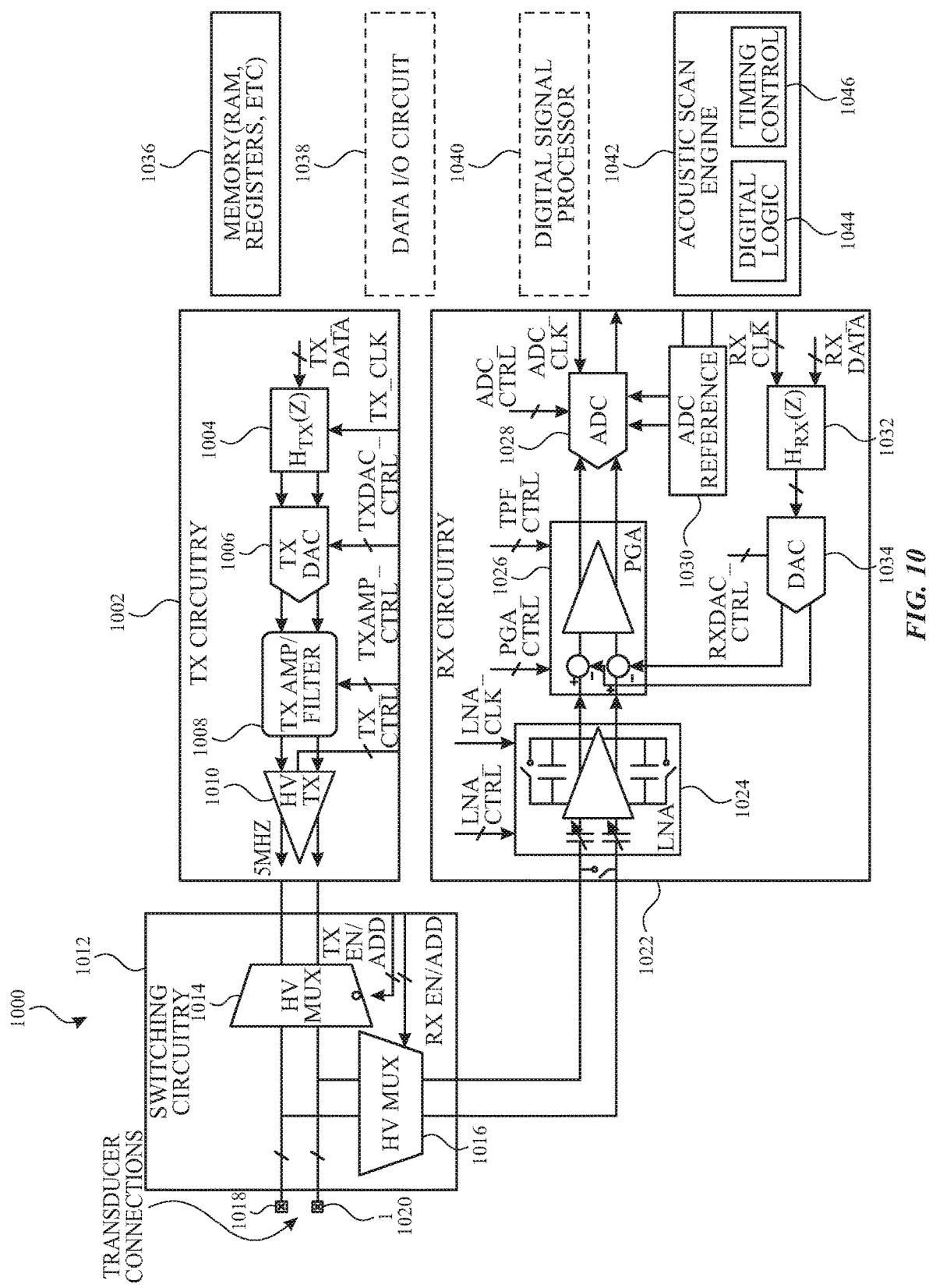
FIG. 10 illustrates an exemplary acoustic touch sensor circuit according to examples of the disclosure.

FIG. 10 illustrates an exemplary acoustic touch sensor circuit 1000 according to examples of the disclosure. Acoustic touch sensor circuit 1000 can include transmit circuitry (Tx circuitry) 1002, switching circuitry 1012, and receive circuitry (Rx circuitry) 1022. In some examples, acoustic touch sensor circuit 1000 can also include acoustic scan engine 1042 and memory 1036. In some examples, acoustic touch sensing circuitry 1000 can also include data I/O circuit 1038. In some examples, acoustic touch sensing circuitry 1000 can also include digital signal processor 1040. Tx circuitry 1002, switching circuitry 1012, Rx circuitry 1022, memory 1036, data I/O circuit 1038, digital signal processor 1040 and/or acoustic scan engine 1042 can be implemented in an application specific integrated circuit (ASIC), for example.

Tx circuitry 1002 (which can correspond to transmitter 402) can, for example, apply a differential stimulation to transducer connections 1018 and 1020 to transmit acoustic waves in a surface. Tx circuitry 1002 can include signal generator 1004, DAC 1006, amplifier/filter 1008 and buffer 1010. Signal generator 1004 can apply a transfer function (as discussed above) to a transmit signal ("tx_data"). The transmit signal can be stored in memory 1036 and/or supplied by acoustic scan engine 1042. DAC 1006 can convert the digital output of signal generator 1004 into an analog transmit signal, which can be amplified and/or filtered by amplifier/filter 1008. The amplified and/or filtered analog transmit signal can then be further boosted in voltage by high-voltage transmit buffer (buffer 1010), so that the transmit signal applied to the transducer can have the appropriate voltage amplitude required to propagate an acoustic wave in the surface and generate detectable reflections. The timing and control signals for signal generator 1004, DAC 1006, amplifier/filter 1008 and buffer 1010 can be provided by acoustic scan engine 1042.

Rx circuitry 1022 (which can correspond to 410-420 in FIG. 4) can, for example, receive energy from reflected waves at the transducer, perform some analog signal processing, and/or convert the received energy into a digital signal. Rx circuitry 1022 can include a low-noise amplifier (LNA) 1024 to sense the transducer (e.g., a differential amplifier). Rx circuitry 1022 can also include a programmable gain amplifier (PGA) circuit 1026 configured to apply gain to increase (or in some cases decrease) the amplitude of the signals received from LNA 1024. The PGA circuit 1026 can also filter (e.g., low pass) the signals received from LNA 1024 to remove high frequency components. Additionally, the PGA circuit 1026 can also perform baselining (offset correction). For example, Rx circuitry 1022 can include baseline signal generator 1032, which can apply a transfer function to a baseline receive signal ("rx_data"). The baseline receive signal can be stored in memory 1036 and/or supplied by acoustic scan engine 1042. DAC 1034 (a baselining DAC) can convert the digital output of baseline signal generator 1032 into an analog baseline signal (a differential baseline signal). The analog baseline signal can be subtracted from the signals received from LNA 1024 by PGA circuit 1026. In some examples, the baseline can be a coarse version of the receive signal and baselining can remove part of the baseline signal from the receive signal. Rx circuitry 1022 can also include analog-to-digital converter (ADC) 1028 and ADC reference 1030. Signals output from PGA circuit 1026 can be converted into a digital signal by ADC 1028.

Switching circuitry 1012 (which can correspond to demultiplexers 404 and multiplexers 408) can operatively couple Tx circuitry 1002 and Rx circuitry 1022 to respective transducers during operation. In some examples, switching circuitry 1012 can include demultiplexers 1014 and multiplexers 1016 configured to couple Tx circuitry 1002 and Rx circuitry 1022 to respective transducers.

Timing and control signals for Tx circuitry 1002, switching circuitry 1012 and Rx circuitry 1022 can be provided by acoustic scan engine 1042. Acoustic scan engine 1042 can be implemented in hardware, firmware, software or a combination thereof. In some examples, acoustic scan engine 1042 can include digital logic 1044 and timing control 1046. Digital logic 1044 can provide the various components of acoustic touch sensing circuit 1000 with control signals. For example, the digital logic 1044 can provide control signals to DAC 1006 (txDAC_ctrl), amplifier/filter 1008 (txamp_ctrl) and buffer 1010 (tx_ctrl). These control signals can be used, for example, to generate transmit signals at the appropriate voltage amplitude levels. In some examples, digital logic 1044 can also provide the transmit signal ("tx_data") to transmit signal generator 1004. In some examples, digital logic 1044 can provide control signals to switching circuitry 1012 to couple and/or decouple transducers according to an acoustic touch sensing scan (e.g., as described above with respect to FIG. 5A). For example, the digital logic 1044 can provide control signals to demultiplexer 1014 (tx_en/add) to enable and address the Tx circuitry 1002 to the respective transducer, and to multiplexer 1016 (rx_en/add) to enable and address the Rx circuitry 1022 to the respective transducer. In some examples, the digital logic 1044 can provide control signals to LNA 1024 (lna_ctrl), PGA circuit 1026 (pga_ctrl, lpf_ctrl), ADC 1028 (ADC_ctrl) and DAC 1034 (rxDAC_ctrl). These control signals can be used, for example, to receive signals from the transducer, filter, baseline and apply gain to otherwise adjust the voltage amplitude levels and/or generate a digital receive signal. In some examples, digital logic 1044 can also provide the baseline receive signal ("rx_data") to baseline signal generator 1032.

Timing control circuit 1046 can generate timing signals for acoustic touch sensing circuit 1000 and generally sequence the operations of acoustic touch sensing circuit 1000. In some examples, the acoustic touch sensing circuit 1000 can receive a master clock signal from an external source (e.g., clock from the host processor, crystal oscillator, ring oscillator, RC oscillator, or other high-performance oscillator). In some examples, an on-chip oscillator can be used to generate the clock. In some examples, a master clock signal can be generated by an on-chip phase locked loop (PLL), included as part of acoustic touch sensing circuit 1000, using an external clock as the input. In some examples, a master clock signal can be routed to the acoustic touch sensing circuit from processor SoC 430. The appropriate master clock source can be determined based on a tradeoff between area, thickness of the stack-up, power and electromagnetic interference. Based on the master clock signal, timing control circuit 1046 can generate clocks for the various components of acoustic touch sensing circuit 1000. For example, the clock signals can include tx_clk for transmit signal generator 1004, rx_clk for baseline receive signal generator 1032 and ADC_clk for ADC 1028. Both tx_clk and rx_clk can be the same to synchronize the transmit and receive functions. ADC_clk can be a relatively high-speed clock so that ADC 1028 can operate as an oversampled ADC.

In some examples, acoustic touch sensing circuitry 1000 can also include data I/O circuit 1038. Data I/O circuit 1038 can be configured to transfer data received from acoustic touch sensing or other information to one or more processors (e.g., to processor SoC 430). In some examples, data I/O circuit 1038 can be used to receive control signals (e.g., from processor SoC 430). In some examples, acoustic touch sensing circuitry 1000 can also include digital signal processor 1040, which, as discussed herein, can provide varying degrees of processing of the data received from acoustic touch sensing (e.g., data output by ADC 1028). Data output by ADC 1028 can be stored in memory 1036. In some examples, the data output by ADC 1028 can be buffered and transferred by data I/O circuit 1038 and/or processed by digital signal processor 1040. Timing control circuit 1046 can also generate clock signals for data communications by data I/O circuit 1038 and digital signal processing by digital signal processor 1040. In some examples, data I/O circuit 1038 and/or digital signal processor 1040 can be implemented as part of acoustic scan engine 1042. In some examples, data I/O circuit 1038 and/or digital signal processor 1040 can be implemented separate from acoustic scan engine 1042.

Although not shown in FIG. 10, acoustic touch sensing circuit 1000 can receive or generate a high voltage supply to enable high voltage stimulation of transducers. In some examples, the high voltage can be generated externally and supplied to acoustic touch sensing circuit 1000. In some examples, acoustic touch sensing circuit 1000 can include a voltage boosting circuit (e.g., a charge pump) to generate high voltages in acoustic touch sensing circuit 1000.

Processing data from acoustic touch detection scans can be performed by different processing circuits of an acoustic touch sensing system. For example, as described above with respect to FIG. 4, an electronic device can include an acoustic touch sensing circuit 400 and a processor SoC 430. Processor SoC 430 can include a host processor and an auxiliary processor/sub-processor. FIGS. 11A-11D illustrate exemplary architectures of an acoustic touch sensing system according to examples of the disclosure. FIGS. 12A-12D illustrate exemplary timing diagrams for acoustic touch sensing systems corresponding to the exemplary architectures of FIGS. 11A-11D according to examples of the disclosure. FIGS. 13A-13D illustrate exemplary flow diagrams for acoustic touch sensing systems corresponding to the exemplary architectures of FIGS. 11A-11D according to examples of the disclosure.

Figure 11A:
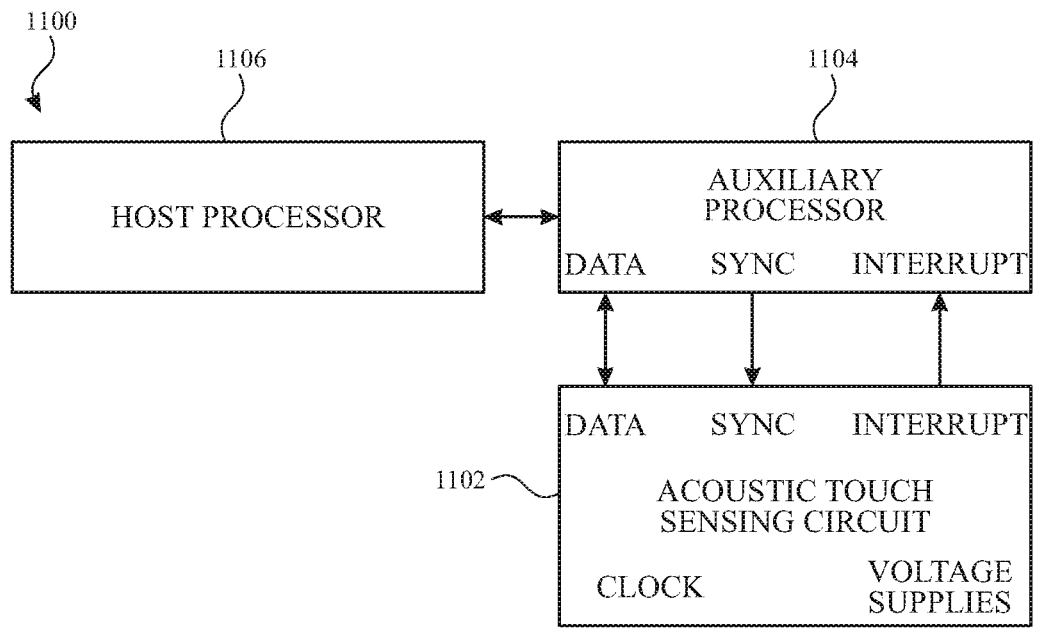
FIGS. 11A-11D illustrate exemplary architectures of an acoustic touch sensing system according to examples of the disclosure.

FIG. 11A illustrates a first exemplary architecture 1100 including acoustic touch sensing circuit 1102, auxiliary processor 1104 and host processor 1106. As described above, auxiliary processor 1104 can be a low power processor that can remain active even when host processor 1106 can be idle and/or powered down. In the first exemplary architecture 1100, acoustic touch sensing circuit 1102 can perform acoustic touch sensing scans and generate acoustic touch data. The acoustic touch data can be transferred to auxiliary processor 1104 for processing according one or more touch sensing algorithms. For example, in a low-power mode, acoustic touch sensing circuit 1102 can perform a low power detection scan. The low power scan can include receiving reflections from a barrier (e.g., surface edge) opposite a transducer for one or more transducers. The acoustic touch data corresponding to the received reflections from the barrier(s) can be transmitted to auxiliary processor 1104 via a communication channel and processed by auxiliary processor 1104 to determine the presence or absence of an object touching the sensing surface. Once an object is detected touching the sensing surface, the system can transition from the low-power mode to an active mode, and acoustic touch sensing circuit 1102 can perform an active mode detection scan. The active mode detection scan can include, for example, scanning the sensing surface as described above with respect to FIG. 5A. The acoustic touch data corresponding to the active mode detection scan can be transmitted to auxiliary processor 1104 via a communication channel and processed by auxiliary processor 1104 to determine the location of the object. In some examples, determining the location of the object can include determining the area and/or centroid of the object. Host processor 1106 can receive the location of the object touching the surface from auxiliary processor 1104 and perform an action based thereon.

In some examples, acoustic touch sensing circuit 1102 can perform some processing before sending acoustic touch data to auxiliary processor 1104. Referring back to FIG. 10, in some examples, ADC 1028 can have a bit resolution between 10 bits and 15 bits (e.g., 12 bit). ADC 1028 can also have a sampling rate between 10 MHz and 100 MHz (e.g., 25 MHz, 50 MHz, etc.). At these sampling rates, the output of the ADC can require between 100 Mbps and 1500 Mbps. These high-speed data communication rates can require a high-speed data communication channel between acoustic touch sensing circuit 1102 and auxiliary processor 1104. To reduce the requirements for the data communication channel, acoustic touch sensing circuit 1102 can include a digital signal processor (e.g., corresponding to digital signal processor 640) which can average samples from the ADC output. Averaging the samples can compress the amount of acoustic touch data to be communicated to auxiliary processor 1104. The averaging performed by the digital signal processor can be controlled by digital logic and timing control circuits in acoustic touch sensing circuit 1102 (e.g., corresponding to acoustic scan engine 642). In some examples, the transmit signal can be coded to allow for averaging without a time penalty. Although averaging is described, in other examples, other forms of processing can be applied to the acoustic touch data before transferring the acoustic touch data.

In some examples, the data communication channel between acoustic touch sensing circuit 1102 and auxiliary processor 1104 can be a serial bus, such as a serial peripheral interface (SPI) bus. In addition, the communication channel can be bidirectional so information can also be transmitted from auxiliary processor 1104 to acoustic touch sensing circuit 1102 (e.g., register information used for programming acoustic touch sensing circuit 1102). Additionally, acoustic touch sensing circuit 1102 can receive one or more synchronization signals from auxiliary processor 1104 configured to synchronize acoustic touch sensing scanning operations by acoustic touch sensing circuit 1102. Additionally, acoustic touch sensing circuit 1102 can generate an interrupt signal configured to provide for proper acoustic data transfer from acoustic touch sensing circuit 1102 to auxiliary processor 1104. In some examples, the detection and the processing for the low power detection mode can be done on-chip (e.g., by touch sensing circuit 1102). In these examples, interrupt signals can be used to indicate (e.g., to auxiliary processor 1104) when a finger is detected on the surface of the device.

Figure 12A:
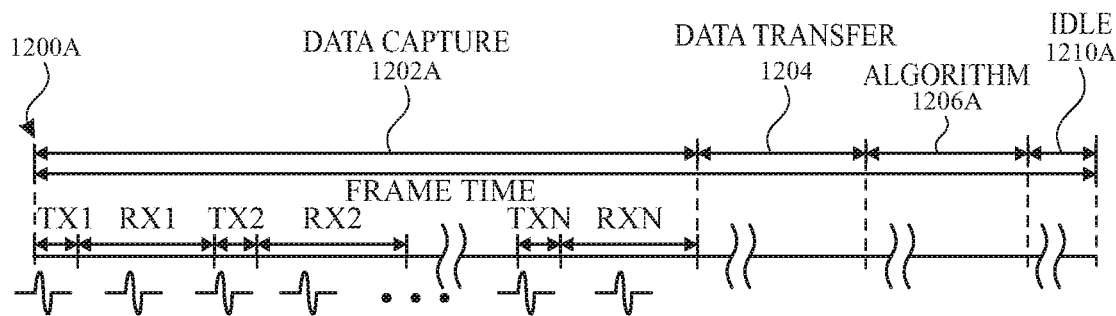
FIGS. 12A-12D illustrate exemplary timing diagrams for acoustic touch sensing systems corresponding to the exemplary architectures of FIGS. 11A-11D according to examples of the disclosure.

FIG. 12A illustrates an exemplary timing diagram 1200A for an acoustic touch sensing system corresponding to the exemplary architecture of FIG. 11A according to examples of the disclosure. Timing diagram 1200A includes one acoustic touch scanning frame. During an acoustic touch data capture period 1202A, acoustic touch sensing circuit 1102 can transmit acoustic waves and receive reflections using one or more transducers. As described above with respect to FIG. 5B, the transmit and receive functions for each transducer can be performed in a series of measurements. Acoustic touch data captured during the acoustic touch data capture period 1202A can be averaged to reduce the size of the data. During an acoustic data transfer period 1204, the averaged data (or otherwise processed data) can be transferred from acoustic touch sensing circuit 1102 to auxiliary processor 1104. During algorithm period 1206A, the auxiliary processor 1104 can process the acoustic touch data and determine a presence and/or location of an object touching a surface. The remaining portion of the acoustic touch scanning frame can be an idle period 1210A. Although FIG. 12A illustrates one acoustic touch sensing scan (e.g., an active mode detection scan), it should be understood that, in some examples, a low power detection scan and processing and an active mode detection scan and processing can occur in separate acoustic touch scanning frames. In some examples, both a low power detection scan and processing and an active mode detection scan and processing can occur in the same acoustic touch scanning frame (e.g., low power data capture, low power data transfer, low power algorithm, active mode data capture, active mode data transfer, active mode algorithm, idle).

Figure 13A:
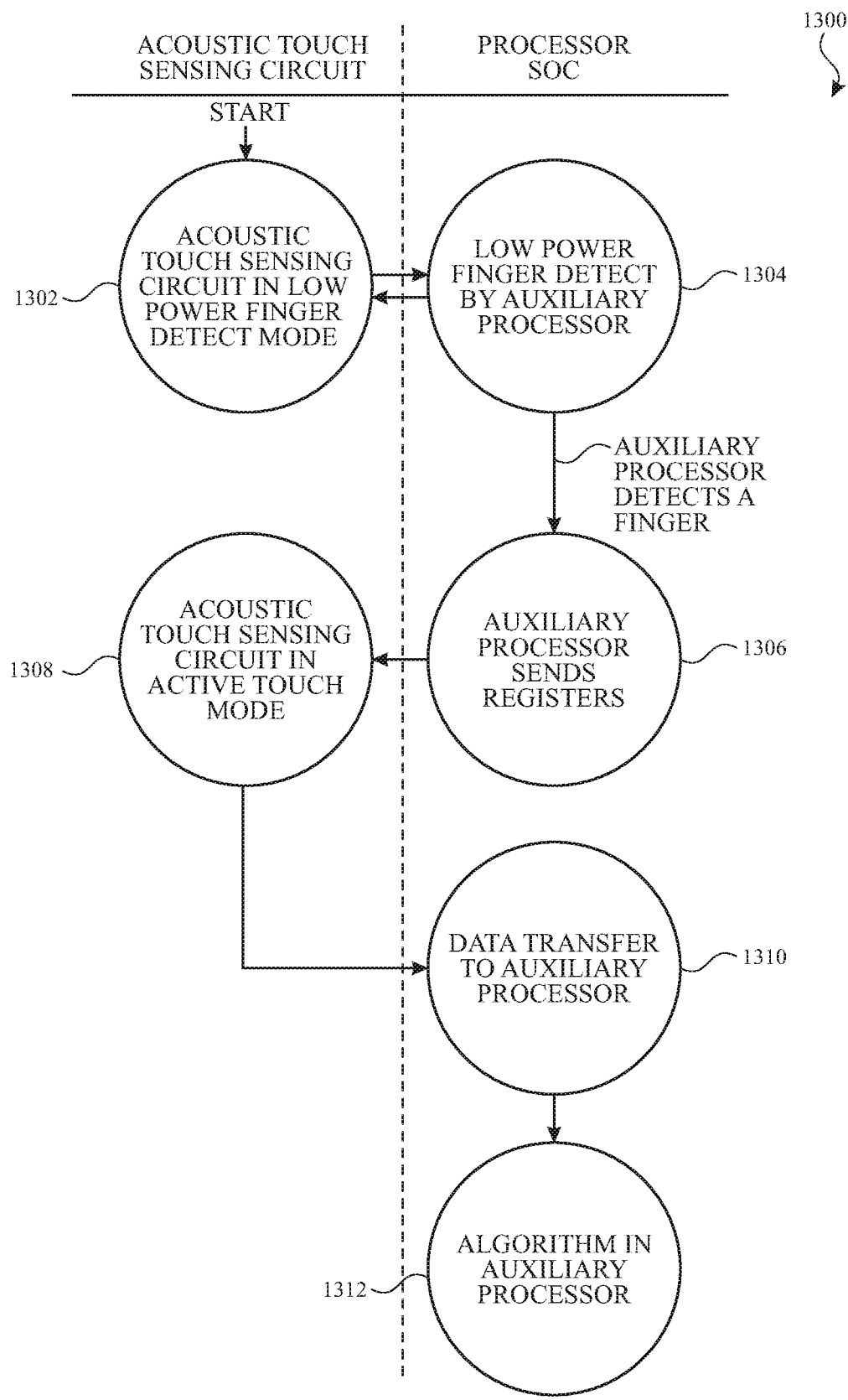
FIGS. 13A-13D illustrate exemplary flow diagrams for acoustic touch sensing systems corresponding to the exemplary architectures of FIGS. 11A-11D according to examples of the disclosure.

FIG. 13A illustrates an exemplary flow diagram for an acoustic touch sensing system corresponding to the exemplary architecture of FIG. 11A according to examples of the disclosure. Flow chart 1300 distinguishes between operations performed by an acoustic touch sensing circuit (e.g., acoustic touch sensing circuit 1102) and operations performed by one or more processors of a processor SoC (e.g., auxiliary processor 1104). At 1302, the acoustic touch sensing circuit can perform a low power detection scan as described herein. At 1304, an auxiliary processor can receive the results (acoustic touch data) from the acoustic touch sensing circuit and process the results to determine whether an object (e.g., a finger) is touching the surface. When no object is detected, the auxiliary processor can cause the acoustic touch sensing circuit to perform a subsequent low power detection scan (e.g., in a subsequent scan frame). When an object is detected, at 1306, the auxiliary processor can prepare the acoustic touch sensing circuit for active mode detection scans (e.g., by sending register information). At 1308, the acoustic touch sensing circuit can perform an active mode detection scan as described herein (e.g., in the same or in a subsequent scan frame). At 1310, the auxiliary processor can receive the results (acoustic touch data) from the active mode detection scan. At 1312, the auxiliary processor can process the results to determine a location of the object (e.g., a finger) touching the surface.

The low power detection scan and corresponding processing at 1302 and 1304 can correspond to a low power mode. The active mode detection scan and corresponding processing at 1308, 1310 and 1312 can correspond to an active mode. As illustrated in flow chart 1300, the acoustic touch sensing system can transition from the low power mode to the active mode upon detection of an object. The process of flow chart 1300 can continue from 1308 while the system remains in the active mode. The system can transition from the active mode to the low power mode automatically when no object is detected for a threshold period of time (or a threshold number of scans), for example, or manually based on user input (e.g., pressing a button to power off the display).

Figure 11B:
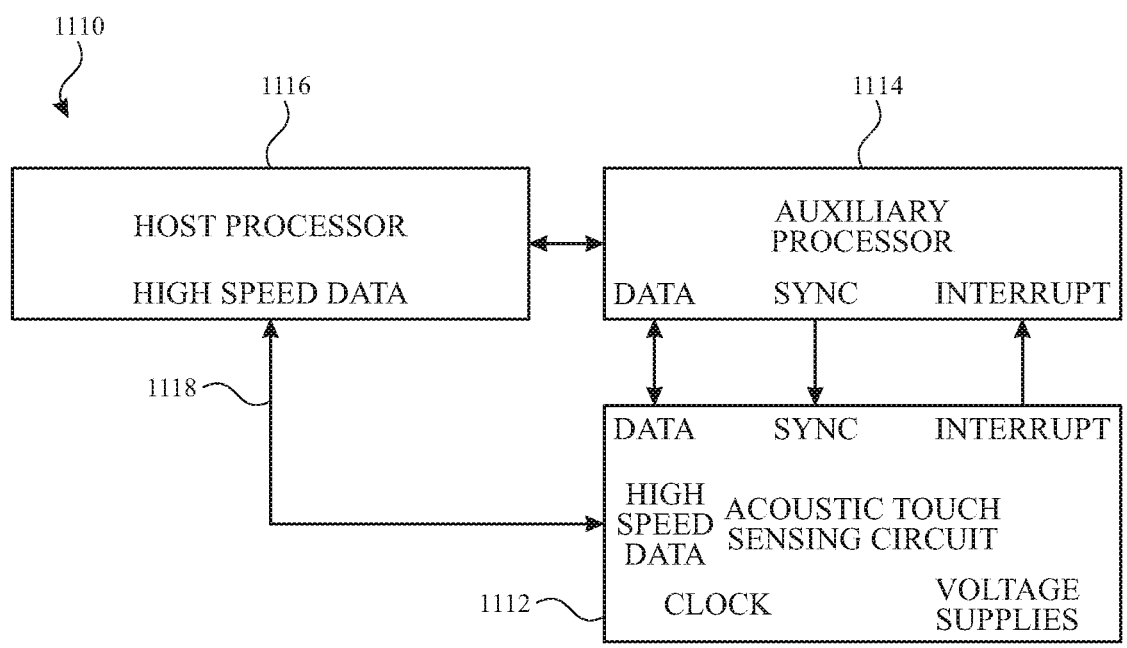

FIG. 11B illustrates a second exemplary architecture 1110 including acoustic touch sensing circuit 1112, auxiliary processor 1114 and host processor 1116. In the second exemplary architecture 1110, acoustic touch sensing circuit 1112 can perform acoustic touch sensing scans and generate acoustic touch data. The acoustic touch data can be transferred to auxiliary processor 1114 and/or host processor 1116 for processing according one or more touch sensing algorithms. For example, in a low-power mode, acoustic touch sensing circuit 1112 can perform a low power detection scan as described herein. The acoustic touch data can be transmitted to auxiliary processor 1114 via a communication channel and processed by auxiliary processor 1114 to determine the presence or absence of an object touching the sensing surface (e.g., as described with reference to FIG. 11A. Once an object is detected touching the sensing surface, the system can transition from the low-power mode to an active mode, and acoustic touch sensing circuit 1112 can perform an active mode detection scan as described herein. The acoustic touch data corresponding to the active mode detection scan can be transmitted to host processor 1116 via a high-speed communication channel 1118 and processed by host processor 1116 to determine the location of the object. In some examples, the data transfer via high-speed communication channel 1118 can be done in a burst mode. In some examples, determining the location of the object can include determining the area and/or centroid of the object. Host processor 1116 can perform an action based on the location.

In some examples, high-speed communication channel 1118 can provide sufficient bandwidth to transfer raw acoustic touch data to host processor 1116, without requiring processing by acoustic touch sensing circuit 1112. In some examples, the high-speed communication channel can include circuitry to serialize the acoustic touch data (e.g., a serializer) and transfer the serialized acoustic touch data using a low-voltage differential signal (LVDS) communication circuit. In some examples, other I/O blocks can be utilized for the data transfer. In some examples, acoustic touch sensing circuit 1112 can perform some processing (e.g., averaging) before sending acoustic touch data to host processor 1116. In some examples, the amount of data resulting from a low power detection scan can be relatively small (compared with an active mode detection scan) such that the raw acoustic touch data can be transferred to auxiliary processor 1114 without requiring processing by acoustic touch sensing circuit 1112. In some examples, acoustic touch sensing circuit 1112 can perform some processing (e.g., averaging) before sending acoustic touch data to host processor 1116. The other aspects of operation (e.g., data transfer from auxiliary processor 1114 to acoustic touch sensing circuit 1112, synchronization signals and interrupt signals, etc.) can be the same as or similar to the description above with reference to FIG. 11A, and will be omitted here.

Figure 12B:
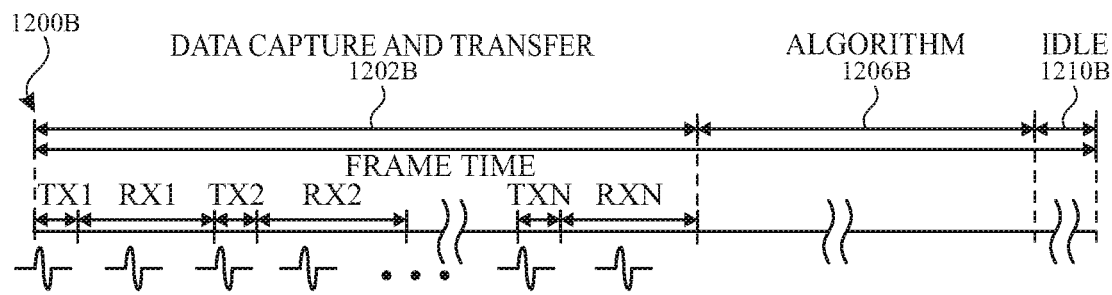

FIG. 12B illustrates an exemplary timing diagram 1200B for an acoustic touch sensing system corresponding to the exemplary architecture of FIG. 11B according to examples of the disclosure. Timing diagram 1200B includes one acoustic touch scanning frame for an active mode scan. During an acoustic touch data capture and transfer period 1202B, acoustic touch sensing circuit 1112 can transmit acoustic waves and receive reflections using one or more transducers, and captured acoustic touch data can be transferred to host processor 1116 via high-speed communication channel 1118. During algorithm period 1206B, host processor 1116 can process the acoustic touch data and determine a location of an object touching a surface. The remaining portion of the acoustic touch scanning frame can be an idle period 1210B. Although FIG. 12B illustrates one acoustic touch sensing scan (e.g., an active mode scan), it should be understood that, in some examples, a low power detection scan and processing and an active mode detection scan and processing can occur in separate acoustic touch scanning frames. In some examples, both a low power detection scan and processing and an active mode detection scan and processing can occur in the same acoustic touch scanning frame (e.g., low power data capture, low power data transfer, low power algorithm, active mode data capture, active mode data transfer, active mode algorithm, idle).

Figure 13B:
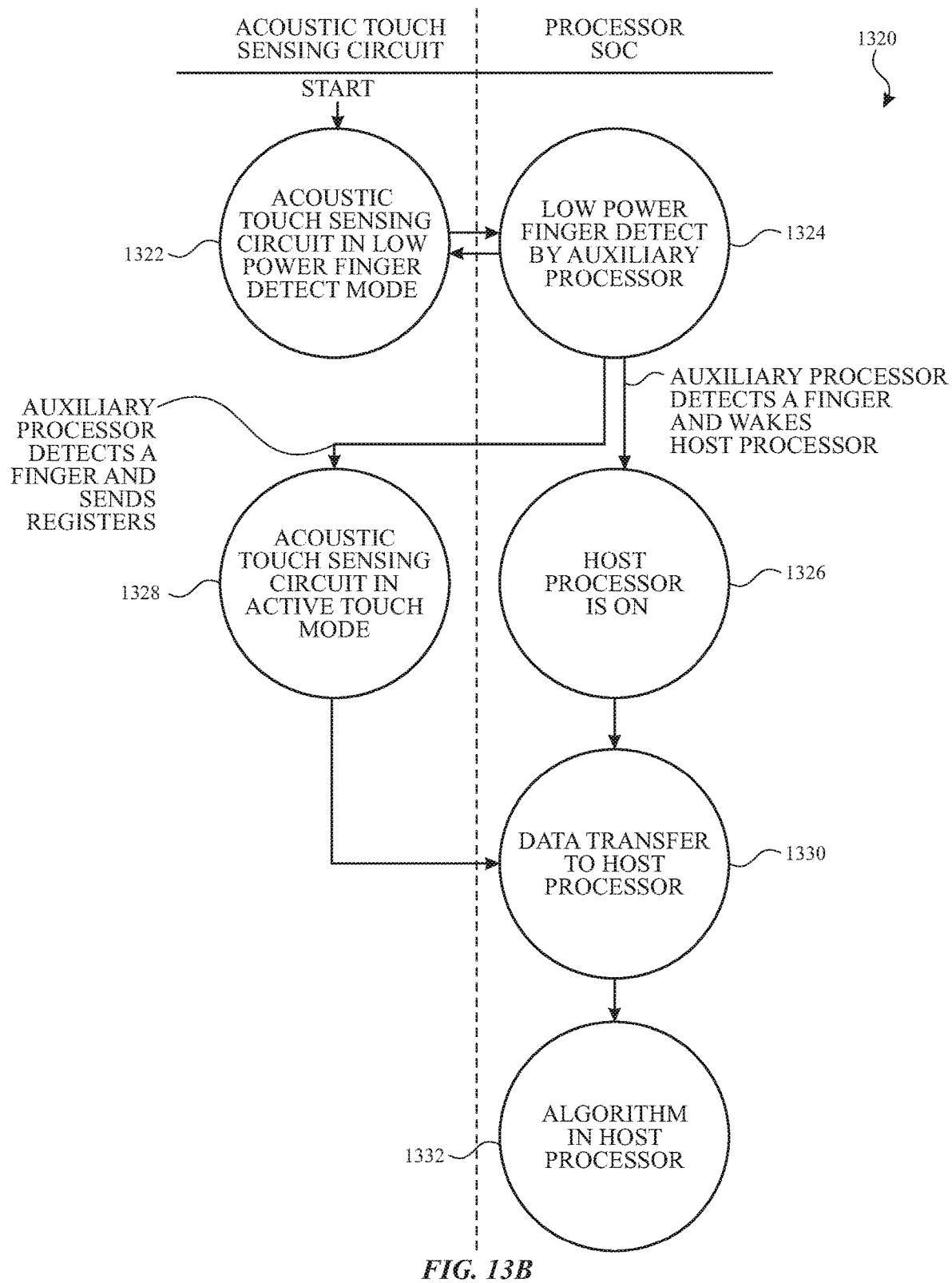

FIG. 13B illustrates an exemplary flow diagram for an acoustic touch sensing system corresponding to the exemplary architecture of FIG. 11B according to examples of the disclosure. Flow chart 1320 distinguishes between operations performed by an acoustic touch sensing circuit (e.g., acoustic touch sensing circuit 1112) and operations performed by one or more processors of a processor SoC (e.g., auxiliary processor 1114, host processor 1116). At 1322, the acoustic touch sensing circuit can perform a low power detection scan as described herein. At 1324, an auxiliary processor can receive the results (acoustic touch data) from the acoustic touch sensing circuit and process the results to determine whether an object (e.g., a finger) is touching the surface. When no object is detected, the auxiliary processor can cause the acoustic touch sensing circuit to perform a subsequent low power detection scan (e.g., in a subsequent scan frame). When an object is detected, the auxiliary processor can prepare the acoustic touch sensing circuit for active mode detection scans (e.g., by sending register information) and/or wake up a host processor at 1326. At 1328, the acoustic touch sensing circuit can perform an active mode detection scan as described herein. At 1330, the host processor can receive the results (acoustic touch data) of the active mode detection scan from the acoustic touch sensing circuit. At 1332, the host processor can process the results to determine a location of the object (e.g., a finger) touching the surface.

The low power detection scan and corresponding processing at 1322 and 1324 can correspond to a low power mode. The active mode detection scan and corresponding processing at 1328, 1330 and 1332 can correspond to an active mode. As illustrated in flow chart 1320, the acoustic touch sensing system can transition from the low power mode to the active mode upon detection of an object. The process of flow chart 1320 can continue from 1328 while the system remains in the active mode. The system can transition from the active mode to the low power mode automatically when no object is detected for a threshold period of time (or a threshold number of scans), for example, or manually based on user input (e.g., pressing a button to power off the display).

Although the second exemplary architecture 1110 illustrated in and described with reference to FIGS. 11B, 12B and 13B performs processing of acoustic touch data from low power detection scans in auxiliary processor 1114 and acoustic touch data from active mode detection scans in host processor 1116, it should be understood that in some examples, host processor 1116 can perform processing for both low power detection scans and active mode detection scans.

Figure 11C:
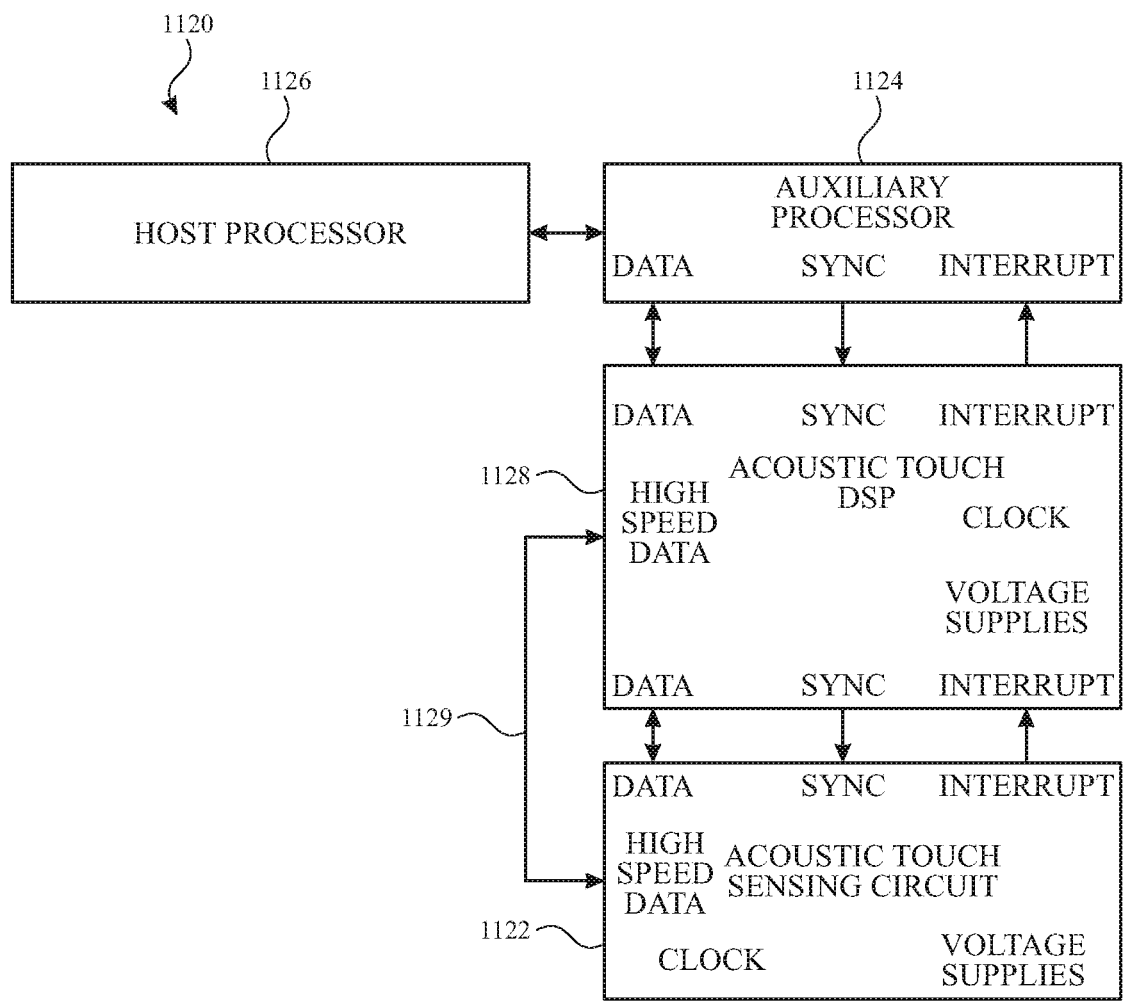

FIG. 11C illustrates a third exemplary architecture 1120 including acoustic touch sensing circuit 1122, auxiliary processor 1124, host processor 1126, and acoustic touch digital signal processor (DSP) 1128 (which may include a microcontroller). In some examples, acoustic touch DSP 1128 can be integrated with acoustic touch sensing circuit 1122. In the third exemplary architecture 1120, acoustic touch sensing circuit 1122 can perform acoustic touch sensing scans and generate acoustic touch data. The acoustic touch data can be transferred to acoustic touch DSP 1128 for processing according one or more touch sensing algorithms. For example, in a low-power mode, acoustic touch sensing circuit 1122 can perform a low power detection scan as described herein. The acoustic touch data can be transmitted to acoustic touch DSP 1128 via a communication channel and processed by acoustic touch DSP 1128 to determine the presence or absence of an object touching the sensing surface. In some examples, acoustic touch sensing circuit 1122 can process the acoustic touch data to determine the presence or absence of the object touching the surface. Once an object is detected touching the sensing surface, the system can transition from the low-power mode to an active mode, and acoustic touch sensing circuit 1122 can perform an active mode detection scan as described herein. The acoustic touch data corresponding to the active mode detection scan can be transmitted to acoustic touch DSP 1128 via a high-speed communication channel 1129 and processed by acoustic touch DSP 1128 to determine the location of the object. In some examples, determining the location of the object can include determining the area and/or centroid of the object. The location can be passed to auxiliary processor 1124 and/or host processor 1126, and auxiliary processor 1124 and/or host processor 1126 can perform an action based on the location.

In some examples, high-speed communication channel 1129 can provide sufficient bandwidth to transfer raw acoustic touch data to acoustic touch DSP 1128, without requiring processing by acoustic touch sensing circuit 1122. In some examples, high-speed communication channel 1129 can include circuitry to serialize the acoustic touch data (e.g., CMOS serializer) and transfer the serialized acoustic touch data using a low-voltage differential signal (LVDS) communication circuit. In some examples, acoustic touch sensing circuit 1122 can perform some processing (e.g., averaging) before sending acoustic touch data to acoustic touch DSP 1128. In some examples, the amount of data resulting from a low power detection scan can be relatively small (compared with an active mode detection scan) such that the raw acoustic touch data can be transferred to acoustic touch DSP 1128 without requiring processing by acoustic touch sensing circuit 1122. In some examples, the data from low power detection scans can also be transferred to acoustic touch DSP 1128 via high-speed communication channel 1129.

Data transfer from auxiliary processor 1124 to acoustic touch sensing circuit 1122, synchronization signals and interrupt signals can be the same as or similar to the description above with reference to FIG. 11A, except that, in some examples, the various signals and data can pass through acoustic touch DSP 1128.

Figure 12C:
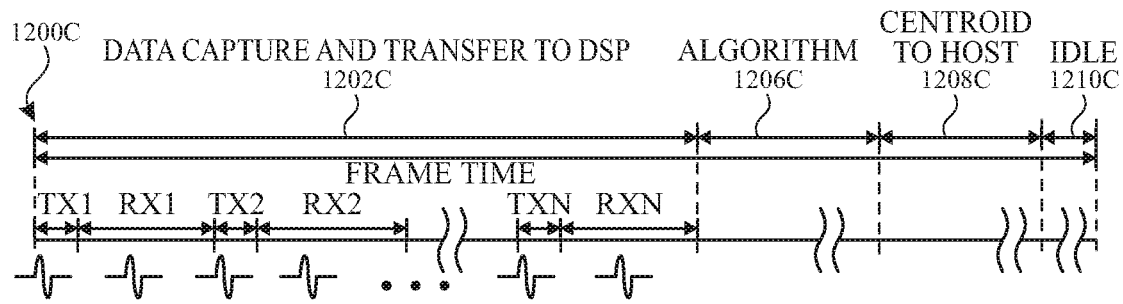

FIG. 12C illustrates an exemplary timing diagram 1200C for an acoustic touch sensing system corresponding to the exemplary architecture of FIG. 11C according to examples of the disclosure. Timing diagram 1200C includes one acoustic touch scanning frame for an active mode scan. During an acoustic touch data capture and transfer period 1202C, acoustic touch sensing circuit 1122 can transmit acoustic waves and receive reflections using one or more transducers, and captured acoustic touch data can be transferred to acoustic touch DSP 1128 via high-speed communication channel 1129. During algorithm period 1206C, acoustic touch DSP 1128 can process the acoustic touch data and determine a location of an object touching a surface. During location transfer period 1208C, the location of the object can be transferred to auxiliary processor 1124 and/or host processor 1126. The remaining portion of the acoustic touch scanning frame can be an idle period 1210C. Although FIG. 12C illustrates one acoustic touch sensing scan (e.g., an active mode scan), it should be understood that, in some examples, a low power detection scan and processing and an active mode detection scan and processing can occur in separate acoustic touch scanning frames. In some examples, both a low power detection scan and processing and an active mode detection scan and processing can occur in the same acoustic touch scanning frame (e.g., low power data capture, low power data transfer, low power algorithm, active mode data capture, active mode data transfer, active mode algorithm, idle).

Figure 13C:
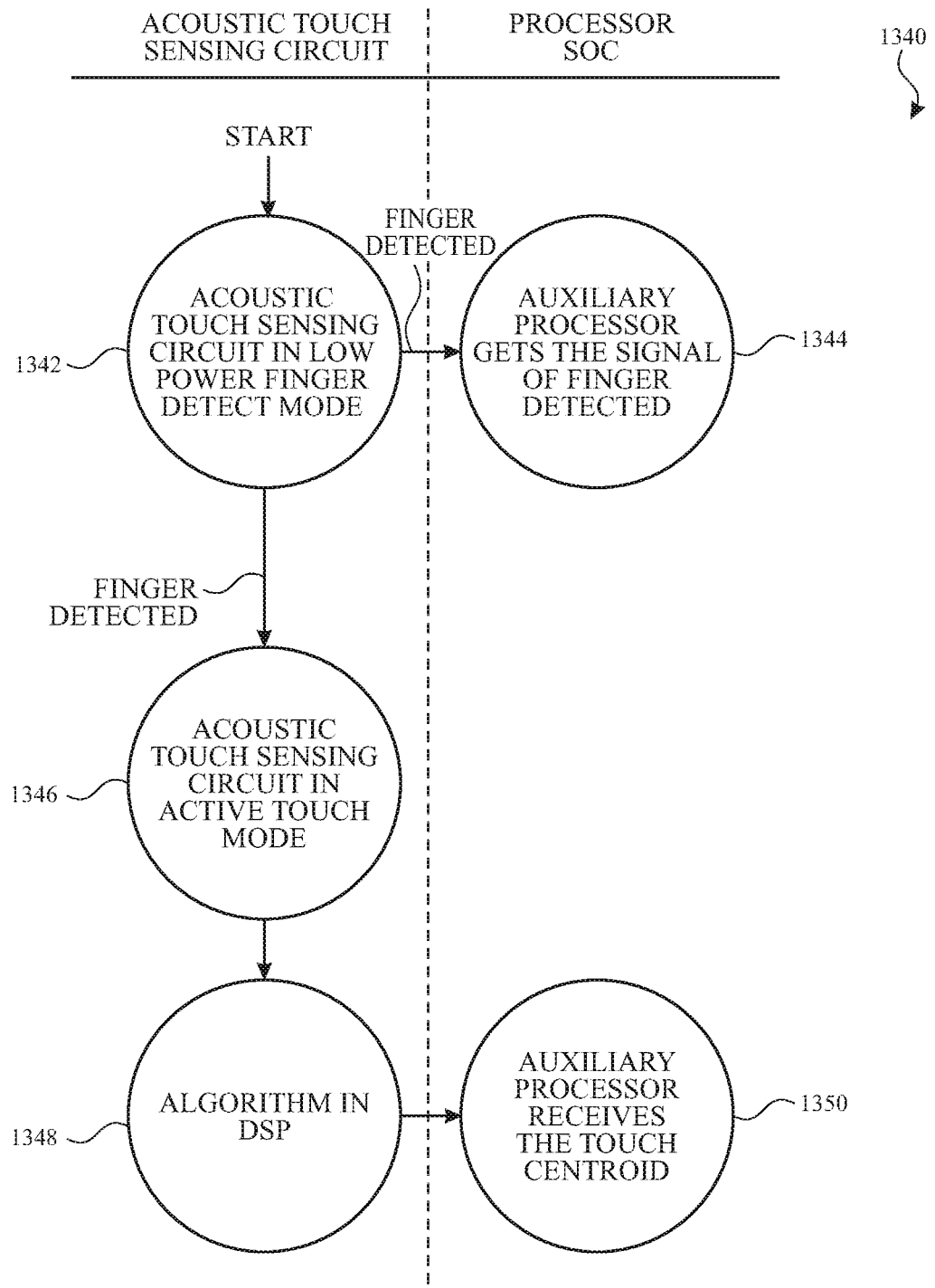

FIG. 13C illustrates an exemplary flow diagram for an acoustic touch sensing system corresponding to the exemplary architecture of FIG. 11C according to examples of the disclosure. Flow chart 1340 distinguishes between operations performed by an acoustic touch sensing circuit (e.g., acoustic touch sensing circuit 1122 and acoustic touch DSP 1128) and operations performed by one or more processors of a processor SoC (e.g., auxiliary processor 1124, host processor 1126). At 1342, the acoustic touch sensing circuit can perform a low power detection scan as described herein and process (e.g., in acoustic touch sensing circuit 1122 or acoustic touch DSP 1128) the results to determine whether an object (e.g., a finger) is touching the surface. When no object is detected, the touch sensing circuit 1122 can perform a subsequent low power detection scan (e.g., in a subsequent scan frame). When an object is detected, the acoustic touch sensing circuit can notify the auxiliary processor and/or host processor at 1344. Additionally, at 1346, the acoustic touch sensing circuit can perform an active mode detection scan as described herein. At 1348, the acoustic touch DSP 1128 can receive the results (acoustic touch data) of the active mode detection scan from the acoustic touch sensing circuit, and acoustic touch DSP 1128 can process the results to determine a location of the object (e.g., a finger) touching the surface. At 1350, the acoustic touch DSP 1128 can transfer the location to the auxiliary processor and/or host processor.

The low power detection scan and corresponding processing at 1342 can correspond to a low power mode. The active mode detection scan and corresponding processing at 1346, 1348 and 1350 can correspond to an active mode. As illustrated in flow chart 1340, the acoustic touch sensing system can transition from the low power mode to the active mode upon detection of an object. The process of flow chart 1340 can continue from 1346 while the system remains in the active mode. The system can transition from the active mode to the low power mode automatically when no object is detected for a threshold period of time (or a threshold number of scans), for example, or manually based on user input (e.g., pressing a button to power off the display).

Figure 11D:
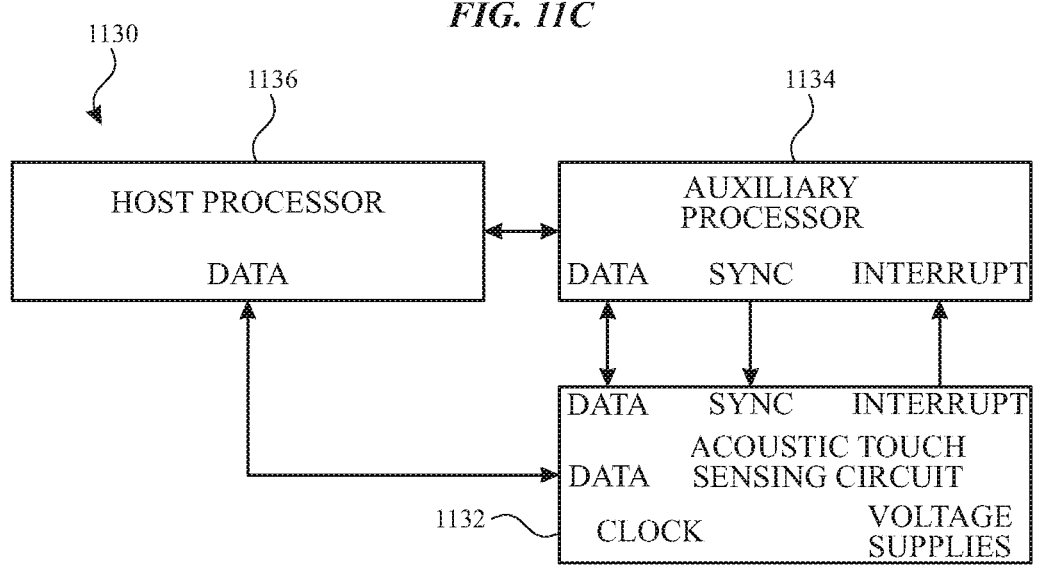

FIG. 11D illustrates a fourth exemplary architecture 1130 including acoustic touch sensing circuit 1132, auxiliary processor 1134, and host processor 1136. In the fourth exemplary architecture 1130, acoustic touch sensing circuit 1132 can perform acoustic touch sensing scans and generate acoustic touch data. The acoustic touch data (e.g., for a low-power detection scan) can be processed by the acoustic touch sensing circuit 1132 to determine the presence or absence of the object touching the surface. Once an object is detected touching the sensing surface, the system can transition from the low-power mode to an active mode, and acoustic touch sensing circuit 1132 can perform an active mode detection scan as described herein. The acoustic touch data corresponding to the active mode detection scan can be processed by acoustic touch sensing circuit 1132 to determine the location of the object. In some examples, determining the location of the object can include determining the area and/or centroid of the object. The presence and/or location of the object can be passed to auxiliary processor 1134 and/or host processor 1136, and auxiliary processor 1134 and/or host processor 1136 can perform an action based on the presence and/or location of the object.

In some examples, the amount of post-processing information (e.g., centroid) can be relatively small (compared with raw acoustic touch data) such that the information can be transferred to auxiliary processor 1134 and/or 1136 via a serial communication bus (e.g., SPI), without a high-speed data channel.

Data transfer from auxiliary processor 1134 to acoustic touch sensing circuit 1132, synchronization signals and interrupt signals can be the same as or similar to the description above with reference to FIG. 11A. Although separate data communication channels are illustrated between acoustic touch sensing circuit 1132 and each of auxiliary processor 1134 and host processor 1136, the data communication channel can be a shared bus (e.g., shared SPI bus).

Figure 12D:
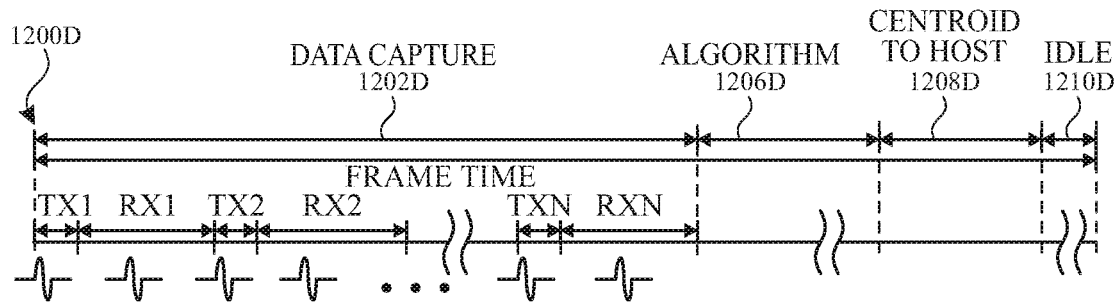

FIG. 12D illustrates an exemplary timing diagram 1200D for an acoustic touch sensing system corresponding to the exemplary architecture of FIG. 11D according to examples of the disclosure. Timing diagram 1200D includes one acoustic touch scanning frame for an active mode scan. During an acoustic touch data capture period 1202D, acoustic touch sensing circuit 1132 can transmit acoustic waves and receive reflections using one or more transducers, and during algorithm period 1206D, the acoustic touch sensing circuit 1132 can process the acoustic touch data and determine a location of an object touching a surface. During location transfer period 1208D, the location of the object can be transferred to auxiliary processor 1134 and/or host processor 1136. The remaining portion of the acoustic touch scanning frame can be an idle period 1210D. Although FIG. 12D illustrates one acoustic touch sensing scan (e.g., an active mode scan), it should be understood that, in some examples, a low power detection scan and processing, an active mode detection scan and processing can occur in separate acoustic touch scanning frames. In some examples, both a low power detection scan and processing and an active mode detection scan and processing can occur in the same acoustic touch scanning frame (e.g., low power data capture, low power data transfer, low power algorithm, active mode data capture, active mode data transfer, active mode algorithm, idle).

Figure 13D:
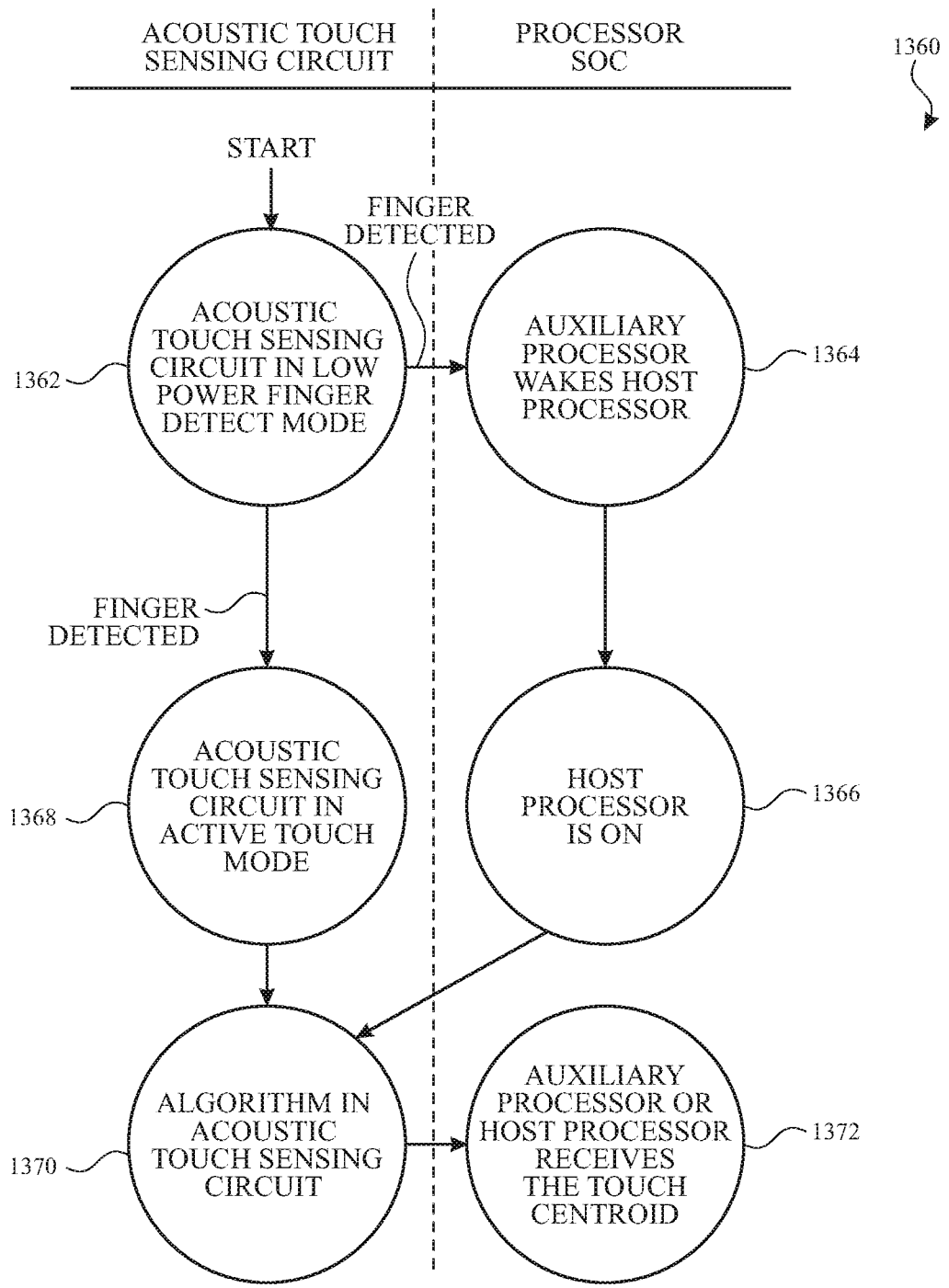

FIG. 13D illustrates an exemplary flow diagram for an acoustic touch sensing system corresponding to the exemplary architecture of FIG. 11D according to examples of the disclosure. Flow chart 1360 distinguishes between operations performed by an acoustic touch sensing circuit (e.g., acoustic touch sensing circuit 1132) and operations performed by one or more processors of a processor SoC (e.g., auxiliary processor 1134, host processor 1136). At 1362, the acoustic touch sensing circuit can perform a low power detection scan as described herein and process the results to determine whether an object (e.g., a finger) is touching the surface. When no object is detected, the touch sensing circuit 1132 can perform a subsequent low power detection scan (e.g., in a subsequent scan frame). When an object is detected, the acoustic touch sensing circuit can notify the auxiliary processor. At 1364, the auxiliary processor can wake the host processor in response at 1366. Additionally, at 1368, the acoustic touch sensing circuit can perform an active mode detection scan as described herein. At 1370, the acoustic touch sensing circuit 1132 can process the results (acoustic touch data) to determine a location of the object (e.g., a finger) touching the surface. At 1372, the location can be transferred to and received by to the auxiliary processor and/or host processor.

The low power detection scan and corresponding processing at 1362 can correspond to a low power mode. The active mode detection scan and corresponding processing at 1368 and 1370 can correspond to an active mode. As illustrated in flow chart 1360, the acoustic touch sensing system can transition from the low power mode to the active mode upon detection of an object. The process of flow chart 1360 can continue from 1368 while the system remains in the active mode. The system can transition from the active mode to the low power mode automatically when no object is detected for a threshold period of time (or a threshold number of scans), for example, or manually based on user input (e.g., pressing a button to power off the display).

The acoustic touch sensing circuit, as described herein, can be powered down or put in a low power state when not in use. In some examples, the acoustic touch sensing circuit can be on only during acoustic touch detection scans (e.g., during Tx and Rx operations). In some examples, the acoustic touch sensing circuit can be on in a low power state at all time (e.g., running at a low frame rate, performing a low power detection scan), and can transition into an active mode state when an object is detected.

Figure 14A:
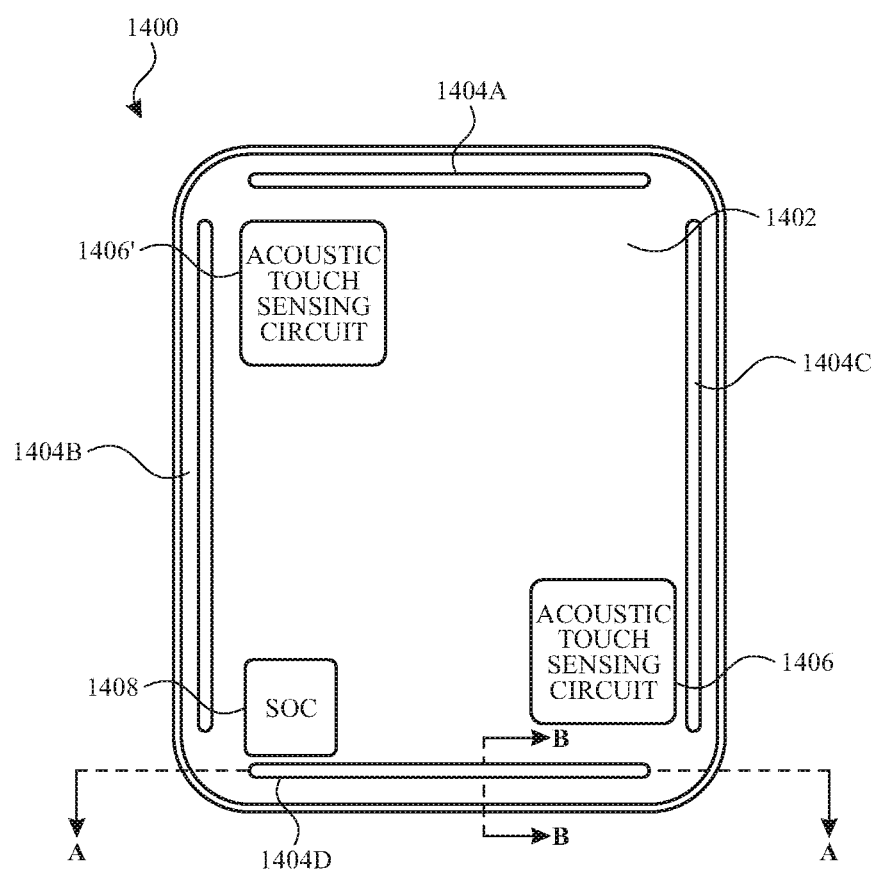

As described above, acoustic touch sensing scans (detection scans) performed by an acoustic touch sensing circuit can involve stimulating and sensing one or more transducers. FIGS. 14A-14F illustrate exemplary integration of an acoustic touch sensing circuit and/or one or more processors (e.g., processor SoC) with transducers mechanically and acoustically coupled to a surface (e.g., glass, plastic, metal, etc.). FIG. 14A illustrates an exemplary acoustic touch sensing system configuration 1400 using four acoustic transducers (transducers) 1404A-D mounted along (or otherwise coupled to) four edges of a surface 1402 (e.g., underside of a cover glass). Transducers 1404A-D can be configured to generate acoustic waves (e.g., shear horizontal waves) and to receive the reflected acoustic waves. One or more acoustic touch sensing circuits can be included. For example, FIG. 14A illustrates a first acoustic touch sensing circuit 1406 positioned proximate to neighboring edges of transducers 1404C and 1404D. Likewise, a second acoustic touch sensing circuit 1406' can be positioned proximate to neighboring edges of transducers 1404A and 1404B. Placement of acoustic touch sensing circuits as illustrated can reduce routing between transducers 1404A-D and the respective acoustic touch sensing circuits. Processor SoC 1408 can be coupled to the one or more acoustic touch sensing circuits to perform various processing as described herein. In some examples, some or all of the drive circuitry (Tx circuitry) and/or some or all of the receive circuitry (Rx circuitry) of the touch sensing circuit can be implemented on different silicon chips.

In some examples, transducers 1404A-D can be coupled to acoustic touch sensing circuits via a flex circuit (e.g., flexible printed circuit board). FIG. 14B illustrates a view 1410 of exemplary acoustic touch sensing system configuration 1400 along view AA of FIG. 14A. As illustrated in FIG. 14B, transducer 1404D can be coupled to surface 1402 by a bonding between a bond metal layer 1414 on an underside of surface 1402 and a first signal metal layer 1412A on one side of transducer 1404D. The first signal metal layer 1412A on one side of transducer 1404D and a second signal metal layer 1412B on a second side of transducer 1404D can provide two terminals of transducer 1404D to which stimulation signals can be applied and reflections can be received. The first signal metal layer 1412A can wrap around from one side of transducer 1404D to an opposite side to enable bonding of both signal metal layers of the transducer 1404D on one side of transducer 1404D. In FIG. 14B, acoustic touch sensing circuit 1406 can be coupled to a flex circuit 1416 and the flex circuit can be respectively bonded to signal metal layers 1412A and 1412B of transducer 1404D (e.g., via bonds 1418). Likewise, transducer 1404C can be coupled to surface 1402 (e.g., via bond metal layer/first signal metal layer bonding) and to acoustic touch sensing circuit 1406 by bonding a flex circuit to signal metal layers on the transducer side opposite the surface. Similarly, transducers 1404A and 1404B can be coupled to surface 1402 and second acoustic touch sensing circuit 1406'.

In some examples, transducers 1404A-D can be coupled to acoustic touch sensing circuits via an interposer (e.g., rigid printed circuit board). FIG. 14C illustrates a view 1420 of exemplary acoustic touch sensing system configuration 1400 along view AA. Transducers 1404C and 1404D can be coupled to surface 1402 as illustrated in and described with respect to FIG. 14B. Rather than coupling acoustic touch sensing circuit 1406 to a flex circuit 1416 and bonding the flex circuit to signal metal layers 1412A and 1412B of transducer 1404D, however, in FIG. 14C, an interposer 1422 can be bonded to signal metal layers 1412A and 1412B of transducer 1404D (e.g., via bonds 1424). Acoustic touch sensing circuit 1406 can be bonded or otherwise coupled to interposer 1422. Similarly, transducers 1404A and 1404B can be coupled to surface 1402 and second acoustic touch sensing circuit 1406'.

In some examples, transducers 1404A-D can be directly bonded to acoustic touch sensing circuits. FIG. 14D illustrates a view 1430 of exemplary acoustic touch sensing system configuration 1400 along view AA. Transducers 1404C and 1404D can be coupled to surface 1402 as illustrated in and described with respect to FIG. 14B. Rather than coupling acoustic touch sensing circuit 1406 to a flex circuit or interposer and bonding the flex circuit/interposer to signal metal layers 1412A and 1412B of transducer 1404D, however, in FIG. 14D, an acoustic touch sensing circuit 1406 can be bonded to signal metal layers 1412A and 1412B of transducer 1404D (e.g., via bonds 1432). Similarly, transducers 1404A and B can be coupled to surface 1402 and second acoustic touch sensing circuit 1406'.

In FIGS. 14B-D, signal metal layer 1412A was routed away from surface 1402 and both signal metal layers 1412A and 1412A were bonded to an acoustic touch sensing circuit via bonding on a side of transducer 1404D separate from surface 1402 (e.g., via flex circuit, interposer or direct bond). In some examples, the acoustic touch sensing circuits can be bonded to routing on surface 1402. FIG. 14E illustrates a view 1440 of exemplary acoustic touch sensing system configuration 1400 along view AA. Unlike in FIG. 14A, for example, transducer 1404D can be coupled to surface 1402 via two separate portions of metal bond layer. A first portion of the metal bond layer 1442A can be bonded to a first signal metal layer 1444A, and a second portion of the metal bond layer 1442B can be bonded to a second signal metal layer 1444B (which can optionally be wrapped around transducer 1404D). Although not shown, the first and second portions of the metal bond layer 1442A and 1442B can be routed along the underside of surface 1402 and bond connections can be made with a flex circuit or interposer including an acoustic touch sensing circuit, or directly to the acoustic touch sensing circuit. Likewise, transducer 1404C can be coupled to surface 1402 and acoustic touch sensing circuit 1406 via routing on the surface. Similarly, transducers 1404A and 1404B can be coupled to surface 1402 and coupled to second acoustic touch sensing circuit 1406' via routing on the surface. FIG. 14F illustrates a view 1450 of exemplary acoustic touch sensing system configuration 1400 along view BB of FIG. 14A. As described in FIG. 14E, the first and second signal metal layers 1452 of transducer 1404D can be routed along the surface (e.g., wrapping around an edge of surface 1402) and thereafter bonded directly or indirectly to acoustic touch sensing circuit 1406.

It should be understood that the exemplary integration of an acoustic touch sensing circuit, transducers and a surface described herein are exemplary and many other techniques can be used. Transducers can be transducers can be attached to the edge of the cover glass or underneath the cover glass. In some examples, the transducers can be integrated in a notch in the cover glass. In all of the integrations of the transducers and the cover glass, the attachment and the bonding should be done in a way that can allow for the desired acoustic wave to be generated and propagated in the cover glass (or on top of the cover glass). In some examples, matching or backing materials will be added to the transducers to increase their performance as well as the matching to the target surface medium (e.g., cover glass).

Figure 15:
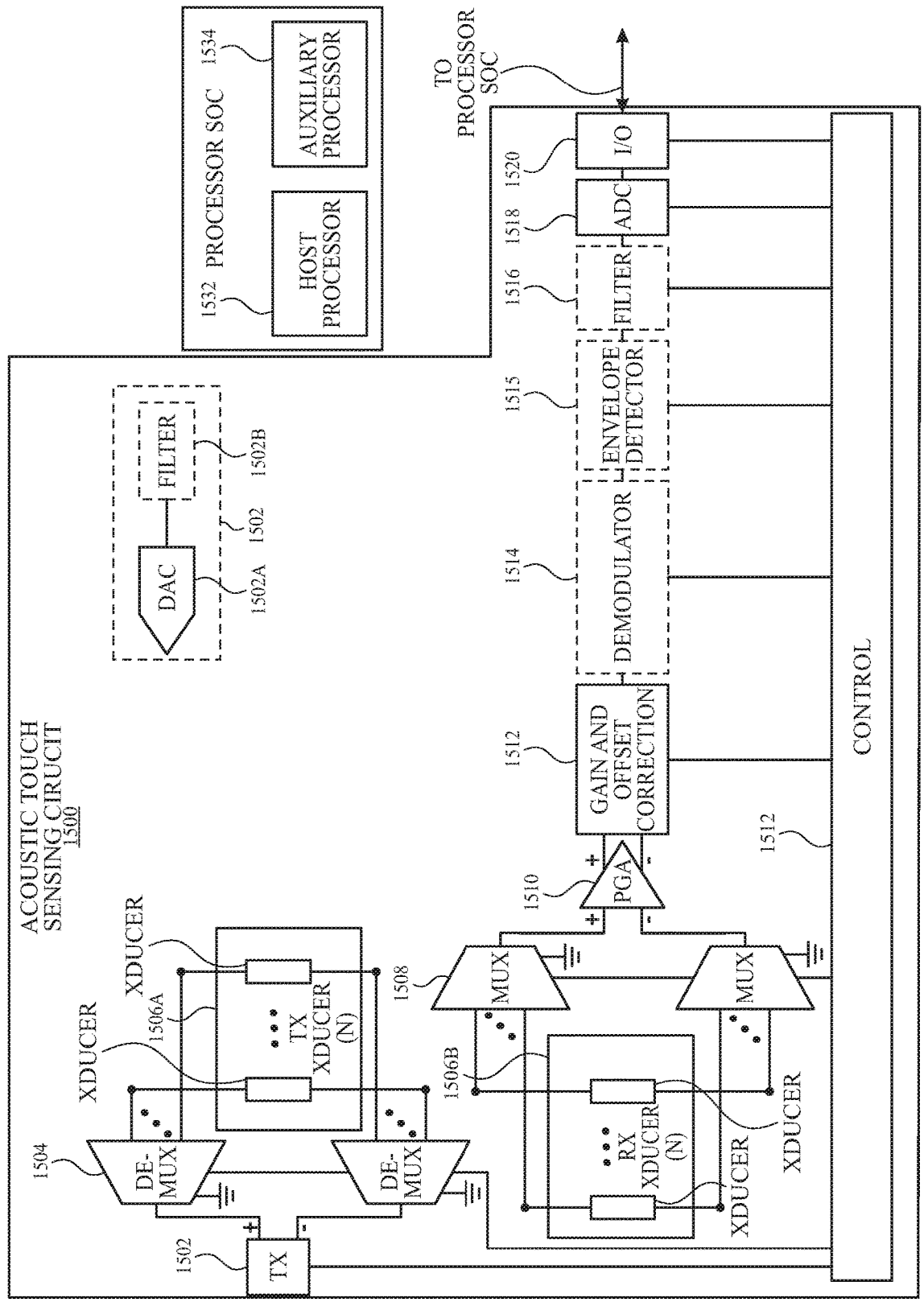
FIG. 15 illustrates an exemplary configuration of an acoustic touch sensing circuit according to examples of the disclosure.

As described above, in some examples, the transmitter and receiver functions can be separated such that the transmission of acoustic energy at 302 and receiving acoustic energy at 304 may not occur at the same transducer. In some examples, the transmit and receive transducer can be made of different materials to maximize the transmit and receive efficiencies, respectively. In some examples, having separate transmit and receive transducers can allow for high voltage transmit circuitry and low voltage receive circuitry to be separated. FIG. 15 illustrates an exemplary configuration of an acoustic touch sensing circuit 1500 according to examples of the disclosure. The configuration of FIG. 15, like the configuration of FIG. 4, can include an acoustic touch sensing circuit 1500 and a processor SoC 1530. As described above, processor SoC 1530 can include a host processor 1532 (e.g., corresponding to processor 432) and an auxiliary processor 1534 (corresponding to auxiliary processor 434) Likewise, acoustic touch sensing circuit 1500 can include transmitter 1502 (corresponding to transmitter 402), demultiplexers 1504 (corresponding to demultiplexers 404), multiplexers 1508 (e.g., corresponding to multiplexers 408), programmable gain amplifier 1510 (e.g., corresponding to programmable gain amplifier 410), gain and offset correction circuit 1512 (e.g., corresponding to gain and offset correction circuit 412), demodulation circuit, envelope detection circuit, and/or filter 1514-1516 (e.g., corresponding to demodulation circuit 414, envelope detection circuit 415, and/or filter 416), ADC 1518 (e.g., corresponding to ADC 418) and I/O circuit 1520 (e.g., corresponding to I/O circuit 420). The operation of these components can be similar to that described above with respect to FIG. 4, and is omitted here for brevity. Unlike FIG. 4, which includes transducer transducers 406 performing both transmit and receive operations, the configuration illustrated in FIG. 15 can include transducers 1506A operating as transmitters and separate transducers 1506B operating as receivers. Transducers 1506A and 1506B can be co-located at locations where transmit and receive transducers are previously described. For example, transducer 502A can be replaced by a first transducer configured to transmit and a second transducer configured to receive.

It is to be understood that the configuration of FIG. 15 is not limited to the components and configuration of FIG. 15, but can include other or additional components in multiple configurations according to various examples. Additionally, some or all of the components 1502-1504 and 1508-1520 can be included in a single circuit, or can be divided among multiple circuits while remaining within the scope of the examples of the disclosure. In some examples, some or all of the transmit circuitry (e.g., components 1502-1504) can be implemented in one chip and some or all of the receive circuitry (e.g., components 1508-1520) can be implemented in a second chip. The first chip including transmit circuitry can receive and/or generate via a voltage boosting circuit a high voltage supply for stimulating the surface. The second chip including the receive circuitry can operate without receiving or generating a high voltage supply. In some examples, more than two chips can be used, and each chip can accommodate a portion of the transmit circuitry and/or receive circuitry.

Figure 16A:
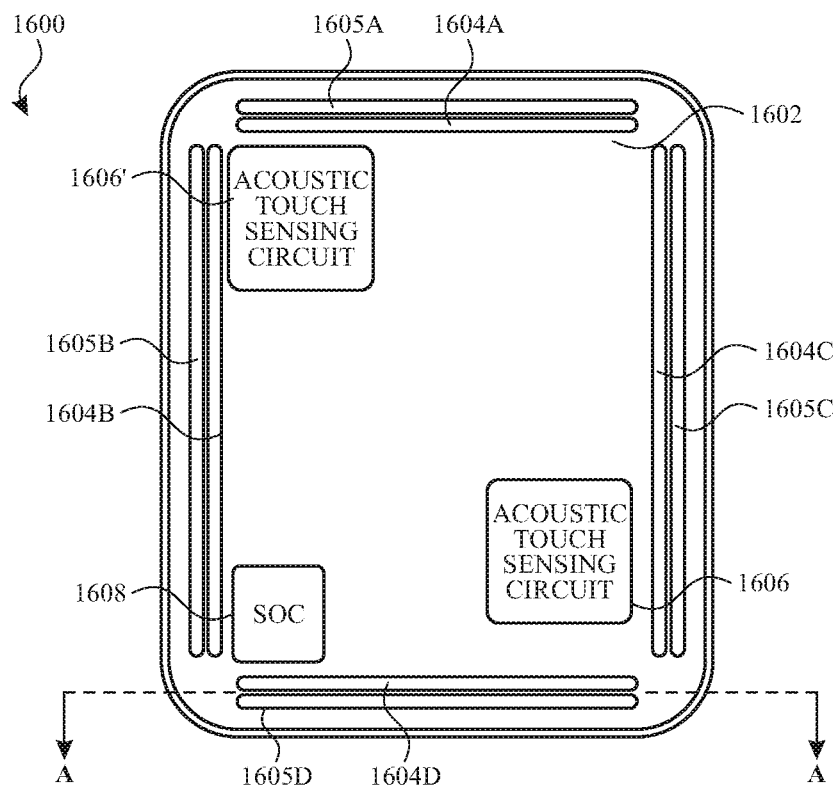
FIGS. 16A-16E illustrate exemplary integration of an acoustic touch sensing circuit and/or one or more processors with groups of transducers mechanically and acoustically coupled to a surface.

FIGS. 16A-16E illustrate exemplary integration of an acoustic touch sensing circuit and/or one or more processors (e.g., processor SoC) with groups of transducers (e.g., one transmitting and one receiving) mechanically and acoustically coupled to a surface (e.g., glass, plastic, metal, etc.). FIG. 16A illustrates an exemplary acoustic touch sensing system configuration 1600 using eight acoustic transducers, including four transmit transducers 1604A-D and four receive transducers 1605A-D mounted along (or otherwise coupled to) four edges of a surface 1602 (e.g., cover glass). Transmit transducers 1604A-D can be configured to generate acoustic waves (e.g., shear horizontal waves) and receive transducers 1605A-D can be configured to receive the reflected acoustic waves. One or more acoustic touch sensing circuits can be included. For example, FIG. 16A illustrates a first acoustic touch sensing circuit 1606 positioned proximate to neighboring edges of transmit transducers 1604C-D and receive transducers 1605C-D. Likewise, a second acoustic touch sensing circuit 1606' can be positioned proximate to neighboring edges of transmit transducers 1604A-B and receive transducers 1605A-B. Placement of acoustic touch sensing circuits as illustrated can reduce routing between transducers and corresponding acoustic touch sensing circuits. Processor SoC 1608 can be coupled to the one or more acoustic touch sensing circuits.

Figure 16B:
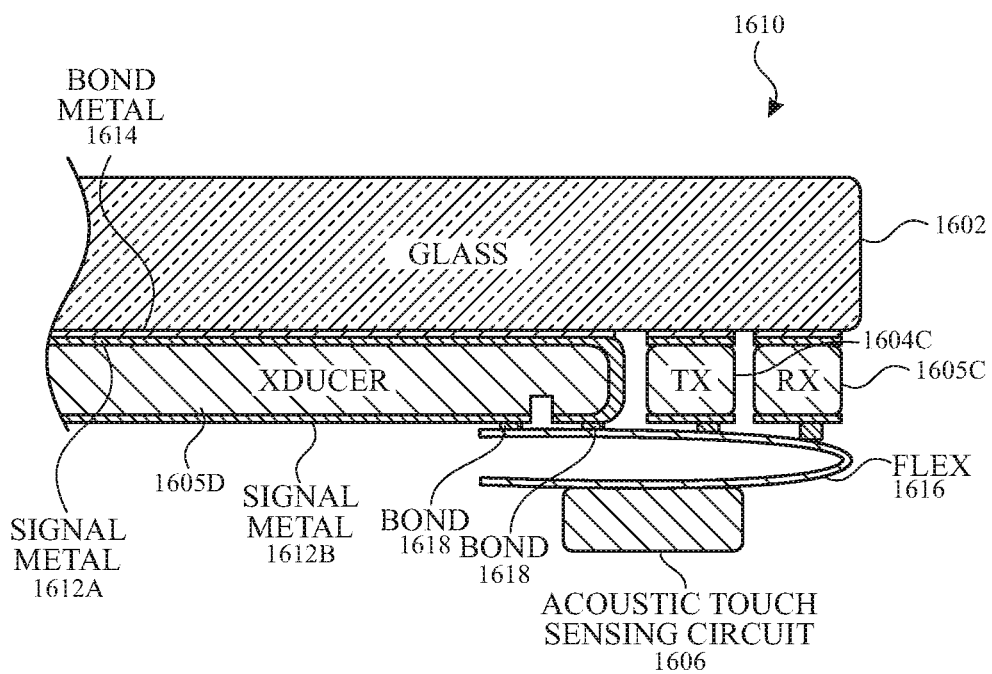

In some examples, transducers 1604A-D/1605A-D can be coupled to acoustic touch sensing circuits via a flex circuit (e.g., flexible printed circuit board). FIG. 16B illustrates a view 1610 of exemplary acoustic touch sensing system configuration 1600 along view AA of FIG. 16A. As illustrated in FIG. 16B, receiver transducer 1605D can be coupled to surface 1602 by a bonding between a bond metal layer 1614 on an underside of surface 1602 and a first signal metal layer 1612A on one side of receive transducer 1605D. The first signal metal layer 1612A on one side of receive transducer 1605D and a second signal metal layer 1612B on a second side of receive transducer 1605D can provide two terminals of receive transducer 1605D from which reflections can be received. The first signal metal layer 1612A can wrap around from one side of receive transducer 1605D to an opposite side to enable bonding of both signal metal layers of receive transducer 1605D on one side of receive transducer 1605D. In FIG. 16B, acoustic touch sensing circuit 1606 can be coupled to a flex circuit 1616 and the flex circuit can be respectively bonded to signal metal layers 1612A and 1612B of receive transducer 1605D (e.g., via bonds 1618). Similarly transmit circuit 1604D (not shown) can be coupled to surface 1602 and can provide two terminals to which stimulation signals can be applied. The flex circuit can be bonded to respective signal metal layers of transmit transducer 1604D. Likewise, transmit transducer 1604C and receive transducer 1604D can be coupled to surface 1602 (e.g., via bond metal layer/first signal mental layer bonding) and to acoustic touch sensing circuit 1606 by bonding the flex circuit to signal metal layers on the side of the transducer opposite the surface. Similarly, transmit transducers 1604A-B and receive transducers 1605A-B can be coupled to surface 1602 and second acoustic touch sensing circuit 1606'.

Figure 16C:
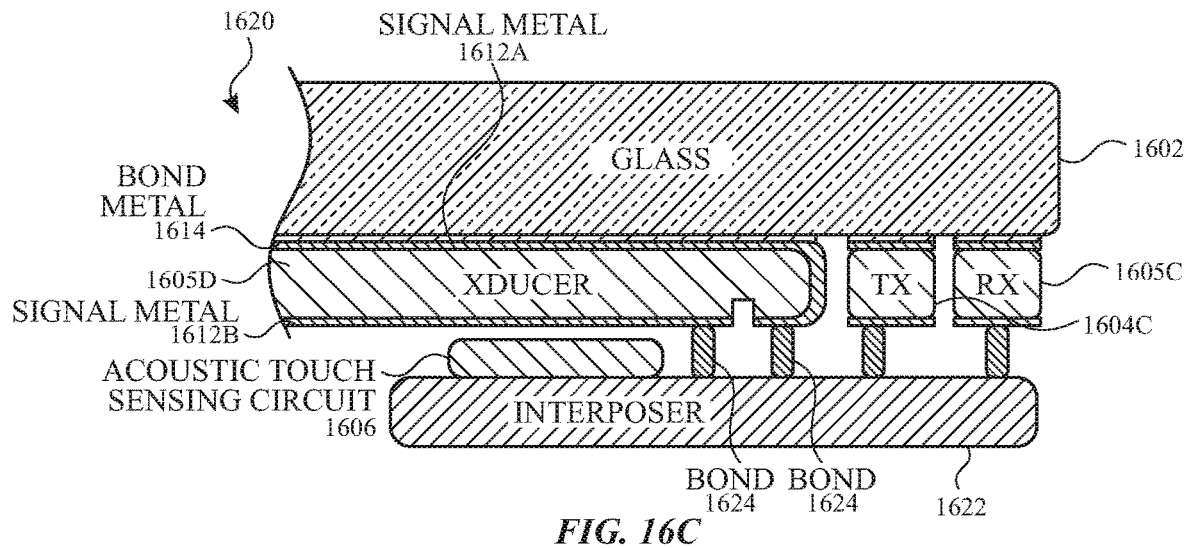

In some examples, transmit transducers 1604A-D and receive transducers 1605A-D can be coupled to acoustic touch sensing circuits via an interposer (e.g., rigid printed circuit board). FIG. 16C illustrates a view 1620 of exemplary acoustic touch sensing system configuration 1600 along view AA. Transmit transducers 1604C-D and receive transducers 1605C-D can be coupled to surface 1602 as illustrated in and described with respect to FIG. 16B. Rather than coupling acoustic touch sensing circuit 1606 to a flex circuit 1616 and bonding the flex circuit to signal metal layers 1612A and 1612B of receive transducer 1605D, however, in FIG. 16C, an interposer 1622 can be bonded to signal metal layers 1612A and 1612B of receive transducer 1605D (e.g., via bonds 1624). Acoustic touch sensing circuit 1606 can be bonded or otherwise coupled to interposer 1622. Similarly, the remaining transducers (transmit and receive) can be coupled to surface 1602 and the first or second acoustic touch sensing circuits 1606 and 1606'.

Figure 16D:
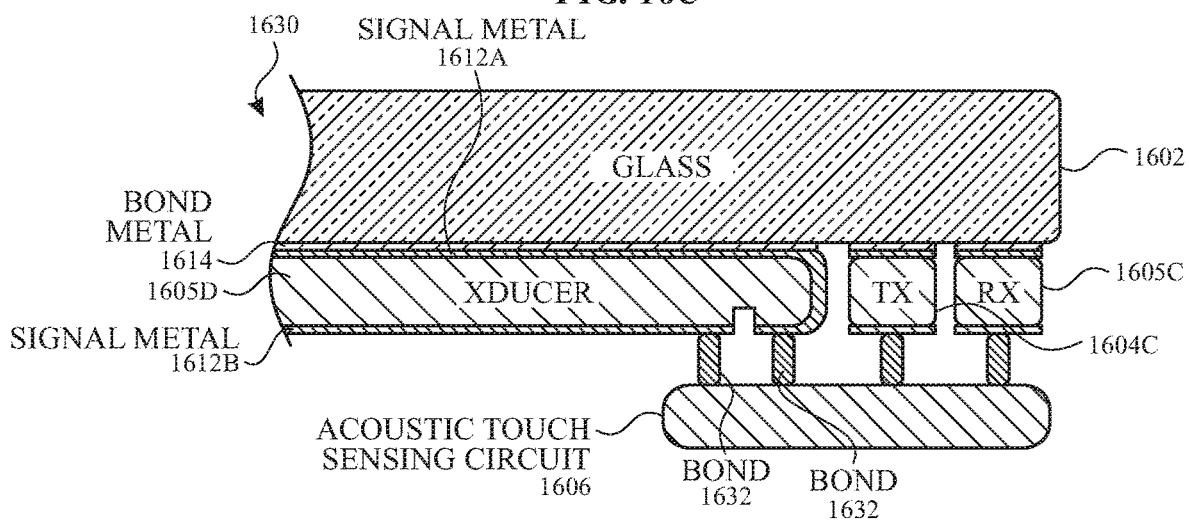

In some examples, transmit transducers 1604A-D and receive transducers 1605A-D can be directly bonded to acoustic touch sensing circuits. FIG. 16D illustrates a view 1630 of exemplary acoustic touch sensing system configuration 1600 along view AA. Transmit transducers 1604C-D and receive transducers 1605C-D can be coupled to surface 1602 as illustrated in and described with respect to FIG. 16B. Rather than coupling acoustic touch sensing circuit 1606 to a flex circuit or interposer and bonding the flex circuit/interposer to signal metal layers 1612A and 1612B of receive transducer 1605D, however, in FIG. 16D, an acoustic touch sensing circuit 1606 can be bonded to signal metal layers 1612A and 1612B of receive transducer 1605D (e.g., via bonds 1632). Similarly, the remaining transducers (transmit and receive) can be coupled to surface 1602 and the first or second acoustic touch sensing circuits 1606 and 1606'.

In FIGS. 16B-D, signal metal layer 1612A was routed away from surface 1602 and both signal metal layers 1612A and 1612B were bonded to an acoustic touch sensing circuit via bonding on a side of receive transducer 1605D separate from surface 1602 (e.g., via flex circuit, interposer or direct bond). In some examples, the acoustic touch sensing circuits can be bonded to routing on surface 1602 instead, similar to the description above with respect to FIG. 10E, for example.

Figure 16E:
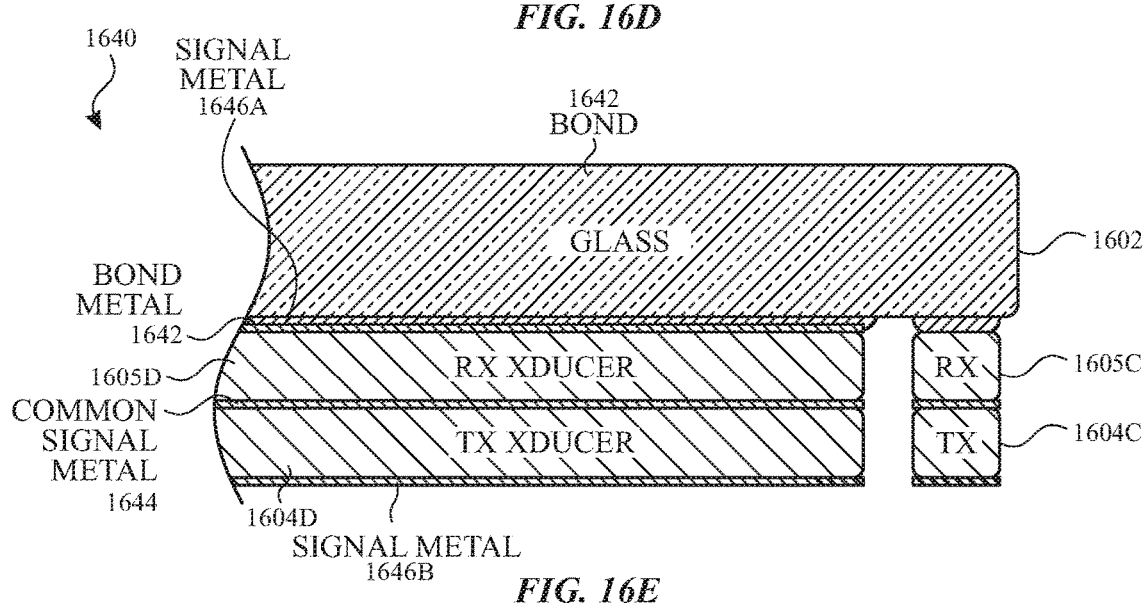

Although FIG. 16A illustrates transmit transducers 1604A-D as being side-by-side with receive transducers 1605A-D, in some examples, transmit transducers 1604A-D and receiver transducers 1605A-D can be stacked on one another. FIG. 16E illustrates a view 1640 of exemplary acoustic touch sensing system configuration 1600 along view AA. As illustrated in FIG. 16E, receiver transducer 1605D can be coupled to surface 1602 by a bonding between a bond metal layer 1642 on an underside of surface 1602 and a first signal metal layer 1646A on one side of receive transducer 1605D. Transmit transducer 1604A can be coupled to receive transducer 1605B via a common second signal metal layer 1644 on a second side of receive transducer 1605D. A first metal layer 1646B can be deposit on the second side of transmit transducer 1604A. First signal metal layer 1646A and common second signal metal layer 1644 can provide two terminals of receive transducer 1605D from which reflections can be received. First signal metal layer 1646B and common second signal metal layer 1644 can provide two terminals of transmit transducer 1604D to which transmit waves can be applied. In some examples, the common signal metal layer can be a common ground for the transmit and receive transducers. In some examples, the metal connections for the transmit and receive transducers can be separated from each other and differential or single ended transmit and receive circuitry can be used. Although not shown, routing of signal metal layers 1644, 1646A and 1646B can be placed so that acoustic touch sensing circuit 1606 can be coupled to routing on surface 1602 or exposed surfaces of transmit transducer 1604D and/or receive transducer 1605D to enable direct or indirect bonding of the acoustic touch sensing circuit to routing on surface 1602 or on transducers 1604D/1605D.

It should be understood that the exemplary integration of an acoustic touch sensing circuit, transducers and a surface described above are exemplary and many other techniques can be used.

Figure 17:
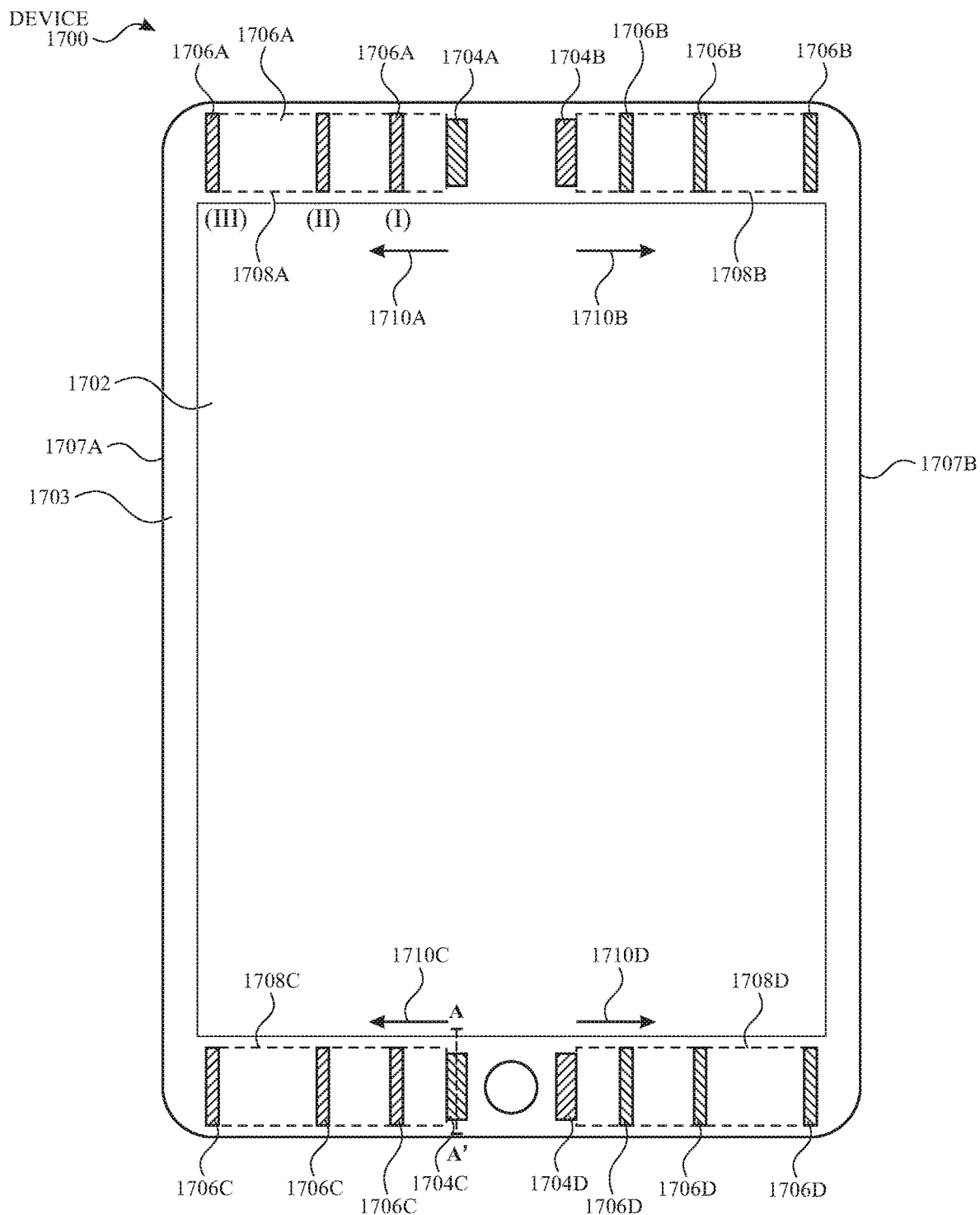
FIG. 17 illustrates a device 1700 including an exemplary acoustic touch sensing system configuration according to examples of the disclosure.

FIG. 17 illustrates a device 1700 including an exemplary acoustic touch sensing system according to examples of the disclosure. In some examples, transducers 1704A-1704D can be coupled to one or more surfaces of the device, for example, transducers can be coupled at an edge of a display screen 1702 of the device, behind an opaque mask layer 1703 that can border a viewable display area the display screen. In some examples, the transducers 1704A-1704D can be coupled to front, back, side, top and/or bottom surfaces of the device. In some examples, the transducers 1704A-1704D can be excited to produce ultrasonic vibrations on a surface of the device coupled to the transducer (e.g., at the display screen). The transducers 1704A-1704D can be directly coupled to a surface of the device 1702 or can be coupled to a surface of the device through a physical structure (e.g., a comb structure) configured to create a desired waveform of ultrasonic vibrations in the surface medium. When the transducers 1704A-1704D are excited, a wave can propagate through the medium of the surface (e.g., glass, metal, plastic, etc.). In some examples, barriers 1706A-1706D can be coupled to (or patterned in or on) the same surface as the transducers 1704A-1704D, and can cause a portion of energy transmitted by a nearby transmitting transducer to reflect and return to of the transmitting transducer. While three barriers 1706A-1706D are illustrated proximate to each transducer 1704A-1704D, it should be understood that one or two barriers (along with edges 1707A and 1707B of the device) can be used to provide acoustic touch sensing according to examples of the disclosure. Similarly, a greater number of barriers (i.e., four or more) can be used to provide acoustic touch sensing. In some examples, the transducer, the physical structure coupling the transducer to the surface, and/or the surface itself can be designed such that the ultrasonic energy primarily propagates in a desired direction 1710A-1710D toward nearby barriers 1706A-1706D such that each transducer 1704A-1704D and its corresponding barriers can form active zones 1708A-1708D for object detection. In some examples, the active zones 1708A-1708D can correspond to metal exclusion zones for antenna elements (e.g., 712A-712C below). The metal exclusion zones can be regions on the surface of the device that do not include metal traces due to potential for interference with RF communication signals. For example, the physical structure coupling the transducer can be a comb structure that can direct ultrasonic energy from the transducers 1704A-1704D toward long edges 1707A/1707B of the device 1700. As illustrated, three barriers 1706A-1706D can be positioned in proximity to each of the transducers 1704A-1704D between the transducers and long edges 1707A/1707B of device 1700.

Using active zone 1708A as an example, as the transmitted wave from transducer 1704A propagates in direction 1710A, each barrier 1706A can reflect a portion of the transmitted wave back toward the transducer. In addition, in some examples, energy of the ultrasonic vibrations can reflect from the long edges 1707A/1707B of the device 1700. In some examples, the reflection at long edges 1707A/1707B can occur where the display screen 1702 joins with a housing of the device 1700. An amount of time between the transmission of the wave by the transducer and the return of each reflected portion corresponding to each of the barriers (I), (II), (III) and edge 1707A to the transducer can be a function of the wave propagation rate of the transmitted wave in the surface medium and a distance between the transducer 1704A and the respective barrier (I), (II), (III) or edge 1707A that caused the reflection. Accordingly, expected timing of the return signals can be estimated based on the transducer 1704A-1704D location, barrier 1706A-1706D spacings, material properties, and wave propagation properties. In some examples, once a device 1700 has been fabricated, expected timing of return signals from the respective barriers 1706A-1706D and device edges 1707A and/or 1707B can be determined experimentally during a calibration procedure. Using the knowledge of the reflected wave timing, each reflected wave can be separately sampled by starting a sampling interval around the time (e.g., slightly before) the reflected wave is expected to return. In some examples, the energy or absolute value of each reflected wave can be integrated over a sampling interval. In some examples, the sampling interval duration can be a multiple of the duration of the transmitted ultrasonic acoustic wave (e.g., 2× the transmitted signal duration).

In some examples, to detect a position of an object in contact with the device surface, the measured reflected energy from each barrier (I), (II), (III) and optionally edge 1707A can be compared to a baseline amount of energy that can be received when no object is in contact with the surface. For example, as a wave propagates from transducer 1704A in direction 1710A, if no object is present between the transducer and the first barrier (I), and an object can be contacting the device 1700 between the first barrier (I) and the second barrier (II). In this example, reflected energy returning from a reflection at barrier (I) can be unchanged from the baseline amount of energy for the first barrier (I), but the reflected energy returning from the second barrier (II) can be reduced relative to the baseline amount of energy when the object absorbs and/or scatters a portion of the acoustic wave energy. Using these measurements, it can be determined that an object is contacting the device 1700 between the first barrier (I) and second barrier (II). In some examples, each region between adjacent barriers can be considered a coarse touch pixel for acoustic touch sensing. Accordingly, the example acoustic touch sensing arrangement illustrated in FIG. 17 can be used for sensing a position of an object contacting the display according to examples of the disclosure.

FIGS. 18A-18D illustrate exemplary cross-sectional views along the line AA' in FIG. 17 showing exemplary transducer 1804 attachment and electrical connection configuration of acoustic transducers according to examples of the disclosure. The illustrations of FIGS. 18A-18D show exemplary cross-sectional views along line AA' through transducer 1704C illustrated in FIG. 17. In the examples below, FIGS. 18A-18D show a transducer 1804 (which can correspond to transducers 1704A-1704D above) attached to a back side of a cover glass 1802 behind an opaque mask layer 1806 (e.g., a layer of dye, paint, ink, or stain). A distinctive notch is illustrated in the transducers 1804 that clearly shows separation between first and second electrical terminals 1810A and 1810B of the transducer. It should be understood that the dimensions of all elements shown in FIGS. 18A-18D (e.g., height, width, thickness, spacing, exact position, etc.) are merely for illustrative purposes and some elements can be exaggerated for ease of distinguishing between distinct features in the illustrations. In some examples, the transducer 1804 can be bonded to the cover opaque mask layer 1806 by a conductive or non-conductive bonding material (e.g., a thin layer of stiff epoxy) as described in more detail below. In some examples, placing the transducer behind the opaque mask layer 1806 can prevent a user from seeing the transducer 1804 that is placed behind the cover glass (which can be transparent). Although the examples below illustrate a transducer 1804 bonded to a back side of cover glass 1802, it should be understood that the configurations illustrated in FIGS. 18A-18D can also be used for transducers that are bonded to other parts of an electronic device such as any exterior surface of the device that may come in contact with a user, including the device housing. In one such example, transducer 1804 could be connected to a back surface of an electronic device housing for use in acoustic touch sensing of contact by an object (e.g., a user's finger) on the back surface of the electronic device.

Figure 18A:
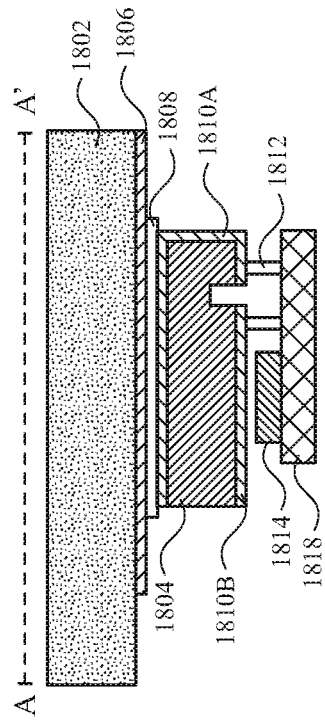
FIGS. 18A-18D illustrate exemplary cross-sectional views along the line AA' in FIG. 17 showing exemplary attachment and electrical connection configuration of acoustic transducers according to examples of the disclosure.

FIG. 18A illustrates a first exemplary configuration for providing electrical connections using a flexible printed circuit board 1816 between the transducer terminals 1810A, 1810B and acoustic touch sensing circuitry 1814. Exemplary acoustic touch sensing circuitry 1814 will be described in more detail below in relation to FIG. 19. The transducer 1804 can be positioned behind a portion of the cover glass 1802 that is covered by an opaque mask layer (e.g., a layer of dye, paint, ink, or stain) such that the transducer 1804 will not be visible to a user looking through a transparent cover glass 1802. As illustrated, the transducer 1804 can be provided with two electric terminals 1810A, 1810B that can be used to generate an electric field across the transducer material. As described above, in some examples, the transducer can be a piezoelectric ceramic material (e.g., PZT) or a piezoelectric plastic material (e.g., PVDF). In some examples, the first transducer terminal 1810A can wrap around the transducer 1804 to provide a voltage signal to the side of the transducer that is bonded to the cover glass 1802. In some examples, the second transducer terminal 1810B can provide signals to the opposite side of transducer 1804 from the bonding side, and an electric potential can develop between the terminals and across the transducer. The transducer terminals 1810A and 1810B can be thin metal film terminals deposited on the transducer 1804 or bonded by a conductive adhesive (not shown) to exterior surfaces of the transducer 1804. Because of the wrap-around of terminal 1810A, electrical connections for driving the two terminals 1810A and 1810B can be provided on the same side of the transducer 1804 (i.e., the opposite side of the transducer from the bonding side). In FIG. 18A, a flexible printed circuit board 1816 (or any other type of flexible connector) can be coupled to bonding connections 1812 for coupling each of the transducer terminals 1810A and 1810B to the flexible printed circuit board 1816. The flexible printed circuit board 1816 can be also be coupled to acoustic touch sensing circuitry 1814 (which can correspond to optional acoustic touch sensing controller 210 above or acoustic touch sensing circuitry 206 above or both). The flexible printed circuit board 1816 can provide routing connections between the terminals 1810A and 1810B and the acoustic touch sensing circuitry 1814. An exemplary configuration for acoustic touch sensing circuitry 1814 is described in more detail below in the description of FIG. 6. Bonding layer 1808 can be used to bond the transducer 1804 to the cover glass 1802 behind the opaque mask 1806.

Figure 18B:
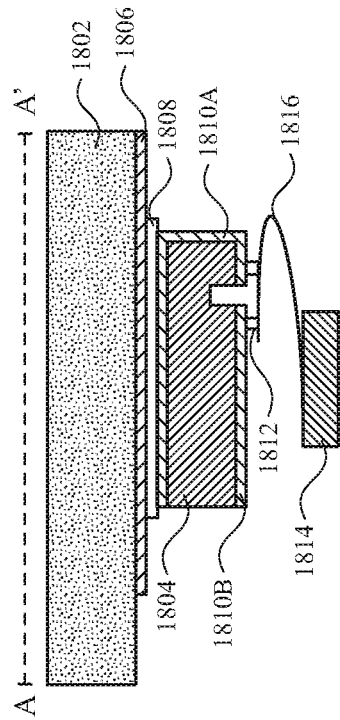

FIG. 18B illustrates a second exemplary configuration for providing electric connections using an interposer 1818 between the transducer terminals 1810A, 1810B and acoustic touch sensing circuitry 1814. As illustrated, in some examples, bonding connections 1812 can be coupled to transducer terminals 1810A and 1810B can be coupled to a first portion of the interposer 1818 and the touch sensing circuitry 1814 can be coupled to the interposer. In some examples, the interposer 1818 can provide routing connections between the terminals 1810A and 1810B and the acoustic touch sensing circuitry 1814. Unlike FIG. 18A above, the interposer can be a rigid material, and can optionally be bonded to other components internal to the device for added stability.

Figure 18C:
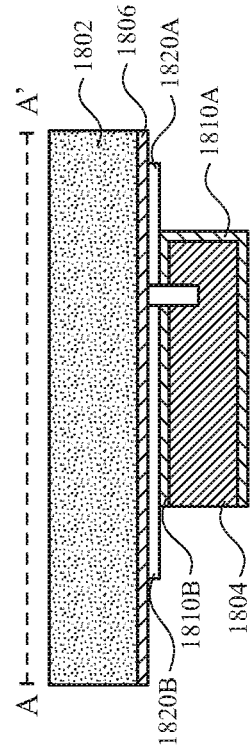

FIG. 18C illustrates a third exemplary configuration that provides direct bonding connections 1812 between the transducer terminals 1810A/1810B and the acoustic touch sensing circuitry 1814, thereby omitting additional intermediate connections (e.g., flexible printed circuit board 1816 or interposer 1818). In each of the second and third exemplary configurations, a non-conductive bonding material can be used to bond the transducer 1804 to the cover glass 1802 behind the opaque mask 1806.

Figure 18D:
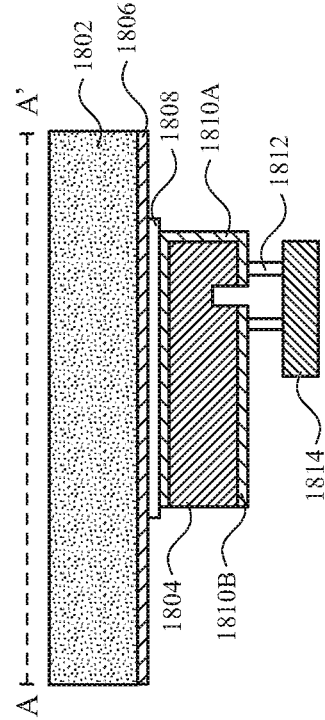

FIG. 18D illustrates a fourth exemplary configuration that provides an alternative configuration to the configurations of FIGS. 18A-18C above. The configuration of FIG. 18D can be used to provide a configuration where the acoustic touch sensing circuitry (not shown) can be disposed directly on the back side of the cover glass 1802. In some examples, the acoustic touch sensing circuitry can comprise thin film transistor circuitry that has been disposed (e.g., by lithography, deposition, or the like) on the back side of the cover glass 1802. In some examples, a conductive bonding material can be used to form conductive bonding connections 1820A and 1820B to electrically connect the transducer terminals 1810A and 1810B to the back of the cover glass 1802. In this configuration, the separation point (i.e., notch) between the two transducer electrodes 1810A and 1810B can be on the side of the transducer that is bonded to the cover glass 1802. Separate conductive bonding connections can be formed for each transducer terminal 1810A/1810B through the conductive bonding material connections 1820A/1820B and routing connections (not shown) can formed on the cover glass 1802 for connecting the transducer terminals to the acoustic touch sensing circuitry (e.g., 1814 above) disposed on the cover glass layer. In some examples, the acoustic touch sensing circuitry (e.g., 1814 above) can be a silicon chip coupled to the back side of the cover glass 1802. In such examples, the acoustic touch sensing circuitry can be conductively bonded to the back side of the cover glass 1802 proximate to the transducer 1804. In other examples, the acoustic touch sensing circuitry can be formed directly on the back side of the cover glass 1802 (e.g., with thin film transistors). This configuration can reduce the overall height of the stack-up used for the acoustic touch sensor by placing the transducer 1804 and acoustic touch sensing circuitry on a same plane, rather than stacked one above the other. While the foregoing examples illustrate transducer terminal 1810A wrapping around to the same surface of the transducer 1804 as the transducer terminal 1810B, it should be understood that a transducer without a wrap-around terminal can be used while remaining within the scope of the present disclosure. For example, using the example of FIG. 18D, the terminal 1810A could be replaced by a terminal that does not wrap around to the contacting side of transducer 1804 and cover glass 1802. Instead, any of the techniques illustrated in FIGS. 18A-18C (or analogous techniques) could be used to couple the modified terminal 1810A to acoustic touch sensing circuitry (e.g., 1814 above).

Figure 19:
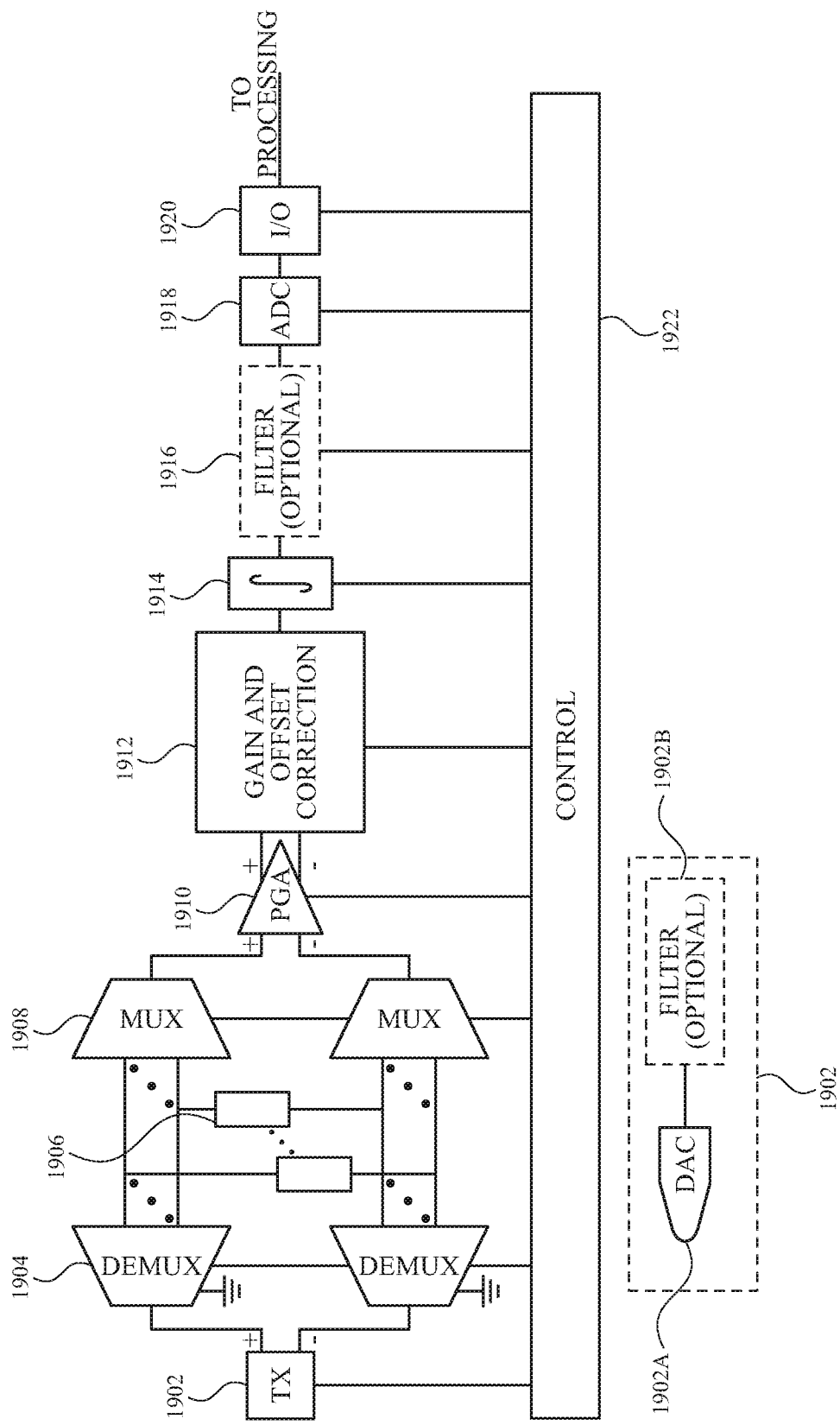
FIG. 19 illustrates an exemplary configuration of acoustic touch sensing circuitry, control logic, and transducers according to examples of the disclosure.

FIG. 19 illustrates an exemplary configuration of acoustic touch sensing circuitry 1902-1904 and 1908-1920 (which can correspond to acoustic touch sensing circuitry 206 above), control logic 1922 (which can correspond to acoustic touch sensing controller 210 above) and transducers 1906 (which can correspond to transducers 204 above) according to examples of the disclosure. In some examples, a transmitter 1902 can generate an electrical signal for stimulating movement one or more of a plurality of transducers 1906. In some examples, the transmitted signal can be a differential signal, and in some examples the transmitted signal can be a single ended signal. In some examples, the transmitter 1902 can be a simple buffer, and the transmitted signal can be a pulse (or burst of pulses at a particular frequency). In some examples, the transmitter 1902 can comprise a digital to analog converter (DAC) 1902A and an optional filter 1902B that can be optionally used to smoothen a quantized output of the DAC. The DAC 1902A can be used to generate an arbitrary transmit waveform. In some examples, the arbitrary waveform can pre-distort the transmit signal to equalize the channel. In some examples, the characteristics of each channel, such as the properties of the surface material coupled to transducers 1906, the discontinuities in the surface material (e.g., reflection and transmission characteristics of each of the barriers 1706A-1706D above), and the reflection characteristics of an edge of the device (e.g., long edges 1707A and 1707B above) can be measured and stored. In some examples, the channel characteristics can be measured as a manufacturing step, and in other examples the characteristics can be measured as a periodic calibration step (i.e., once a month, once a year, etc. depending on how quickly the channel characteristics are expected to change). In some examples, the channel characteristics can be converted to a transfer function of the channel, and the arbitrary transmit waveform can be configured as an inverse of the channel transfer function such that the returning energy is equalized (e.g., returning energy can be detected as a pulse or a burst of pulses despite the transmitted energy having a seemingly arbitrary waveform).

A pair of demultiplexers 1904 (e.g., in a differential implementation) can be used to selectively couple the transmitter 1902 to one of the transducers 1906 that can be the active transducer for a particular measurement cycle (described in more detail below). In some examples, the demultiplexers 1904 can have a ground connection, and the non-selected demultiplexer outputs can be shorted, open, or grounded. As described above, transducers 1906 can also generate output electrical signals when motion is induced in the transducers by acoustic energy (e.g., energy reflected by barriers 1706A-1706D above). A pair of multiplexers 1908 (e.g., in a differential implementation) can be used to select a transducer 1906 for coupling to a programmable gain amplifier 1910 for amplifying received signals. In some examples, the same transducer 1906 can be coupled to the transmit circuit by the demultiplexers 1904 and coupled to the programmable gain amplifier 1910 by the multiplexers 1908. Thus, a single transducer 1906 can be used both for transmitting and receiving acoustic energy. In some examples, a first transducer can be coupled to the transmitter 1902 by the demultiplexers and a second transducer can be coupled by the multiplexers to the programmable gain amplifier 1910. For example, the transmitting transducer and the receiving transducer can be discrete piezoelectric elements, where the transmitting transducer can be designed for being driven by higher voltages (or currents) to produce sufficient motion in the transducer 1806 to generate an acoustic wave in the surface of a device (e.g., device 200 above), and the receiving transducer can be designed for receiving smaller amplitude reflected energy. In such an architecture, the transmit side (e.g., 1902 and 1904) can be optionally implemented on a high power circuit, and the receive side (e.g., 1908-1920) circuitry can be optionally implemented on a separate low power circuit. In some examples, the programmable gain amplifier output can be coupled to gain and offset correction 1912. It should be understood that for a single-ended implementation, a single demultiplexer 1904 and a single multiplexer 1908 can be used, and transmit circuits 1902, programmable gain amplifier 1910, and the input to gain and offset correction 1912 can all be single ended as well. In some examples, more than one Tx and Rx circuitry can be used, and multiplexers 1908 and demultiplexers 1904 can be reduced. In some examples, the number of Tx and Rx circuits can match with the number of transducers 1906. In such examples, multiplexers 1908 and demultiplexers 1904 can be omitted completely.

In some examples, the output of gain and offset correction 1912 can be coupled to an integrator 1914, which can be configured to integrate a total amount of energy received from the transducer 1906 output. In some examples, the integrator 1914 can integrate the square or absolute value of the received signal. The output of the integrator can optionally be filtered at a filter 1916 and passed to an analog-to-digital converter (ADC) 1918 for conversion to a digital signal. In some examples, an input/output (I/O) circuit 1920 can be used to transmit received data for processing. In some examples, the output of the I/O circuitry can be transferred to a host processor of the device, or to an auxiliary sub-processor separate from the host processor. A control circuit 1922 can be used to control timing and operations of the acoustic touch sensing circuitry 1902-1920. An exemplary timing sequence for performing acoustic touch sensing according to examples of the disclosure will be described in further detail below. It should be understood that some or all of the components 1902-1904 and 1908-1920 can be included in a single group of circuitry, or can be divided among multiple circuits while remaining within the scope of the examples of the disclosure.

Figure 20:
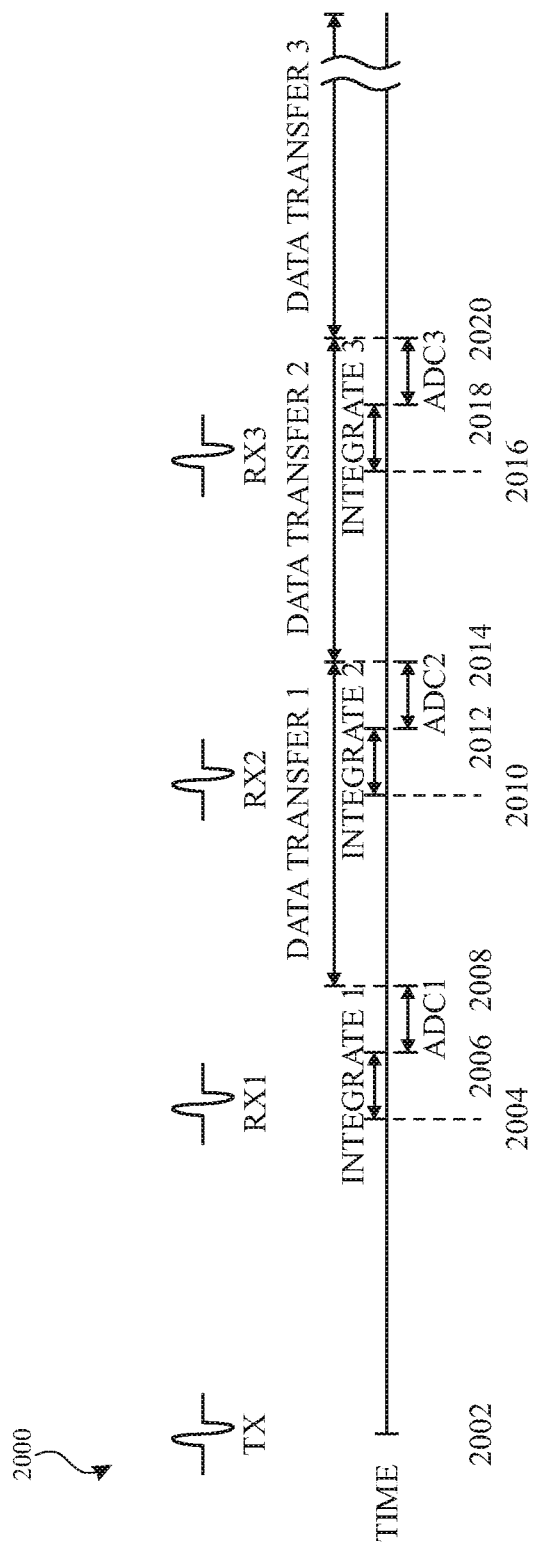
FIG. 20 illustrates an exemplary acoustic touch sensing timing sequence according to examples of the disclosure.

FIG. 20 illustrates an exemplary acoustic touch sensing timing sequence 2000 according to examples of the disclosure. In some examples, the timing of the events in the acoustic touch sensing sequence 2000 can be controlled by control circuitry (e.g., control circuit 1922 above). The illustrated exemplary timing can be understood in reference to exemplary device 1700 illustrated in FIG. 17 above and exemplary acoustic touch sensing circuitry and control illustrated in FIG. 19 above. In some examples, the timing sequence 2000 can begin with a transmit signal generated in transmit circuitry (e.g., transmitter 1902 above). The transmit signal Tx can cause a piezoelectric transducer element (e.g., transducer 1704A above) to vibrate, which can in turn generate a wave of energy that can propagate through a surface coupled to the transducer (e.g., touch screen 208 and/or housing 202 above). As described above, discontinuities (e.g., grooves, barriers, etc.) in the surface can cause a portion of the propagating wave to reflect back toward the transducer. Using knowledge of the wave propagation rate in the surface medium and a distance between the transducer (e.g., transducer 1806 above) and the first barrier (e.g., barrier (I) nearest to the transducer in FIG. 17 above), at time 2004, the acoustic touch sensing sequence 2000 can begin integrating energy reflected by the first barrier Rx1. In some examples, at time 2004, the integration can begin slightly before the first reflected energy Rx1 is expected to return, and continue for a multiple of the duration (e.g., $2x$ the duration) of the transmitted wave Tx, to ensure that energy from the reflected wave can be properly captured even if the energy reflected wave has spread.

At time 2006, the acoustic touch sensing sequence 2000 can complete integration of the first reflected wave Rx1 and begin digitizing (e.g., with ADC 1818 above) the integrated energy. In some examples, at time 2008, the acoustic touch sensing sequence 2000 can begin data transfer (e.g., with I/O 1820 above) of digitized data of the first reflected wave Rx1 for further processing. In some examples, at time 2010, integration for a second reflected wave Rx2 (e.g., from barrier (II) in FIG. 17 above) can begin. At time 2012, integration of the second reflected wave Rx2 can complete and digitization (e.g., with ADC 1818 above) of the second reflected wave can begin. The first data transfer of the digitized energy from the first reflected wave Rx1 can be completed any time before and up until the digitization (e.g., with ADC 1818 above) of the second reflected wave Rx2 completes at time 2014. At time 2014, data transfer of the digitized second reflected wave can begin. In some examples, at time 2016, integration for a third reflected wave Rx3 (e.g., from barrier (III) in FIG. 17 above) can begin. At time 2018, integration of the third reflected wave Rx3 can complete and digitization (e.g., with ADC 1818 above) of the third reflected wave can begin at time 2018. The second data transfer of the digitized energy from the second reflected wave Rx2 can be completed any time before and up until the digitization of the third reflected wave Rx3 completes at time 2014. At time 2020, data transfer of the digitized third reflected wave Rx3 can begin. Although the intervals between the received reflected energy waves Rx1, Rx2, and Rx3 appear to be uniform in the illustration, it should be understood that if the discontinuities are unevenly space (e.g., as illustrated for barriers (I), (II), and (III) in FIG. 4), the control timing sequence can adjust the timings for beginning integration intervals (e.g., 2004, 2010, and 2016) accordingly. For example, for the barrier 406A spacing illustrated in FIG. 17, it can be expected that the time difference between arrival of Rx3 and Rx2 can be greater than the time different between arrival of Rx2 and Rx1.

The acoustic touch sensing timing sequence 2000 can be repeated for one transducer (e.g., one of 1704A-1704D) at a time. For example, by connecting transducer 1704A to transmit and receive circuitry (e.g., by demultiplexers 1904 and multiplexers 1908 above) for a first iteration of the timing sequence 2000 and sequentially connecting transducers 1704B-1704D and repeating the timing sequence 2000. Thus, acoustic touch sensing could be performed in each corner of the device sequentially by repeating the timing sequence 2000 for each transducer 1704A-1704D using the exemplary acoustic touch sensing circuitry and control illustrated above in FIG. 19.

In some examples, step 2002 (e.g., the transmit step) for a second transducer can begin while the first transducer is receiving the last reflected signal (e.g., Rx3) because the time delay between transmission signal Tx and a first reflected signal Rx1 for the second transducer is known. For this example, the demultiplexer 1904 in FIG. 19 may be used connect to the second transducer to the transmitter 1902 for transmitting the signal Tx while the multiplexer 1908 can be simultaneously connected to the first transducer for capturing the received signal Rx3. In other words, consecutive iterations timing sequence 2000 can be interleaved for different transducers. It should be understood that the timing illustrated in FIG. 20 is not necessarily to scale, but instead provides an exemplary sequence of events for the acoustic touch sensing timing sequence 2000. It should be understood that variations of the illustrated timing, particularly variations of relative durations of different steps in the sequence, would also be within the scope of the present disclosure. In some examples in which more than one transmit and receive channel are available, the timing sequence 2000 can be used with multiple transducers simultaneously in parallel.

Figure 21A:
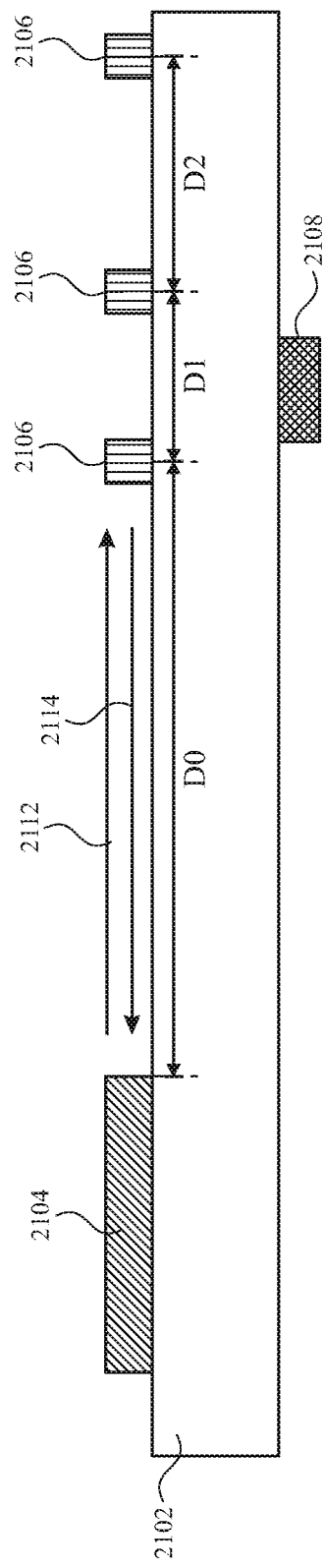
FIGS. 21A-21B illustrate exemplary acoustic touch sensing configurations and variations of acoustic wave propagation directions that can be used in conjunction with acoustic touch sensing techniques according to examples of the disclosure.
Figure 21B:
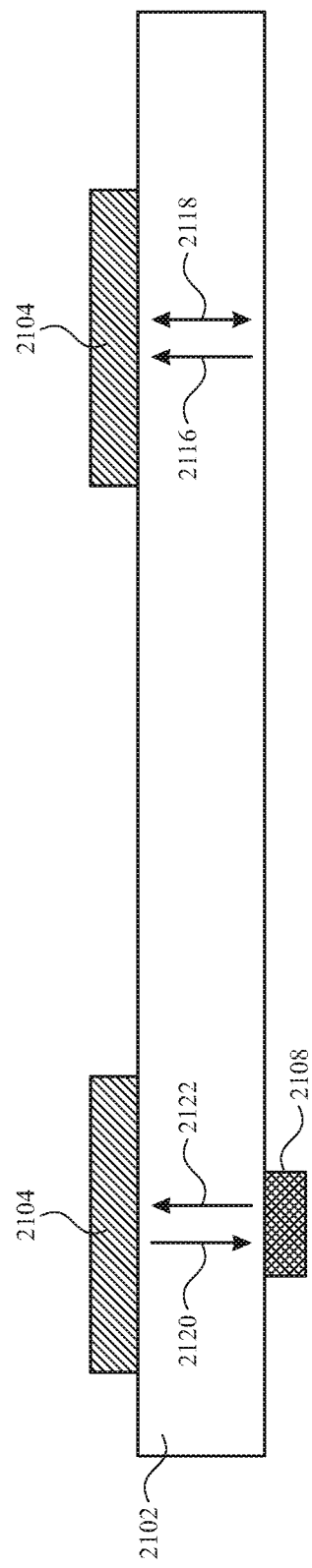

FIGS. 21A-21B illustrate exemplary acoustic touch sensing configurations and variations of acoustic wave propagation directions that can be used in conjunction with acoustic touch sensing techniques according to examples of the disclosure. In each of the illustrations, a substrate 2102 can be the medium for transmission of acoustic waves. The substrate 2102 can be made from any material capable of transmitting acoustic waves, including glass, metal, wood, and plastic. In some examples, transducer 2104 can be coupled to the substrate 2102 in a variety of different ways as described above in FIGS. 18A-18D. In FIG. 21A object 2108 is shown in contact with one surface of the substrate 2102. As illustrated, the transducer 2104 and barriers 2106 can be formed on different sides of the substrate 2102 from the object contact surface. By using this configuration, the contact surface of the substrate can be uniform and smooth without discontinuities that may be noticed by a user. As described above, the transducer 2104 and barriers 2106 can be hidden from a user by an opaque mask layer (not shown) if the substrate is transparent (e.g., glass). Alternatively, the substrate 2102 can be made of metal, such as the sides and/or back surface of an electronic device (e.g., devices 136, 140, 144, 148, and 150 above). While elements 2106 may be referred to as barriers, it should be understood that the barriers can be any type of discontinuity in the surface described above (e.g., ridges, grooves, etc.) or discontinuity between different materials (e.g., an interface between metal and air, an interface between glass and air, or an interface between glass and metal) that can cause a portion of incident acoustic wave energy to reflect back toward the transducer 2104. As described above, acoustic energy transmitted by transducer 2104 can propagate in the direction 2112 and reflected in direction 2114 by barriers 2106 (and the edge of substrate 2102 at a substrate/air or substrate/device housing interface).

FIG. 21A illustrates a first exemplary configuration of a directly bonded transducer 2104 and surface bonded barriers 2106. The transducer 2104 can be directly bonded to the substrate 2102 by, for example, a stiff epoxy material. When the transducer 2104 is driven at a particular frequency, $f_{drive}$, an acoustic wave at the drive frequency can propagate through the substrate 2102 toward the barriers 2106. Exemplary propagation modes of the acoustic wave can be compressive, shear horizontal, Lamb, Love, and Surface Acoustic Wave. In the direct contact configuration, the modes that propagate in the medium of surface 2102 can be primarily a function of the wave excitation frequency, material geometries, and substrate material properties. Multiple wave modes may propagate through the medium, which can all reflect from barriers 2106 and be received and sensed by transducer 2104. Propagation properties (e.g., propagation speed, signal spread, etc.) of the different possible modes can result in received signals from the transducer 2104 that are difficult to interpret. Measures can be taken to limit the modes that can propagate in the surface medium. For example, in the configuration of FIG. 21A, the center frequency driving the transducer 2104 can be selected such to predominantly generate a zeroth order shear horizontal wave (SH0) in the medium. The correct center frequency can depend on the geometry and material properties of the surface 2102 medium. Further measures for controlling the propagation modes will be discussed in the examples below. Barriers 2106A can be bonded to the substrate material 2102 by an adhesive, such an epoxy. The barriers can be formed from strips of alumina, acrylic, or other materials that can cause a portion of incident acoustic energy to reflect back toward the transducer 2104. As described above, geometries and material properties of the barriers 2106 can be selected to provide a desired transmitted energy percentage and a desired reflected energy percentage at each barrier. As illustrated, a distance D1 between the first barrier and the second barrier can be different from a distance D2 between the second barrier and the third barrier. This irregular spacing can be used to improve insensitivity of the acoustic touch sensing system to signals that undergo multiple reflections.

Assuming distances D1 and D2 were designed to be equal, a first portion of a wave transmitted by the transducer 2104 can reach the third barrier, reflect once, and return to the transducer 2104. The first portion of the wave can travel the distance between the transducer and the first barrier D0, plus the distances D1 and D2 in the first direction, and then can travel the distance D2, D1, and D0 respectively while returning to the transducer. A second portion of the wave transmitted by the transducer 2104 can travel the distance D0, pass the first barrier and travel the distance D1 to the second barrier, reflect a first time at the second barrier and return a distance D1 to the first barrier, reflect at the first barrier and return a distance D1 to the second barrier, and finally reflect at the second barrier for a second time, returning the distance D1 plus D0 to the transducer 2104. The path described for the second portion of the transmitted wave can be described as a multiple reflection path. The total distance for the first portion of the transmitted wave can be added to obtain the result of 2*D0+2*D1+2*D2. The total distance for the second portion of the transmitted wave can be added with the result 2*D0+4*D1. If D2 and D1 are equal distances, then the first portion and the second portion can return to the transducer 2104 at the same time. However, if distances D1 and D2 are different, the length of the two paths can be different, and the energy returning from the multiple reflection path can be more easily distinguished from the energy returning from the single reflection path based on different times of arrival.

FIG. 21B illustrates an exemplary configuration where the acoustic wave energy can be transmitted through the thickness of the substrate 2102 in direction 2116 (as opposed to along the surface as in FIG. 21A). In some examples, when the transmitted energy 2118 encounters an interface between the substrate 2102 and air, the acoustic wave energy can reflect in direction 2116. In some examples, transmitted energy in direction 2120 can instead encounter object 2108 in contact with the substrate 2102, and a portion of the transmitted energy can be absorbed by the object. An amount of the acoustic wave energy reflected in direction 2122 can be less than the amount reflected when no object is in contact with the surface. Similar to the configuration in FIG. 21A, the configuration in FIG. 21B can be used on a glass surface behind an opaque mask, or on a metal surface such as the sides and/or back surface of an electronic device (e.g., devices 136, 140, 144, 148, and 150 above). In some examples, the configuration of FIG. 21B can be used to create a plurality of localized input locations that can be positioned on different portions of a device as will be described in more detail below in reference to FIG. 25A.

Figure 21C:
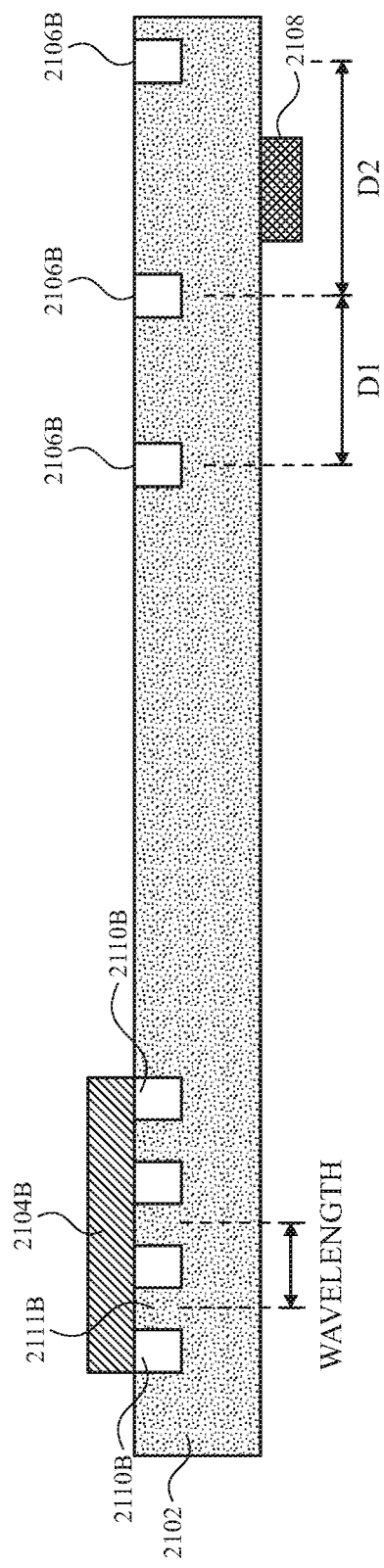
FIGS. 21C-21F illustrate exemplary variations of transducer and barrier configurations that can be used in conjunction with acoustic touch sensing techniques according to examples of the disclosure.

FIG. 21C illustrates a third exemplary configuration that includes an etched comb structure 2110C for controlling wave propagation in the substrate 2102. Additional shading is added to the substrate 2102 to In some examples, the comb can be etched into the substrate 2102 material creating voids 2110C (which can be notches, grooves, etc.) in the surface of the substrate. Due to lack of substrate material at the locations of voids 2110C, the transducer 2104C can physically come in contact with the substrate 2102 at contact points 2111C between the voids. The contact points 2111C (or "teeth") of the comb structure can be spaced apart by a distance equal to the wavelength of the desired wave propagation frequency $f_{drive}$. When the transducer 2104C is driven with a drive signal, each tooth can transmit energy from the transducer to the substrate 2102 and stimulate a wave of energy in the substrate. Because the spacing can be equal to the wavelength of the stimulation frequency $f_{drive}$, the waves generated from each tooth 2111C at the stimulation frequency can interfere constructively, while waves at other frequencies that are not harmonics of the stimulated waves can experience destructive interference. Harmonics of the stimulation frequency $f_{drive}$ may still constructively interfere, but in some examples the stimulation frequency can be chosen as described in FIG. 21A above where only the lower order harmonic can propagate through the medium of the substrate 2102 (e.g., based on geometry and material properties of the substrate 2102). Barriers 2106C can also be formed by etching the substrate 2102, and in some cases the barriers can be formed during the same processing step used to form the voids 2110C for the comb structure. The size and shape of the barriers 2106C can be designed to provide a desired reflected energy percentage and a desired transmitted energy percentage of the acoustic wave from transducer 2104C such that a measurable amount of energy returns to the transducer 2104C from reflections caused by each of the barriers 2106C.

Figure 21D:
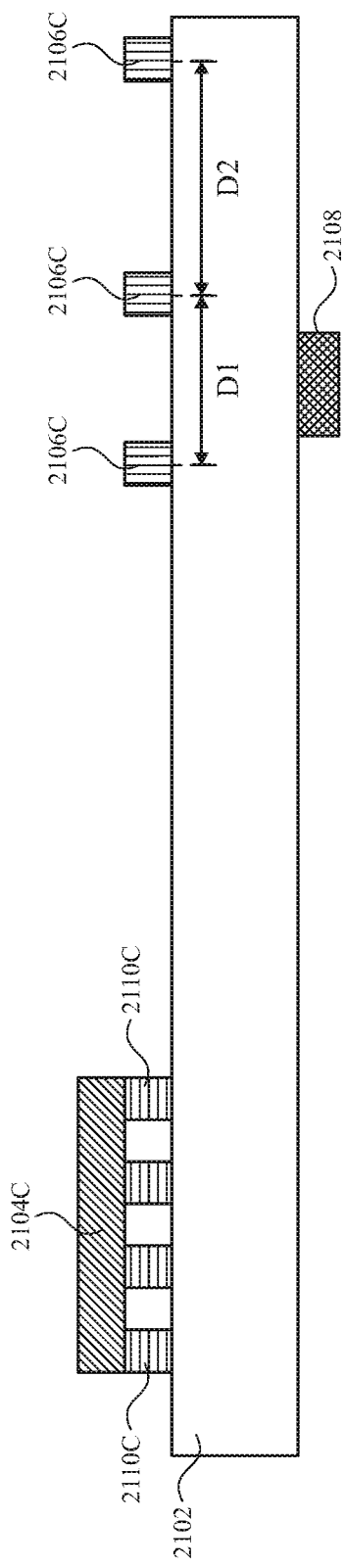

FIG. 21D illustrates a fourth exemplary configuration that includes a bonded comb structure 2110D for controlling wave propagation in the substrate 2102. In the example of FIG. 21D, comb teeth 2110D can be formed by deposition of a material (e.g., a stiff epoxy, acrylic, etc.). In some examples, the transducer 2104D can then be bonded directly to the comb teeth 2110D. Barriers 2106D can be bonded to the substrate material 2102 by an adhesive, such as an epoxy. The barriers 2106D can be formed from strips of alumina, acrylic, or other materials that can cause a portion of incident acoustic energy to reflect back toward the transducer 2104D. Again as described above, geometries and material properties of the barriers 2106D can be selected to provide a desired transmitted energy percentage and a desired reflected energy percentage at each barrier.

Figure 21E:
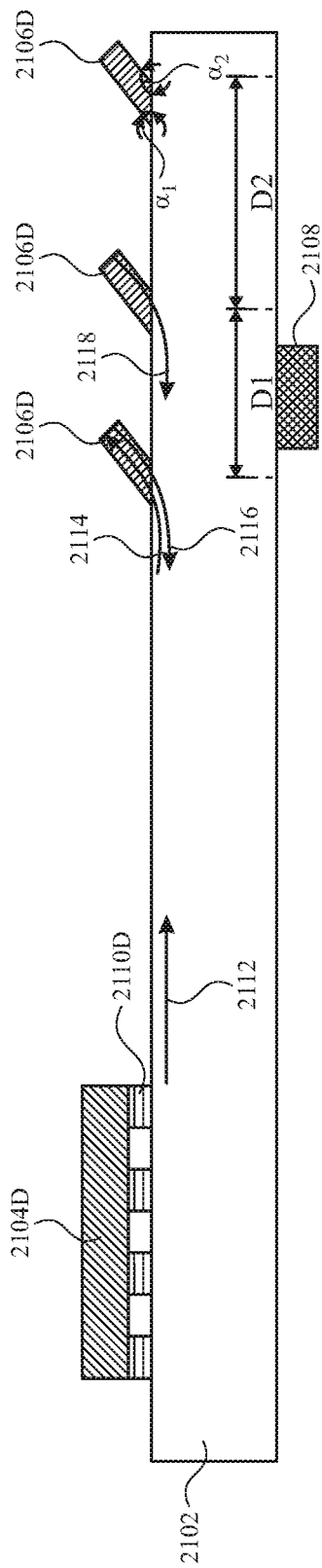
Figure 21F:
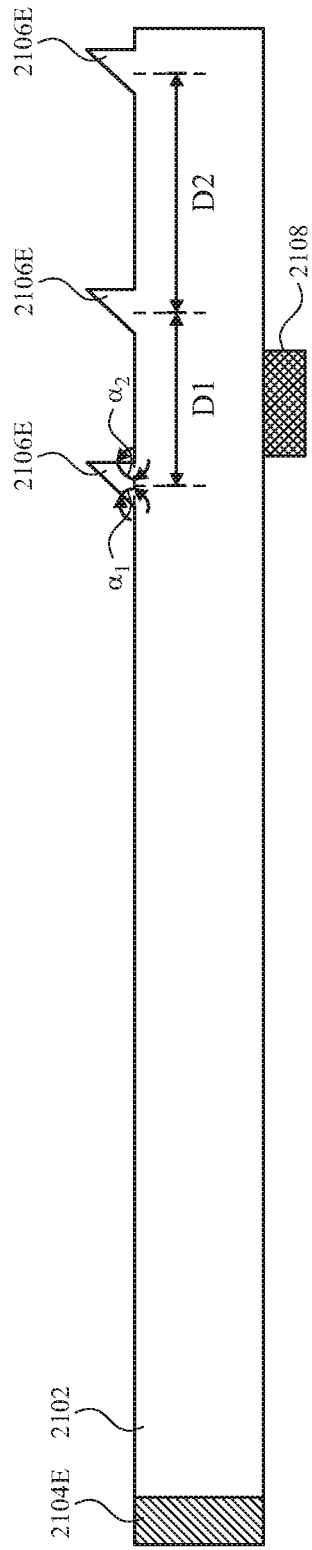

FIG. 21E illustrates a fifth exemplary configuration that includes barriers 2106E that can have anisotropic reflection characteristics according to examples of the disclosure. A comb structure 2110E can be formed directly in the transducer 2104E material. For example in the case of a PZT transducer 2106E, the comb pattern can be etched into the PZT material. For a PVDF transducer 2106E, electrode traces for forming electrical connections to the attaching side of the transducer can also be used to form the comb pattern. In some examples, barriers 2106E can be configured to provide anisotropic acoustic wave reflection and transmission characteristics. One exemplary anisotropic barrier configuration can have a wedge shape as illustrated. An acoustic wave generated by transducer 2104E and the comb structure can propagate in a first direction 2112 (also referred to as the transmit direction). When the transmitted acoustic wave reaches the first wedge barrier 2106E travelling in the transmit direction, the propagating wave can encounter a shallow angle $\alpha_1$ between the substrate 2102 and the first wedge barrier 2106E. A portion of the transmitted energy can propagate along direction 2114 into the first wedge barrier and when the energy encounters the abrupt transition between the barrier material and air, the acoustic wave can be totally reflected and reverse direction along direction 2116. The reflected energy from the first barrier can reflect with a first reflectance percentage corresponding to the energy travelling in the transmit direction. A portion of the transmitted energy can continue past the first barrier and undergo a second reflection at the second barrier 2106E. The reflected energy from the second reflection can return along the direction 2118. When the energy reflected from the second barrier along direction 2118 (also referred to as the reflection direction) encounters the first barrier again, the wave encounters a different angle $\alpha_2$. In some examples, a lower percentage of the energy traveling in direction 2118 can be reflected by the first barrier 2106E back toward the second barrier and subsequently back toward transducer 2140E after a second reflection at the second barrier. The asymmetric wedge design can thus be utilized to minimize energy returning to transducer 2140E after experiencing multiple reflections, which can potentially interfere with touch sensing operations. In some examples, the asymmetric barrier design can further be used in conjunction with the irregular spacing between barriers as described in more detail in regards to FIG. 21A FIG. 21F illustrates a sixth exemplary configuration that includes barriers 2106F formed directly as surface features of substrate 2102 and having transducer 2104F coupled to an edge of the substrate. In some examples, instead of coupling the transducer 2104F to the surface opposite the contact surface (e.g., surface contacting object 2108), the transducer can be coupled to a side of the substrate 2102. In some examples, the transducer 2104F can be used to generate a compression wave in the substrate 2102 (i.e., movement of the transducer is in the same direction as the wave propagation direction). In some examples, placing the transducer 2104F on the side of the substrate can be utilized for maximizing a distance between conductive traces (e.g., for making connections to electrodes of the transducer) and antenna elements (e.g., 2712A-2712C below). In some examples, anisotropic barriers 2106F can be formed as surface features in the substrate 2102 material, rather than being formed by etching or being formed by bonding a barrier material to the substrate. In some examples, the barriers 2106F can be formed as part of a mold for the substrate 2102, for example the barriers can be included in an injection mold for a plastic component that forms a portion of a housing of an electronic device (e.g., any of devices 136, 140, 144, 148, and 150 above). The barriers 2106F can have an anisotropic reflection characteristic as described in more detail above regarding FIG. 21E, where a shallow angle $\alpha_1$ is encountered by acoustic waves traveling in the transmit direction, and an approximately right angle $\alpha_2$ is encountered by acoustic waves traveling in the reflection direction. Other variations of the barrier shapes 2106F and 2106E above can be used to provide anisotropic reflection characteristics while remaining within the scope of the disclosure.

Although FIGS. 21A-21F above illustrate particular combinations of transducers 2104, 2104C-2104F, comb patterns 2110C-2110E, and barriers 2106, 2106C-2106D, it should be understood any of the transducer configurations and comb configurations can be used with any of the barrier configurations disclosed in FIGS. 21A-21F. For example, transducer 2104D and comb structure 2110D can be used with any of the barrier configurations 2106, 2106C-2106D and so on. The illustrated combinations are in no way intended to be limiting of possible configurations for implementing an acoustic touch sensing system according to examples of the disclosure.

Figure 22A:
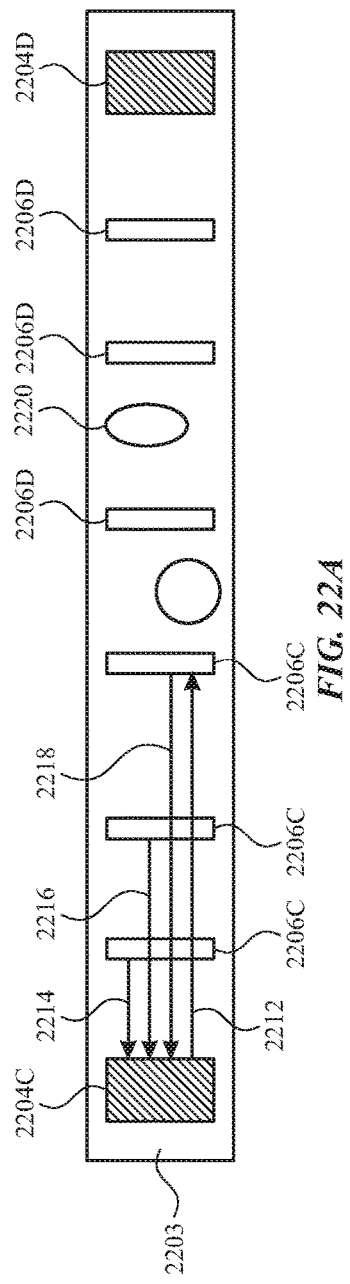
FIGS. 22A-22C illustrate exemplary configuration variations for acoustic touch sensing according to examples of the disclosure.
Figure 22B:
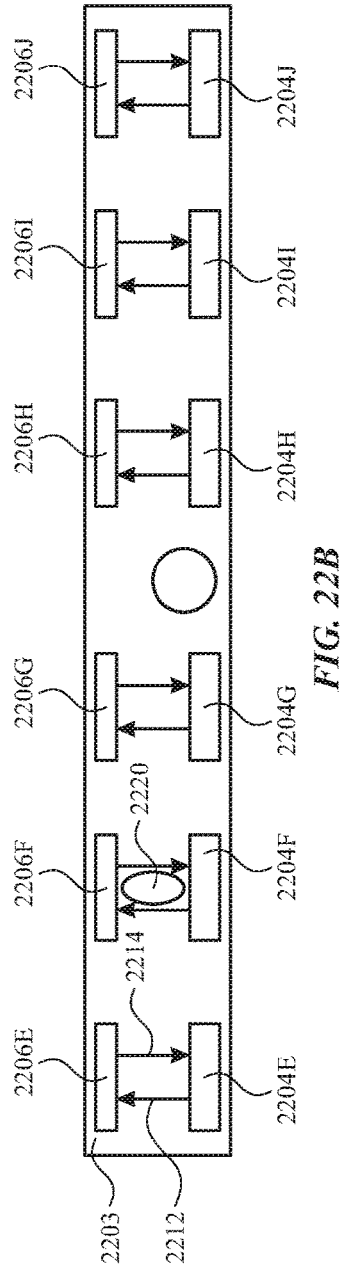
Figure 22C:
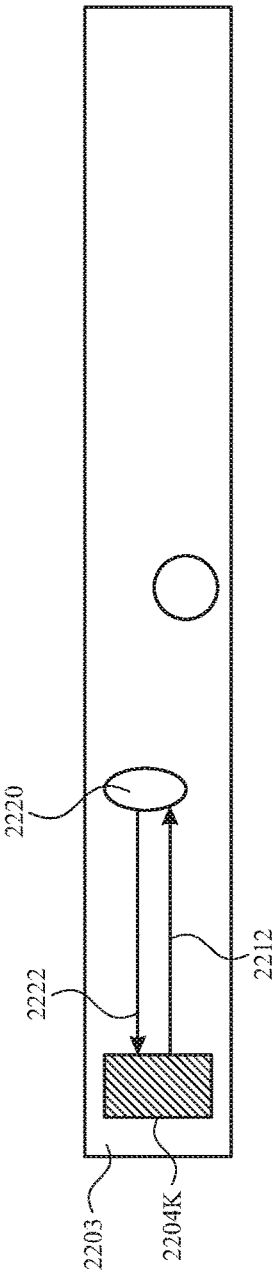

FIGS. 22A-22C illustrate exemplary configuration variations for acoustic touch sensing according to examples of the disclosure. FIGS. 22A-22C illustrate a surface sub-region 2203 of a device that can correspond to the bottom-most region of the device 1700 above, such as the portion of the bottom portion of the display screen (e.g., 1702 above) behind an opaque mask layer (e.g., opaque mask layer 1703 above). The illustrated surface sub-region 2203 is used only for exemplary purposes. The exemplary configurations of FIGS. 22A-22C can also be used for acoustic touch sensing on other surfaces of a device, such as the device housing or other portions of the display instead of or in addition to the bottom-most region.

FIG. 22A illustrates a reflection based acoustic touch system that utilizes multiple barriers 2206C-2206D (or other types of reflective discontinuities described above and below) similar to the system described in FIG. 17. In some examples, transducers 2204C-2204D can be coupled to one or more surfaces of the device; for example, transducers can be coupled at an edge of a display screen 2202 of the device, behind an opaque mask layer that can be disposed in the surface sub-region 2203 that can border a viewable display area the display screen. In some examples, the transducers 2204C-2204D can be coupled to front, back, side, top and/or bottom surfaces of the device. In some examples, the transducers 2204C-2204D can be excited to produce ultrasonic vibrations on a surface of the device coupled to the transducer (e.g., at the display screen). The transducers 2204C-2204D can be directly coupled to a surface of the device or can be coupled to a surface of the device through a physical structure (e.g., a comb structure) configured to create a desired waveform of ultrasonic vibrations in the surface medium. When the transducers 2204A-2204D are excited, a wave can propagate through the medium of the surface (e.g., glass, metal, plastic, etc.). In some examples, barriers 2206A-2206D can be coupled to (or patterned in or on) the same surface as the transducers 2204A-2204D, and can cause a portion of energy transmitted by a nearby transmitting transducer to reflect and return to the transmitting transducer. While three barriers 2206C-2206D are illustrated proximate to each transducer 2204C-2204D, it should be understood that one or two barriers can be used to provide acoustic touch sensing according to examples of the disclosure. In some examples, the transducers 2204C-2204D can be positioned toward the center of the device, and can transmit energy toward the direction of edges 2207A and 2207B respectively. In some examples, edges 2207A and 2207B can act as barriers similar to the barriers 2206C and 2206D. In some examples, the reflection at long edges 2207A-2207B can occur where the touch screen substrate (e.g., glass) of the device (e.g., 124, 126, 128, 130, or 152) joins with a housing of the device 2200. Similarly, a greater number of barriers (i.e., four or more) can be used to provide acoustic touch sensing. In some examples, the transducer, the physical structure coupling the transducer to the surface, and/or the surface itself can be designed such that the ultrasonic energy primarily propagates in a desired direction (e.g., direction 2212) toward nearby barriers 2206C-2206D such that each transducer 2204C-2204D and its corresponding barriers can form active zones 2208C-2208D for object detection. In some examples, the active zones 2208C-2208D can correspond to metal exclusion zones for antenna elements (e.g., 1012A-1012C below). The metal exclusion zones can be regions on the surface of the device that do not include metal traces due to potential for interference with RF signals.

Using active zone 2208C as an example, as the transmitted wave from transducer 2204C propagates in direction 2212, each barrier 2206C can reflect a portion of the transmitted wave back toward the transducer (e.g., 2214, 2216, and 2218). An amount of time between the transmission of the wave by the transducer and the return of each reflected portion corresponding to each of the barriers to the transducer can be a function of the wave propagation rate of the transmitted wave in the surface medium and a distance between the transducer 2204A and the respective barrier that caused the reflection. Accordingly, expected timing of the return signals can be estimated based on the transducer 2204C-2204D location, barrier 2206C-2206D spacings, material properties, and wave propagation properties. In some examples, once a device 2200A has been fabricated, expected timing of return signals from the respective barriers 2206C-2206D (and optionally device edges 2207A-2207B as described above) can be determined experimentally during a calibration procedure. Using the knowledge of the reflected wave timing, each reflected wave can be separately sampled by starting a sampling interval around the time (e.g., slightly before) the reflected wave is expected to return. In some examples, the energy or absolute value of each reflected wave can be integrated over a sampling interval. In some examples, the sampling interval duration can be a multiple of the duration of the transmitted ultrasonic acoustic wave (e.g., 2× the transmitted signal duration).

In some examples, transducers 2204C and 2204D (which can correspond to transducers 1704C and 1704D above) can be disposed on outer edges of the illustrated area, and can transmit energy toward the center of the device. For example, transducer 2204C can transmit energy in the direction of arrow 2212. In some examples, when the transmitted energy reaches a first barrier 2206C, a portion of the transmitted energy can be reflected as represented by arrow 2214 toward the transducer 2204C. In some examples, when the transmitted energy reaches the second barrier 2206C, a second portion of the transmitted energy can be reflected as represented by arrow 2216 toward the transducer 2204C. Similarly, when the transmitted energy reaches the third barrier 2206C, a third portion of the transmitted energy can be reflected as represented by arrow 2218 toward the transducer 2204C. Each of the signals corresponding to reflected 2214, 2216, and 2218 can arrive at the transducer 2204C at different times. When no objects are in contact with the display screen in the vicinity of barriers 2206C, a baseline amount of energy can be received by the transducer 2204C corresponding to each reflection 2214, 2216, and 2218. In some examples, if an object (e.g., a user's finger or palm) is contacting display screen in between two of the barriers 2206C, a portion of the acoustic wave energy that passes through the region of contact can be absorbed by the object, and corresponding reflected waves can be attenuated.

A position of the object (or objects) can be determined based on which reflected wave (or waves) is attenuated relative to a baseline reflection value as described above regarding FIG. 17. In the illustrated configuration, transducer 2204C can be used to determine at least three unique positions of an object based on the reflected waves 2214, 2216, and 2218 and their energy levels compared to a baseline energy level. While groups of three barriers 2206C and 2206D are illustrated proximate to each transducer 2204C and 2204D, it should be understood that one or two barriers can be used to provide acoustic touch sensing according to examples of the disclosure. Similarly, a greater number of barriers (i.e., four or more) can be used to provide acoustic touch sensing.

FIG. 22B illustrates an exemplary alternative acoustic touch sensing arrangement utilizing a single reflective barrier 2206E-2206J per transducer 2204E-2204J to determine a location of contact by an object (e.g., a user's finger or palm). In some examples, transducer 2204E can transmit an acoustic wave in direction 2212, and when the acoustic wave reaches barrier 2206E, a portion of the energy can be reflected by the barrier in direction 2214 back toward transducer 2204E. Similarly, each pair of the transducer 220F-2204J and barriers 2206F-2206J can provide a similar arrangement in different locations along the surface sub-region 2203 of the device. When an object 2220 contacts the surface sub-region 2203 in a location between a transducer/barrier pair, e.g., between transducer 2204F and 2206F, a portion of the transmitted and reflected waves can be absorbed by the object, and the reflected energy received by transducer 2204F can be reduced relative to a baseline level of reflected energy that can occur without an object present. Based on the reduction in the reflected energy in the region of the 2204F/2206F pair, the contact by object 2220 can be detected. In addition, based on which of the transducers 2204E-2204J detects the presence of an object, a position of the object contact can be determined as well.

FIG. 22C illustrates an exemplary alternative acoustic touch sensing arrangement that omits the use of baseline reflection from barriers to determine a location of a contact by an object (e.g., a user's finger or palm). In some examples, a transducer 2204K can be coupled to a surface sub-region 2203 and can transmit an acoustic wave in direction 2212. In some examples, if an object 2220 is present in the path of the transmitted energy, a portion of the energy can be reflected by the object and returned along path 2222 to the transducer 2204K. In some examples, this reflected energy that can be referred to as backscattered energy, and the acoustic touch sensing arrangement of FIG. 22C can be referred to as a backscatter arrangement for acoustic touch sensing. In some examples, the position of the object can be determined based on an amount of time between transmission of the acoustic energy 2212 and detection of reflected energy 2222 by the transducer 2204K. The distance between the transducer 2204K and the object 2220 can be determined from that time, sometimes referred to as time-of-flight, and the speed of propagation of the acoustic wave in the surface medium, which can be a commonly known quantity or can be empirically measured. Although only a single transducer is illustrated in FIG. 22C, it should be understood that multiple transducers can be included at different portions of a surface while remaining within the scope of the present disclosure. Thus, the arrangements in FIGS. 22A-22C illustrate how acoustic touch sensing can be performed using many different configurations of transducers and barriers (or other types of surface discontinuities).

Figure 23A:
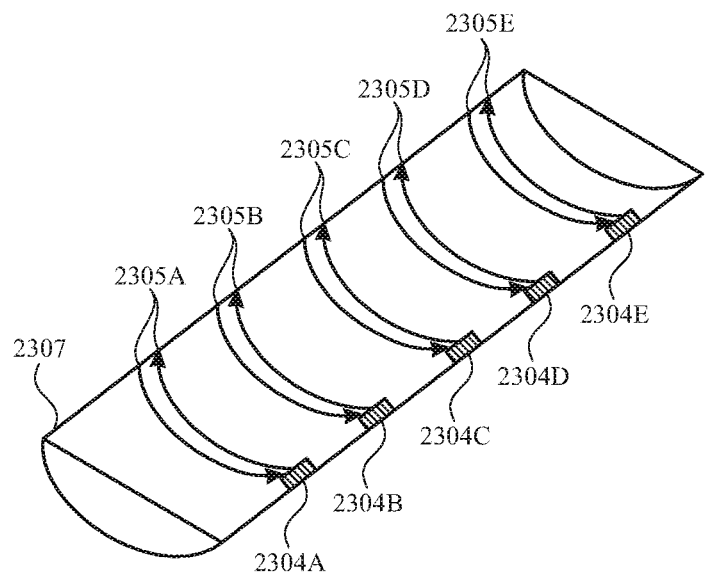
FIGS. 23A-23B illustrate exemplary acoustic touch sensing configurations applied to a curved surface according to examples of the disclosure.
Figure 23B:
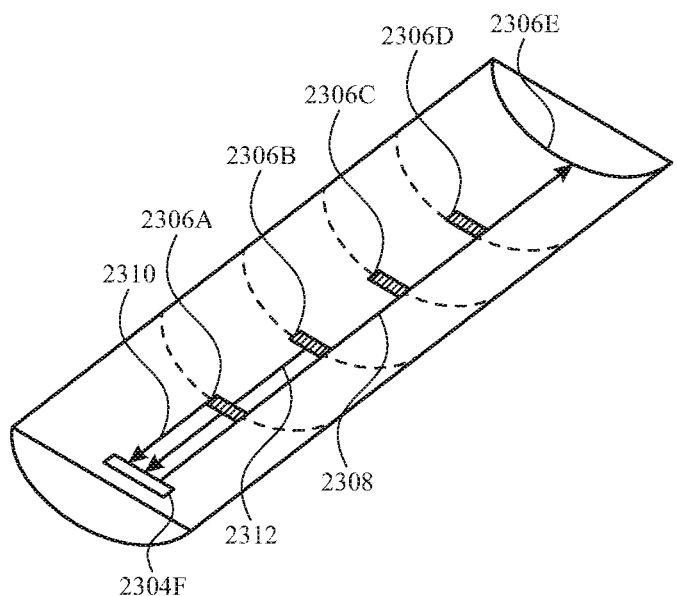

FIGS. 23A-23B illustrate exemplary acoustic touch sensing configurations applied to a curved surface according to examples of the disclosure. FIG. 23A illustrates a configuration using multiple transducers 2304A-2304E similar to the arrangement shown in FIG. 22B above. Each transducer 2304A-2304E can transmit an acoustic wave that can travel along the path 2305A-2305E that follows the curved surface of the device. The acoustic wave can be reflected by an edge of the device 2307, and can return along the same path 2305A-2305E following the curved surface in the opposite direction. In some examples, a barrier (e.g., barriers 2206E-2206J) can be placed near edge 2307 instead of relying on the edge to act as a barrier. As another alternative, backscatter detection as illustrated in FIG. 5C can be used in conjunction with each of the transducers 2304A-2304E. It should be understood that a configuration analogous to the one depicted in FIG. 23A could be used on non-curved surfaces.

FIG. 23B illustrates a barrier based configuration on a curved surface that is similar to the arrangement shown in FIG. 22A above. Transducer 2304F (which can correspond to transducers 1704A-1704D or 2204C-2204D above) can be coupled to a portion of a curved surface, and can transmit acoustic energy in the direction of arrow 2308. Barriers 2306A-2306D (which can correspond to barriers 1706A-1706D and 2204C-2204D above) can reflect a portion of the transmitted acoustic energy in the direction of the transducer 2304F. The first two exemplary reflections are illustrated by arrows 2310 and 2312, respectively, and it should be understood that the barriers 2306C-2306D, and the end wall 2306E can produce additional reflections of the transmitted energy that are not illustrated. The exemplary configuration can be used to detect a location of contact by an object (e.g., a user's finger or palm) in the same manner as described above regarding FIGS. 17 and 22A. Thus, the configurations of FIGS. 23A and 23B illustrate how exemplary acoustic touch sensing configurations according to the disclosure can be used with surfaces that are curved, and are not limited to use along flat surfaces.

Figure 24A:
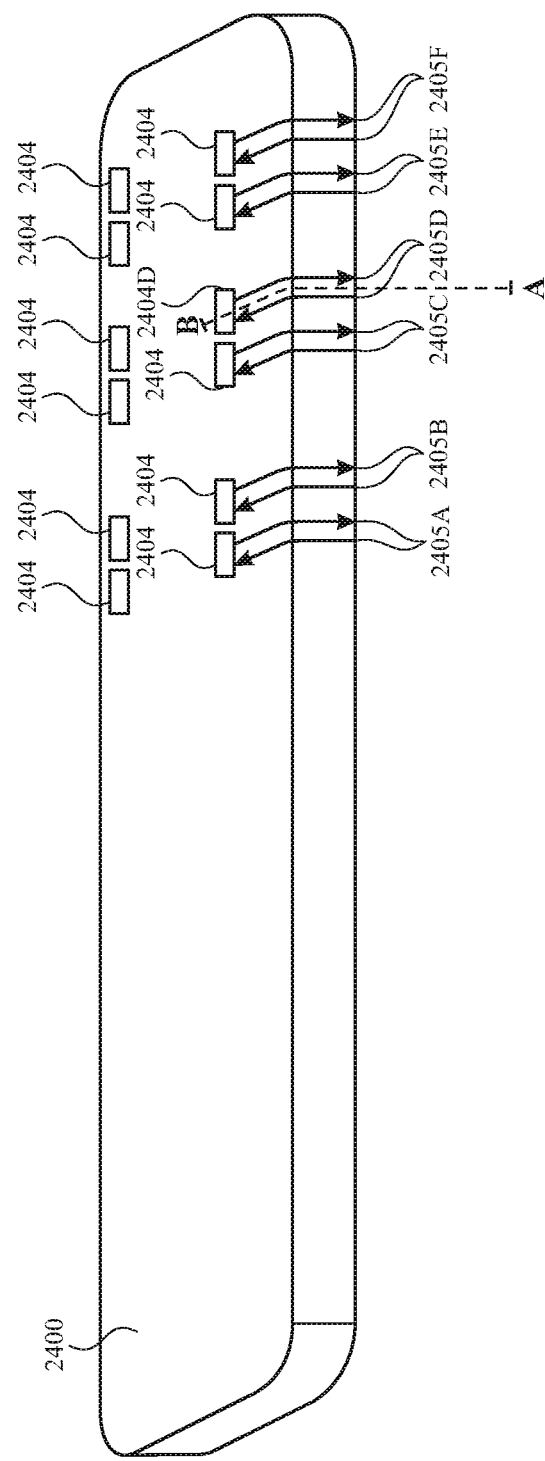
FIGS. 24A-24C illustrate an exemplary implementation of an acoustic touch sensing system for detecting contacts along edges and/or along the back of a device according to examples of the disclosure.
Figure 24B:
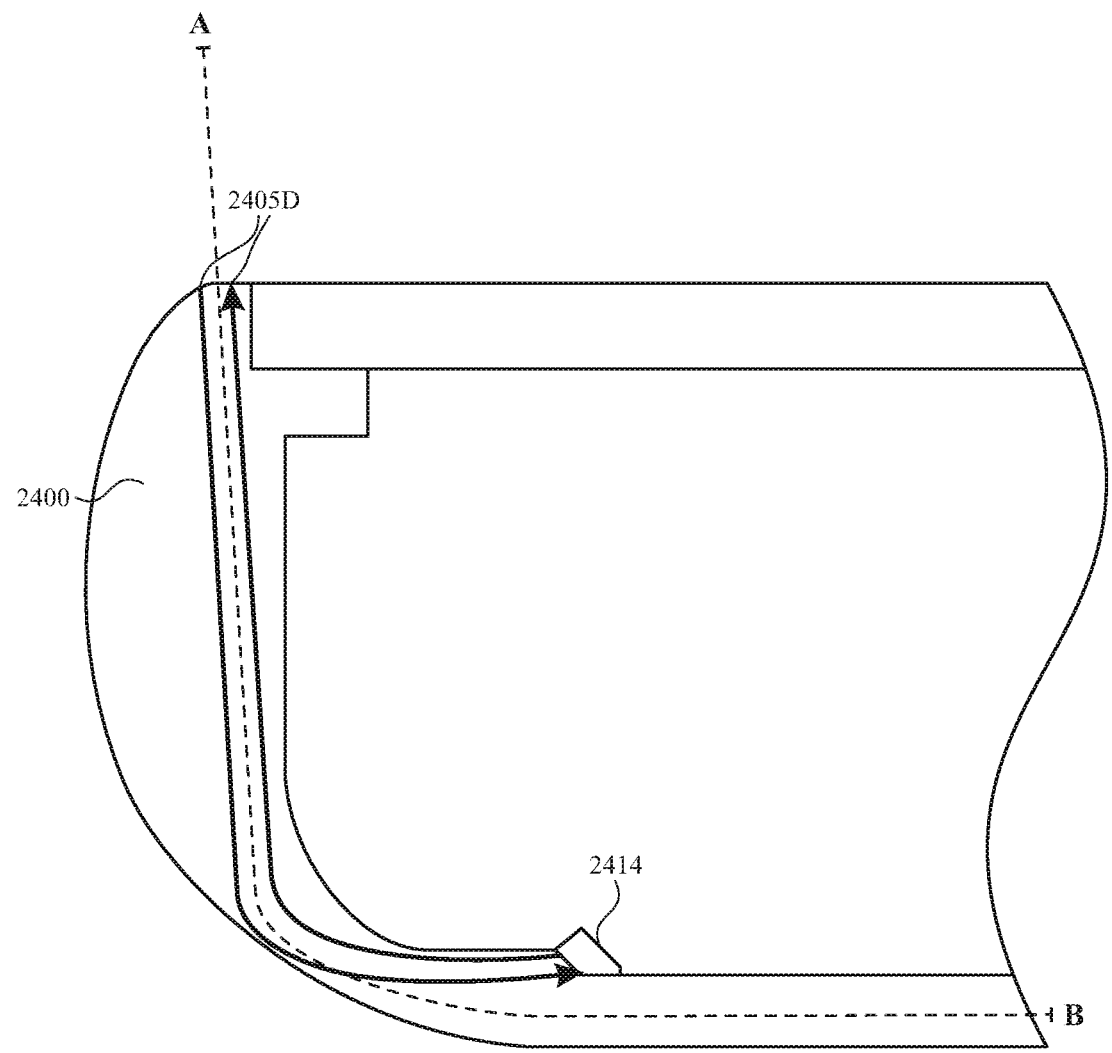
Figure 24C:
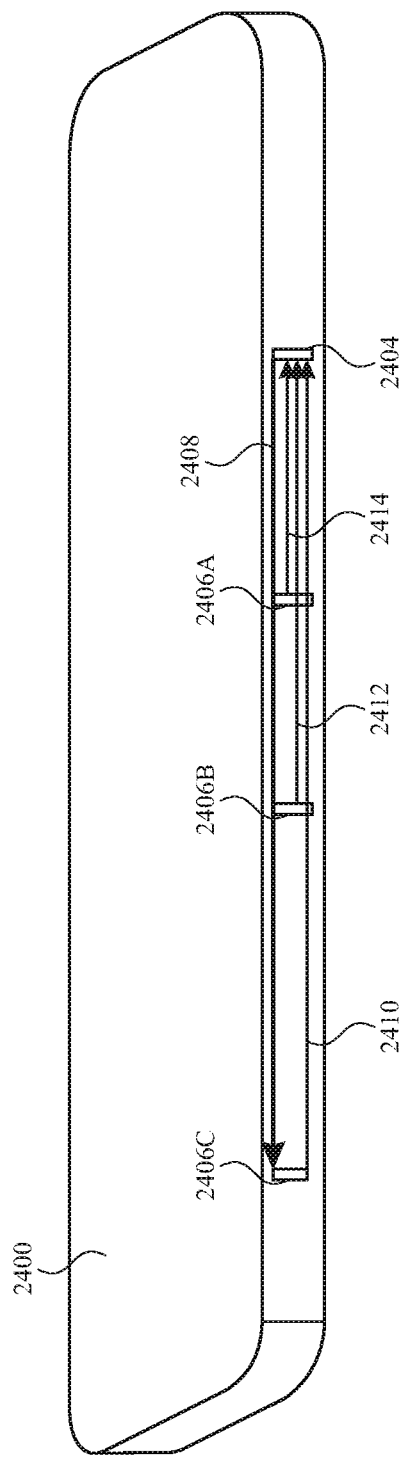

FIGS. 24A-24C illustrate an exemplary implementation of an acoustic touch sensing system for detecting contacts along edges and/or along the back of a device 2400 according to examples of the disclosure. FIG. 24A illustrates exemplary transducer 2404 placement on a back surface of device 2400. As described above, the transducers 2404 can be located on the inner surface (i.e., inside of the housing) such that a user would not be able to see or feel the transducers. The transducers 2404 can transmit acoustic energy along the surface of the device, as illustrated in FIGS. 22A-22C, 23A-23B, and 21A. The configuration, as presented, can most closely resemble the configuration described in FIG. 23A, where transmitted energy from the transducers 2404 can travel along a curved surface (e.g., around a curved edge of device 2400), reflect, and return to the transducers. In some examples, the transmitted energy can be reflected by an interface between the housing of the device 2400 (e.g., a metal housing) and the display (not shown) of the device (e.g., glass). In some examples, each transducer 2404 can detect contact by an object (e.g., a user's finger or palm) along the path of the transmitted and reflected energy by comparing detected energy to a baseline energy level as described above.

FIG. 24B illustrates a cross-section of device 2400 along the line A-B illustrated in FIG. 24A. FIG. 24A more clearly illustrates how the transducers 2404 can be located within and attached to the housing of device 2400. The general path of transmitted and reflected energy can be understood to travel along the direction of arrows 2405D. In some examples, depending on characteristics of the medium, the wave can disperse by different amounts depending on at least the type of transmitted wave and material properties of the housing. In other words, depending on the type of wave and type of material, the transmitted wave may travel very close to the surface where the transducer 2404 is providing acoustic energy, or the wave may disperse more deeply into the medium. A baselining technique can be used to determine the reflected energy when no object contacting near a particular transducer 2404, and deviations from the baseline reflected energy can be used to detect contact by an object (e.g., a user's finger or palm) as described above.

FIG. 24C illustrates a second exemplary transducer 2404 placement on sides of device 2400. Transducer 2404 can correspond to transducers 2204C-2204D, 2304F, or 2104A in FIGS. 22A, 23B, and 21A above, and can be located on an interior surface of the housing of device 2400. Barriers 2406A-2406C can be spaced at different distances to form distinguishable touch sensitive regions (e.g., touch pixels) as described above regarding FIGS. 22A-22C and FIG. 23B. As described above, in some examples, the barriers 2406A-2406C can be added explicitly for the purposes of acoustic touch sensing. Also as described above, in some examples, discontinuities on the interior surface of device 2400 can exist for other reasons (e.g., structural support, mechanical attachment, component cavities, etc.) and the discontinuities can also act as barriers 2406A-2406C to provide reflections that can be detected by the transducer 2404. Energy from transducer 2404 can be transmitted in direction 2408, and reflections from the barriers 2406A, 2406B, and 2406C can return along arrows 2414, 2412, and 2410 respectively. The baselining techniques above can be used to distinguish between whether objects (e.g., a user's fingers or palm) are contacting the device 2400 between barriers 2406A, 2406B, and 2406C as described above regarding FIGS. 22A, 23B, and 21A.

Figure 25A:
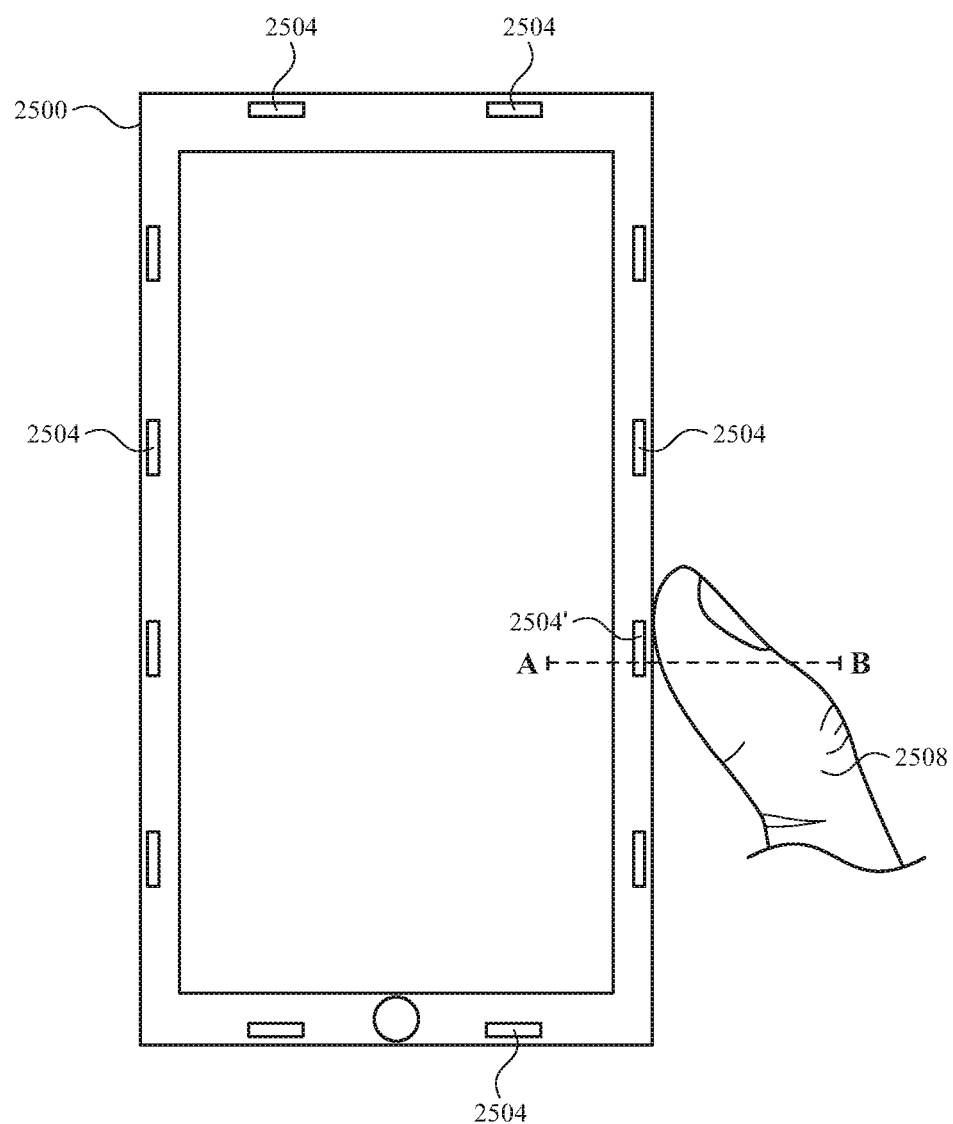
FIGS. 25A-25B illustrate a device including an exemplary acoustic touch sensing configuration for providing inputs at edges of the device according to examples of the disclosure.
Figure 25B:
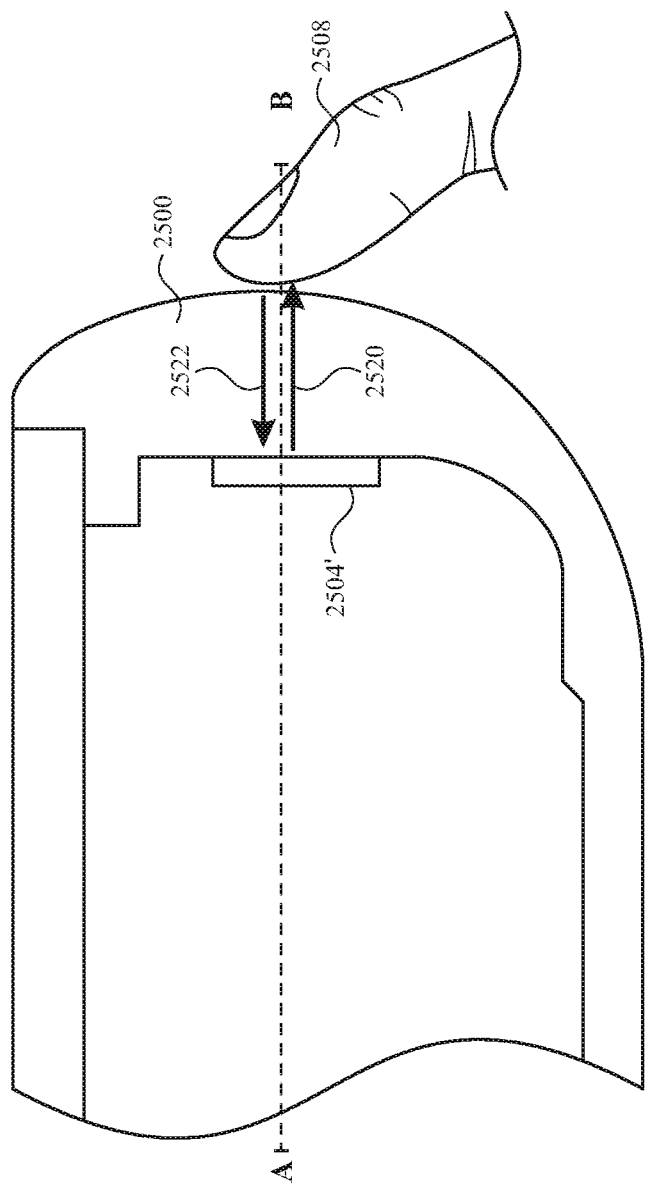

FIGS. 25A-25B illustrate a device 2500 including an exemplary acoustic touch sensing configuration for providing inputs at edges of the device according to examples of the disclosure. As illustrated in FIG. 25A, the exemplary device 2500 can correspond to any of the devices 136, 140, 144, 148, or 154 above. As illustrated, transducers 2504 can be disposed around edges of the device 2500. In some examples, the transducers 2504 can correspond to the transducers 2104 in FIG. 21B, and configured to transmit energy through the thickness of the substrate of the device 2500. As described above, the configuration in FIG. 21B can be used to provide a plurality of localized input locations, such that a touching object 2508 (e.g., a user's finger or palm) can be detected by a transducer 2504' in an area in close proximity to the corresponding transistor. As will be described in FIG. 26, each transducer 2504 can correspond to an input location for the device 2500. In should be noted that in some examples, more or fewer transducers 2604 and 2604' can be disposed around the edges of the device. In addition, in some examples, transducers 2604 and 2604' can be located on the back or front faces of the device 2600 for providing similar functionality to the transducers on the edges of the device.

Figure 26:
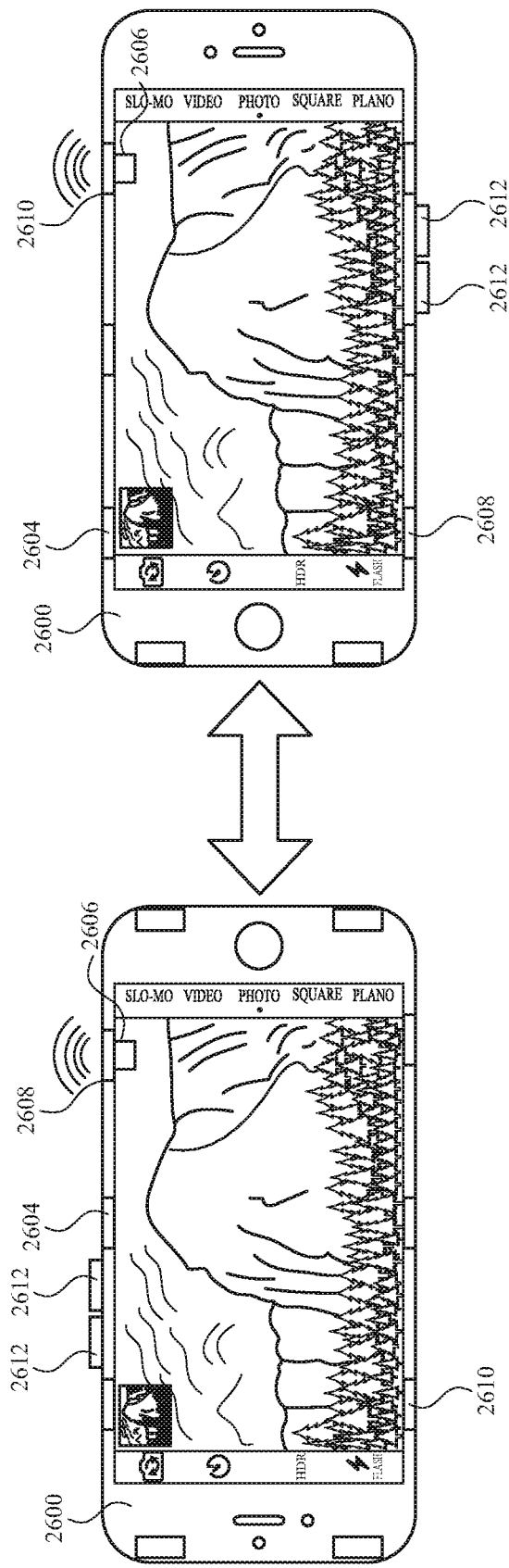
FIG. 26 illustrates an exemplary application for acoustic touch sensing according to examples of the disclosure.

FIG. 25B illustrates a cross-section across the line A-B illustrated in FIG. 25A above. As can be understood from the illustration, the transducer 2504' can be attached to an inner edge of the housing of device 2500. Energy from transducer 2504' can be transmitted through the thickness of the substrate in direction 2520, and reflected energy can return in the direction 2522 (which can correspond to directions 2120 and 2122 in FIG. 21B above). In some examples, each transducer can be used to create a localized input location positioned on different portions of the device. FIG. 26 below illustrates an exemplary application for the configurations shown in FIGS. 25A-25B.

FIG. 26 illustrates an exemplary application for acoustic touch sensing according to examples of the disclosure. In some examples, device 2600 (which can correspond to devices 136, 140, 144, 148, or 154 above) can include sensors (not shown) for determining an orientation of the device. In some examples, based on the orientation detected by the above mentioned sensors, the display (e.g., a graphical interface), can be rotated to maintain a consistent alignment relative to the user. In other words, the user can rotate the device 2600 by 180 degrees as illustrated while maintaining the orientation of the displayed graphics relative to the user. Device 2600 can include buttons 2612, which can be physical and mechanical buttons (e.g., for depressing a mechanical switch) at fixed locations. In some examples, the buttons 2612 can protrude from the edges of the device 2600. As illustrated, when the device 2600 is rotated between the orientation shown on the left and the orientation shown on the right, the location of the buttons relative to the graphical interface can change. Because of the movement of buttons, it can be difficult for a user to control functions of the device in both orientations. For example, one of the two buttons 2612 may be used to take a picture when the device is in the camera mode. In some examples, when the device 2600 is in the left illustrated orientation, the buttons 2612 are located in the top left portion of the device. By contrast, in the right illustrated orientation, the buttons 2612 are located in the bottom right portion of the device 2600.

In addition to the buttons 2612, the device 2600 can include a plurality of transducers 2604, 2606, and 2610 (which can correspond to transducers 2504 and 2504' above). In some examples, the transducers 2604, 2608, and 2610 can be used to provide a consistent user input location relative to the device 2600 without providing additional protruding buttons 2612. As illustrated, an application (e.g., a camera application) running on a device can include an icon 2606 (or other graphical indication) in a fixed location of the interface (i.e., the icon can move when the device is rotated), that can correspond to an input location for a function (e.g., an input location for taking a picture). In some examples, the transducer that corresponds to the icon 2606 (and the function) can be adaptably changed to match with the location of the icon. For example, transducer 2608 can be used for detecting an input at the location of icon 2606 in the left illustrated orientation, and transducer 2610 can be used for detecting an input at the location of icon 2606 in the right illustrated orientation. By using this configuration, a user can perform an action by pressing in the same relative location of the device regardless of an orientation of the device.

Figure 27A:
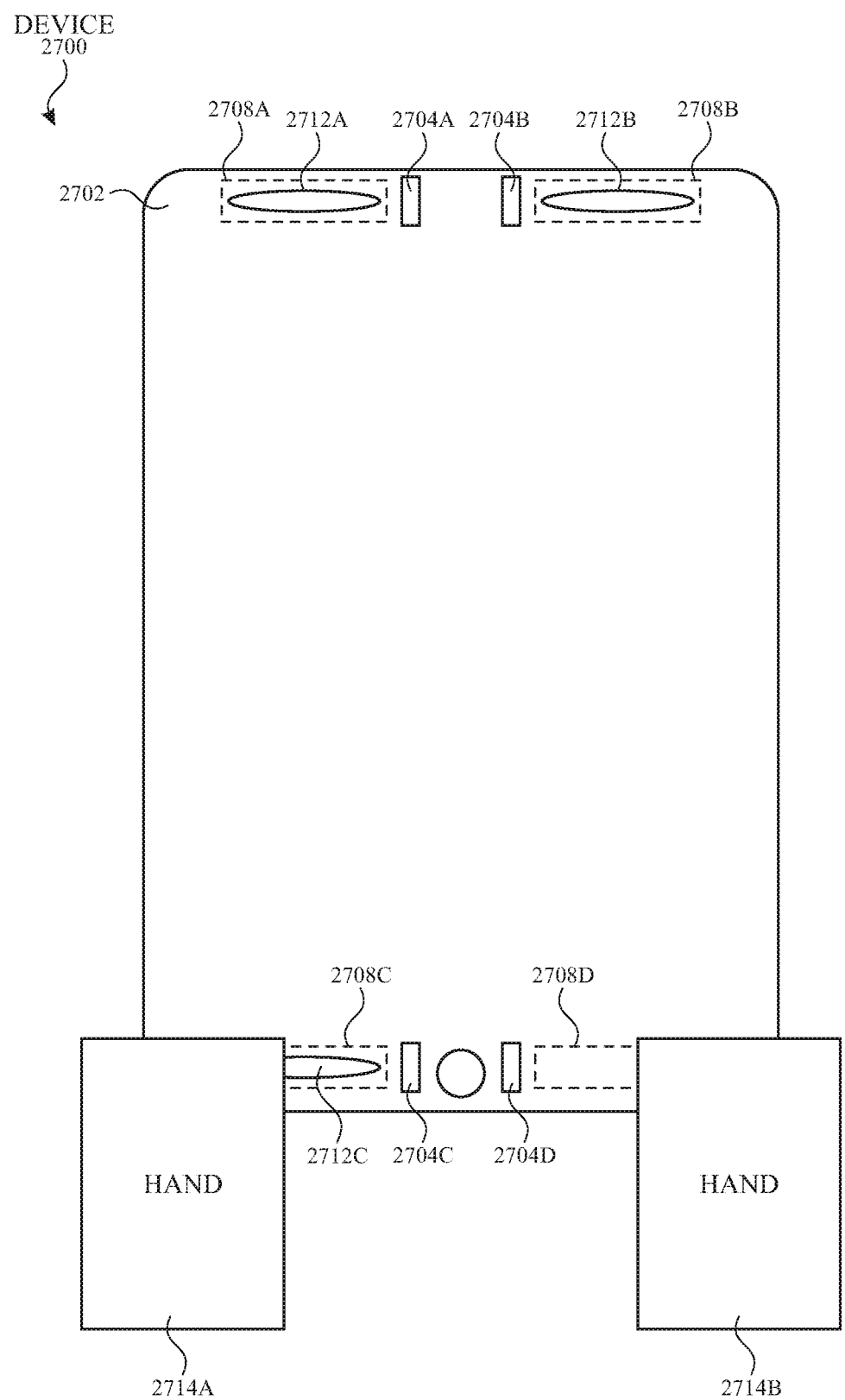
FIGS. 27A-27B illustrate an exemplary device including an application of the acoustic touch sensing system for detecting user hand position on the device proximate to antenna elements according to examples of the disclosure.
Figure 27B:
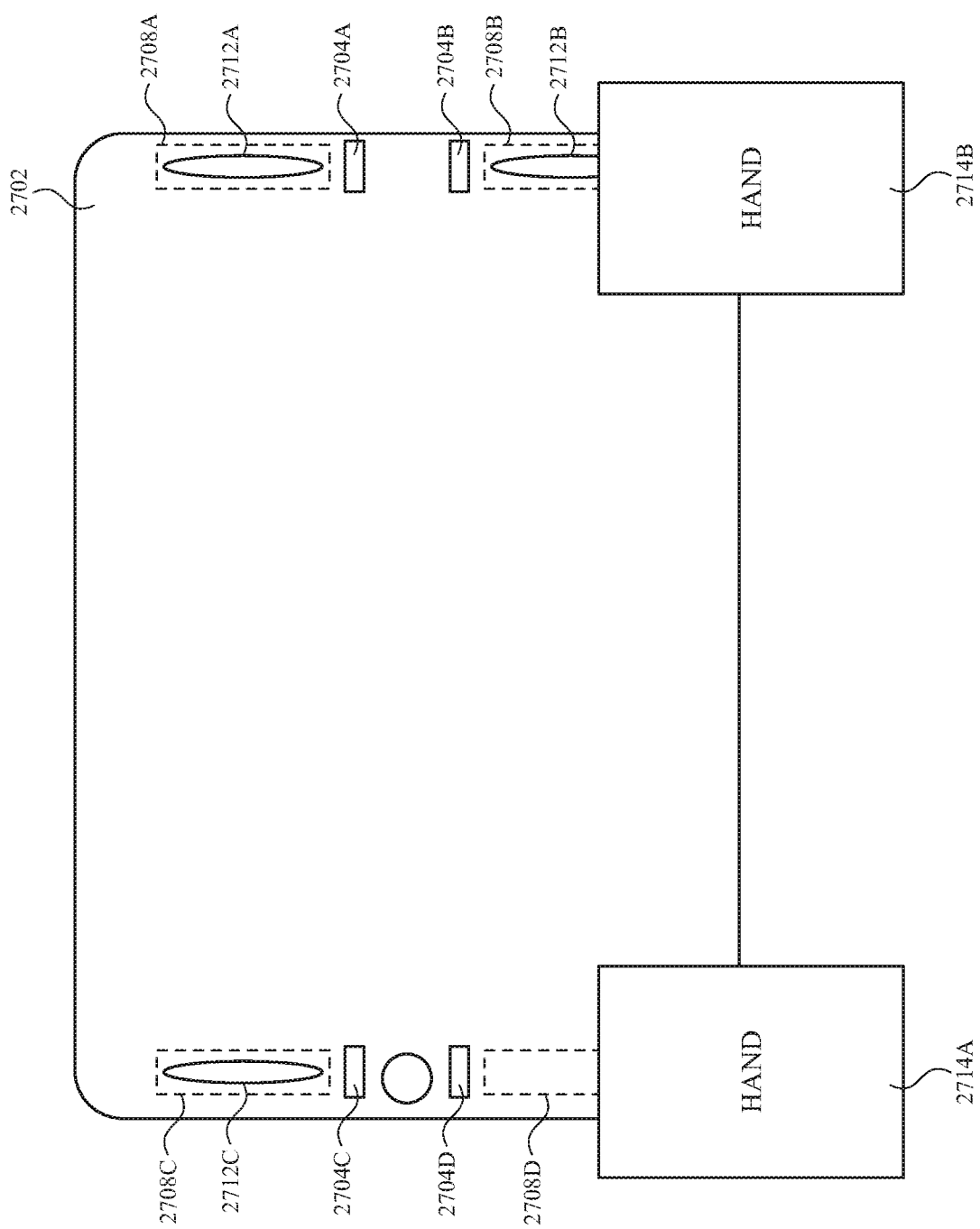

FIGS. 27A-27B illustrate an exemplary device 2700 including an application of the acoustic touch sensing system for detecting user hand position on the device proximate to antenna elements according to examples of the disclosure. In some examples, transducers 2704A-2704D (which can correspond to transducers 2204C-2204D above) can be coupled to one or more surfaces of device 2700 as described above in FIG. 22A-C. Active zones 2708A-2708D (which can correspond to active zones 2208C-2208D above) can be formed by the transducers 2704A-2704D and surface discontinuities (which can correspond to barriers 2206C-2206D above). To simplify the illustration, the discontinuities (e.g., barriers 2206C-2206D above) are not shown in the figure. In some examples, one or more of the active zones 2708A-2708D can correspond to a position of an antenna element 2712A-2712C within the housing of the electronic device. As explained above, an acoustic touch sensing configuration can be preferable in regions adjacent to antenna elements 2712A-2712C because metal traces associated with other types of touch sensing, such as capacitive and resistive touch sensing, can interfere with operation of antenna elements. In some examples, each antenna element 2712A-2712C can be used for a different communication protocol (e.g., Wi-Fi, Bluetooth, cellular, etc.). In some examples, individual antenna elements 2712A-2712C can be shared by multiple different protocols either individually or in combination. In some examples, the active zones 2708A-2708D can be used to detect whether or not a user's fingers (or palm) are present in the location of the active zones as described above.

FIG. 27A illustrates the exemplary device 2700 being held in the portrait orientation with hands 2714A and 2714B located in contact with active zones 2708C and 2708D. The acoustic touch sensing system of device 2700 (as implemented by any of the configurations described in FIGS. 21-25 above) can be used to detect the position of hands 2714A and 2714B by detecting contact of a user's fingers (or palm). In some examples, the transducers 2704A-2704D can be coupled to the cover substrate (e.g., cover glass). In the exemplary configuration of FIG. 27A, transducers 2704A-2704D are illustrated in a configuration that can correspond to the disclosure in FIG. 22A, but it should be clear that transducer configurations from any of the configurations in FIG. 21-25 above can be used while remaining within the scope of the present disclosure. In the exemplary device 2700 of FIG. 27A, the left hand 2714A can also be located in the vicinity of an antenna element 2712C co-located with active zone 2708C. Information about the user's hand being proximate to an antenna element can be useful for optimizing antenna performance as will be described in further detail below regarding FIGS. 28 and 29. Although three antenna elements 2712A-2712C are shown in the exemplary device 2700, the acoustic touch sensing configuration can be used to detect proximity of an object to antenna elements in a device that includes any number of antenna elements. The active zone 2708D can be used to detect contact by the user's right hand 2714B. In the exemplary device, active zone 2708D intentionally excludes an antenna element. Despite a lack of an antenna element proximate to active zone 2708D, information about the location of the user's hand being in active zone 2708D can be useful for optimizing antenna performance as will be described in further detail below regarding FIGS. 28 and 29.

FIG. 27B illustrates the exemplary device 2700 being held in the landscape orientation with hands 2714A and 2714B located in contact with active zones 2708B and 2708D. In the landscape orientation, left hand 2714A can be again proximate to zone 2708D and not proximate to any antenna element. In some examples, right hand 2714B can be proximate to antenna element 2712B located within active zone 2708B. Both pieces of information regarding the position of the user's left hand 2714A and right hand 2714B can be useful for optimizing antenna performance as will be described in further detail below regarding FIGS. 28 and 29. Although antenna elements 2712A-2712C are shown in the device at the upper left, upper right, and lower left locations, it should be understood that more or fewer antennas can be included in a device, or antennas can be located in different locations while still remaining within the scope of the present disclosure. Both detected user hand locations can be used to optimize RF performance of the device (e.g., optimizing performance of antenna elements 2712A-2712C) as will be described in more detail below regarding FIGS. 28 and 29. In addition or in the alternative to the acoustic transducer configuration illustrated above in FIGS. 27A-27B, acoustic touch sensors for finger and/or grip detection can be placed on the back and/or sides of the device housing as illustrated in FIGS. 21, 23 and 24 above. It should be understood from the examples above that acoustic touch sensing can be adapted for object detection on any surface of an electronic device, including in the touch screen area.

Figure 28:
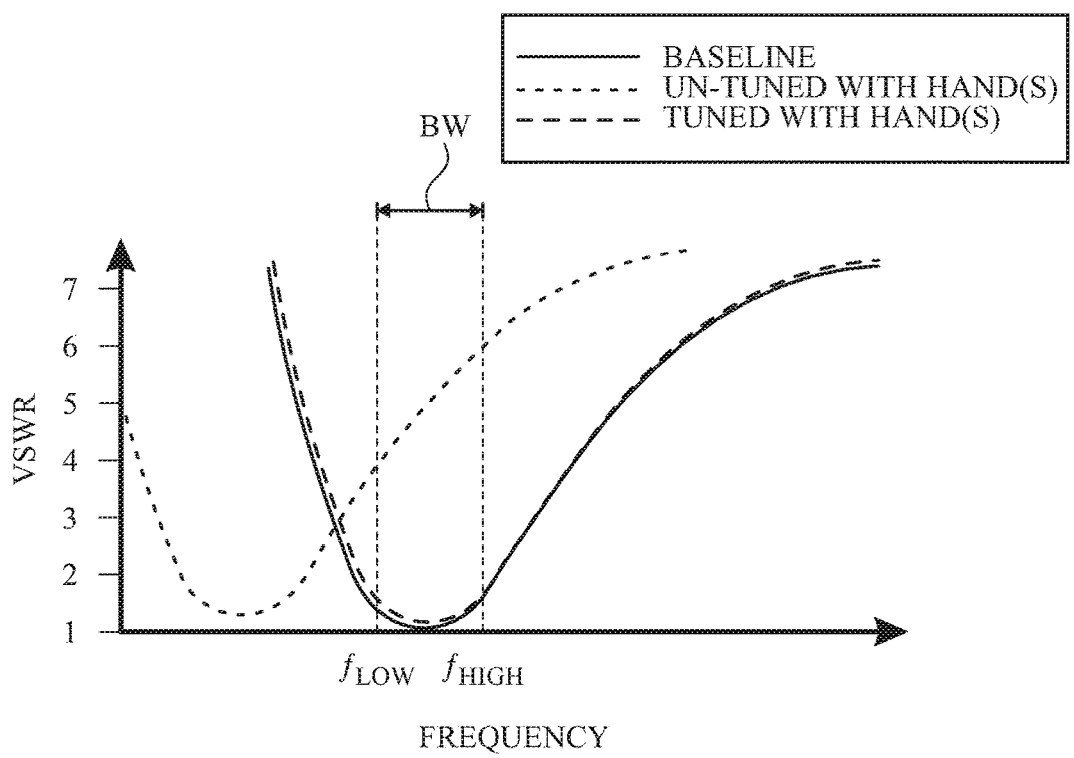
FIG. 28 illustrates an exemplary data plot of frequency against voltage standing wave ratio (VSWR) illustrating one exemplary RF performance optimization that can utilize the acoustic touch sensing configurations according to examples of the disclosure.

FIG. 28 illustrates an exemplary data plot of frequency against voltage standing wave ratio (VSWR) illustrating one exemplary RF performance optimization that can utilize the acoustic touch sensing configurations according to examples of the disclosure. The exemplary data plot can be understood with reference to exemplary device 2700 illustrated in FIGS. 27A-27B above. The frequency axis of FIG. 28 includes a bandwidth of interest (BW) that has a low end frequency $f_{LOW}$ and a high end frequency $f_{HIGH}$. The bandwidth of interest BW can correspond to a frequency band allocated to a communication protocol used by the antenna elements 2712A-2712C of the device 2700 above for RF communication (e.g., Wi-Fi, Bluetooth, cellular, etc.). In order to optimize device performance, the antenna system for a particular communication protocol can be designed to achieve a VSWR below a target or threshold VSWR within the bandwidth of interest BW. The solid curve in FIG. 28 illustrates a baseline curve for an antenna system when there are no hands proximate to the device (e.g., device 2700 above). Within the bandwidth of interest BW, the baseline curve is shown to have a VSWR value less than 1.5. The VSWR maximum value within BW can be used as an indicator of whether the antenna is performing within specification. For the purposes of explaining FIG. 28, a target or threshold value of VSWR of 1.5 may be mentioned. However, the value 1.5 for VSWR is merely exemplary and a different target or threshold VSWR can be selected while remaining within the scope of the present disclosure.

The dotted curve in FIG. 28 illustrates a VSWR curve that has been shifted by the presence of one or more hands in proximity to at least one antenna element (e.g., right hand 2714B near antenna element 2712B in FIG. 27B above) belong to a radio frequency communication system of the device. For example, the shifted curve may represent the case of a user holding a device in the landscape orientation as illustrated in FIG. 27B, where one hand is located in proximity to an antenna element 2712B. The presence of the user's hand can alter operation of the antenna element 2712B and cause a frequency shift of the VSWR plot due to loading of the antenna by the user's hand. As illustrated, within the bandwidth of interest BW, the minimum VSWR value of the dotted curve can be above 3, significantly above the target or threshold level of 1.5 within the bandwidth of interest BW. The dotted curve is illustrated having a portion of the curve that is below the target or threshold VSWR value 1.5 occurring at a frequency well below $f_{LOW}$ (i.e., representing a shift of the baseline curve to the left). In some examples, the presence of a user's hand could result in a shift of the baseline curve to the right instead, which can also result in the VSWR value within the bandwidth of interest BW being above the target or threshold VSWR (e.g., 1.5). These shifts in the frequency against VSWR curve can be a result of changes in an antenna loop length, changes in impedance matching for the antenna, or other similar changes in antenna performance that can result from proximity of a grounded or ungrounded user's hand near one or more antenna elements (e.g., 2712A-2712C above).

The dashed curve in FIG. 28 illustrates a frequency vs. VSWR curve that has been tuned or compensated to account for presence of a user's hand in the vicinity of one or more antenna element (e.g., right hand 2714B near antenna element 2712B in FIG. 27B above). The dashed curve can be understood as a shift back to the right of the dotted (untuned) curve. In some examples, the antenna elements 2712A-2712C (or circuitry connected to the antenna elements) can be reconfigurable allow for tuning of RF communications. When an object such as a user's hand is detected proximate to one or more of the antenna elements, parameters related to the antenna elements can be reconfigured to compensate and maintain the device operation within desired parameters (i.e., maintaining VSWR within the bandwidth of interest BW below the target or threshold VSWR value). Possible reconfigurable parameters can include load adjustment, antenna loop length adjustment, phase adjustment, frequency adjustment, power adjustment, filtering adjustment, or any number of other adjustable parameters, including parameters specific to a particular communications protocol. In some examples, reconfiguration of the antenna elements can be accomplished by providing selectable states for antenna operation.

In some examples, variable loads can be provided for tuning the antenna characteristics. In some examples, one or more variable capacitance loads can be provided to the antenna(s) of the device (e.g., device 2700 above), and adjusted to compensated for capacitance introduced by a palm and/or fingers. In the preceding description of FIG. 28, VSWR has been selected as an illustrative performance metric of antenna performance for an RF communication system, where VSWR can be indicative of impedance matching in an antenna system, antenna loop length and/or can be indicative of power efficiency of the antenna system. It should be understood that the techniques described in the present disclosure can be used to optimize other RF performance metrics while remaining within the scope of the present disclosure.

Figure 29:
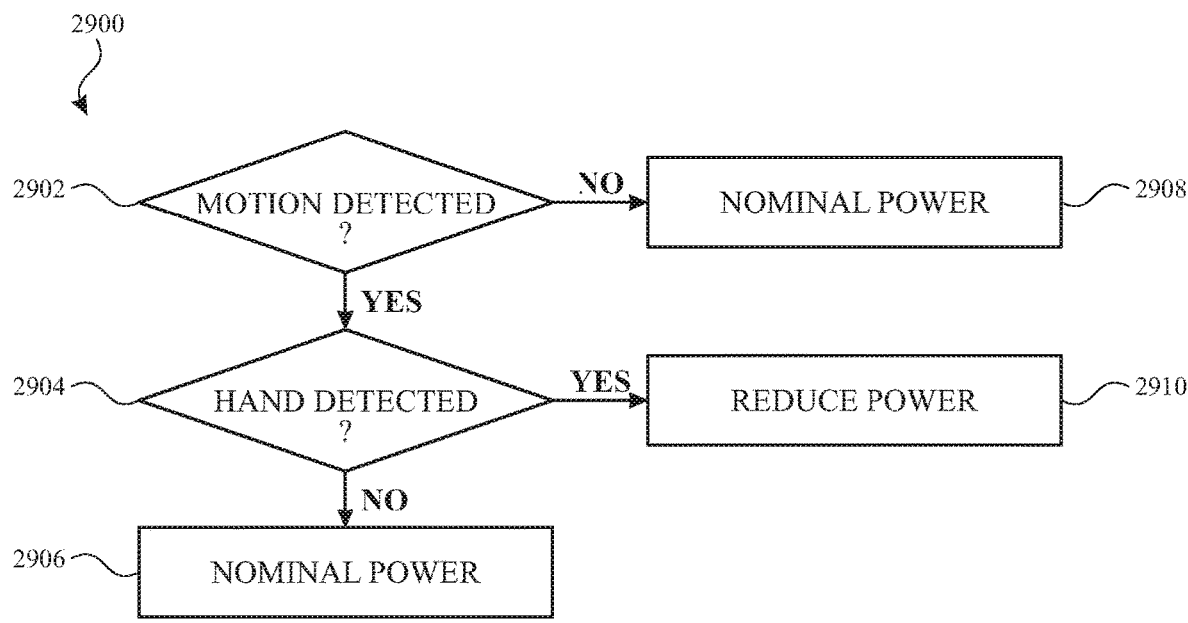
FIG. 29 illustrates an exemplary method for utilizing acoustic touch sensing to optimize RF performance of an electronic device according to examples of the disclosure.

FIG. 29 illustrates an exemplary method 2900 for utilizing acoustic touch sensing to optimize RF performance of an electronic device (e.g., devices 136, 140, 144, 148, and 150 above) according to examples of the disclosure. At step 2902, method 2900 can determine whether an electronic device is on a human body based on movement of the object. For example, each human body may move with a particular natural frequency that can be detected to determine whether an electronic device is somewhere on the user's body. As one example, an individual's nervous system can be constantly making minor adjustments of hand position for a device being held in the user's hand, and the adjustments can occur at a natural frequency specific to the user. In another example, a natural frequency associated with the user might be a stride frequency when a user is walking and the device is being held in the user's pocket or hand. In some examples, human body motion can be detected by an accelerometer or other motion detector included within the device, and information from the motion detector can be used to determine whether or not the device is likely in contact with a human body.

In order to comply with safety requirements regarding total acceptable power that can be transmitted into a user's body tissue, the antennas (e.g., antenna elements 2712A-2712C) can be configured to operate with reduced power when it is determined that the device is in contact with a user's body. If at step 2902 it is determined based on a lack of motion that the device is likely not in contact with a user's body, at step 2908 the device can be configured to operate at a nominal (i.e., relatively high) power level. However, if at step 2902 it is determined that the device is in motion and is likely in contact with a user's body, at step 2904 the method 2900 can further determine whether the user (e.g., the user's finger or palm) is contacting the device near an antenna element (e.g. antenna elements 2712A-2712C above). In some examples, when the device is moving but a user's hand is not in the vicinity of any of the device's antennas, a nominal (i.e., relatively high) amount of power might actually be safe for the user. For example, if the user is holding a device with only the right hand 2714B of the exemplary configuration in FIG. 27A (i.e., with left hand 2714A removed from the device), all of the antennas elements 2712A-2712C can be located at portions of the device physically separated from the user's hand. In this case, the RF exposure level to the user at a nominal transmitting power can be safe even though the device is in contact with the user's body and motion is detected at step 2902. If it is determined that a user's hand is not detected near any antenna elements, at step 2906 the device can be configured to operate at the nominal power level. However, if it is determined that a hand is located in proximity to one of the antenna elements (e.g., 2712A-2712C), at step 2910 the device can be configured to operate the antennas at a reduced power level. In some examples, only power specific to a subset of antenna elements near the user's detected hand position can be reduced, rather than reducing power to all antennas in the device. It should be understood from the method 2900 that having the ability to determine the user's hand position can allow for a less conservative power model that remains safe for the user and complies with applicable regulatory requirements.

In contrast, an alternative method (not shown) could proceed immediately to a reduced power configuration if it is determined at step 2902 that the object is in motion and likely in contact with a user's body. In the absence of user hand position information, antenna transmission power for all antennas within the device may be reduced any time the motion detector/accelerometer determines that the device is likely in contact with a user's body based on motion alone. In this alternative configuration, if the user's hand is actually far away from the antenna elements, then the power is reduced unnecessarily, which can negatively impact communication performance. The method 2900 further illustrates how acoustic touch sensing according to examples of the disclosure can be used to optimize RF performance of an electronic device.

It should be understood that in addition to the power levels shown and described above, additional information can be used to determine an appropriate power level. For example, power can be reduced when a user is on a call and audio is being delivered to the handset speaker of a telephone, as it is likely that the device is close to a user's head. The power level (referred herein as the "head power level") for the described condition may be different from both the nominal power associated with 2906 above and the reduced power associated with step 2910 above, or may be the same as the reduced power level associated with step 2910 above. In some examples, an alternative method (not shown) can determine whether the device should use the head power level prior to proceeding with method 2900 at step 2902.

Therefore, according to the above, some examples of the disclosure are directed to an acoustic sensing system. The acoustic sensing system can comprise: a surface; a plurality of ultrasonic transceivers coupled to edges of the surface; and a processor coupled to the plurality of ultrasonic transceivers. The processor can be configured to: determine a first time of flight between a first ultrasonic wave generated by a first transceiver of the plurality of transceivers and a first reflection received at the first transceiver; determine a second time of flight between a second ultrasonic wave generated by a second transceiver of the plurality of transceivers and a second reflection received at the second transceiver; detect, based on at least one of the first time of flight or the second time of flight, an object in contact with the surface; and determine a location of the object based on at least the first time of flight and the second time of flight. Additionally or alternatively to one or more of the examples disclosed above, in some examples, the processor can be further configured to: determine a first location of a first edge of the object based on the first time of flight and a second location of a second edge of the object based on the second time of flight; and determine the location of the object based on the first location of the first edge, the second location of second edge, and a dimension of the object. Additionally or alternatively to one or more of the examples disclosed above, in some examples, the processor can be further configured to: determine a third time of flight between a third ultrasonic wave generated by a third transceiver of the plurality of transceivers and a third reflection received at the third transceiver; determine a fourth time of flight between a fourth ultrasonic wave generated by a fourth transceiver of the plurality of transceivers and a fourth reflection received at the fourth transceiver; detect, based on at least one of the first time of flight, the second time of flight, the third time of flight, or the fourth time of flight, the object in contact with the surface; and determine the location of the object based on at least the first time of flight, the second time of flight, the third time of flight and the fourth time of flight. Additionally or alternatively to one or more of the examples disclosed above, in some examples, the processor can be further configured to: determine a first location of a first edge of the object based on the first time of flight, a second location of a second edge of the object based on the second time of flight, a third location of a third edge of the object based on the third time of flight, and a fourth edge of the object based on the fourth time of flight; and determine the location of the object based on the first location of the first edge, the second location of second edge, the third location of the third edge, and the fourth location of the fourth edge. Additionally or alternatively to one or more of the examples disclosed above, in some examples, determining the location of the object can comprise determining a centroid of the object based on a bounding box formed by the first edge, the second edge, the third edge, and the fourth edge. Additionally or alternatively to one or more of the examples disclosed above, in some examples, the processor can further be configured to: determine a fifth time of flight between the first ultrasonic wave generated by the first transceiver of the plurality of transceivers and a fifth reflection received at the first transceiver; determine a sixth time of flight between the second ultrasonic wave generated by the second transceiver of the plurality of transceivers and a sixth reflection received at the second transceiver; determine a seventh time of flight between the third ultrasonic wave generated by the third transceiver of the plurality of transceivers and a seventh reflection received at the third transceiver; determine an eighth time of flight between the fourth ultrasonic wave generated by the fourth transceiver of the plurality of transceivers and an eighth reflection received at the fourth transceiver; detect, based on at least one of the first time of flight, the second time of flight, the third time of flight, the fourth time of flight, the fifth time of flight, the sixth time of flight, the seventh time of flight, or the eighth time of flight, an additional object in contact with the surface; and determine a location of the additional object based on the location of the object and based on the first time of flight, the second time of flight, the third time of flight, the fourth time of flight, the fifth time of flight, the sixth time of flight, the seventh time of flight, and the eighth time of flight. Additionally or alternatively to one or more of the examples disclosed above, in some examples, the processor can be further configured to: determine a fifth time of flight between a fifth ultrasonic wave generated by the fifth transceiver of the plurality of transceivers and a fifth reflection received at the fifth transceiver; determine a sixth time of flight between a sixth ultrasonic wave generated by the sixth transceiver of the plurality of transceivers and a sixth reflection received at the sixth transceiver; determine a seventh time of flight between a seventh ultrasonic wave generated by the seventh transceiver of the plurality of transceivers and a seventh reflection received at the seventh transceiver; determine an eighth time of flight between an eighth ultrasonic wave generated by the eighth transceiver of the plurality of transceivers and an eighth reflection received at the eighth transceiver; detect, based on at least one of the first time of flight, the second time of flight, the third time of flight, the fourth time of flight, the fifth time of flight, the sixth time of flight, the seventh time of flight, or the eighth time of flight, an additional object in contact with the surface; and determine the location of the object and a location of the additional object based on the first time of flight, the second time of flight, the third time of flight, the fourth time of flight, the fifth time of flight, the sixth time of flight, the seventh time of flight, and the eighth time of flight. Additionally or alternatively to one or more of the examples disclosed above, in some examples, the first transceiver can be coupled to a first edge of the surface and the second transceiver can be coupled to a second edge of the surface. The first edge can be perpendicular to the second edge. Additionally or alternatively to one or more of the examples disclosed above, in some examples, the first transceiver can be coupled to a first edge of the surface, the second transceiver can be coupled to a second edge of the surface, the third transceiver can be coupled to a third edge of the surface, and the fourth transceiver can be coupled to a fourth edge of the surface. The first edge, second edge, third edge, and fourth edge can be different edges of the surface. Additionally or alternatively to one or more of the examples disclosed above, in some examples, at least two of the plurality of transceivers can be mounted on at least one edge of the surface. Additionally or alternatively to one or more of the examples disclosed above, in some examples, the surface can be a display screen.

Some examples of the disclosure are directed to a method of sensing for an acoustic sensing system comprising a surface and a plurality of ultrasonic transceivers coupled to edges of the surface. The method can comprise: determining a first time of flight between a first ultrasonic wave generated by a first transceiver of the plurality of transceivers and a first reflection received at the first transceiver; determining a second time of flight between a second ultrasonic wave generated by a second transceiver of the plurality of transceivers and a second reflection received at the second transceiver; detecting, based on at least one of the first time of flight or the second time of flight, an object in contact with the surface; and determining a location of the object based on at least the first time of flight and the second time of flight. Additionally or alternatively to one or more of the examples disclosed above, in some examples, the method can further comprise: determining a first location of a first edge of the object based on the first time of flight and a second location of a second edge of the object based on the second time of flight; and determining the location of the object based on the first location of the first edge, the second location of second edge, and a dimension of the object. Additionally or alternatively to one or more of the examples disclosed above, in some examples, the method can further comprise: determining a third time of flight between a third ultrasonic wave generated by a third transceiver of the plurality of transceivers and a third reflection received at the third transceiver; determining a fourth time of flight between a fourth ultrasonic wave generated by a fourth transceiver of the plurality of transceivers and a fourth reflection received at the fourth transceiver; detecting, based on at least one of the first time of flight, the second time of flight, the third time of flight, or the fourth time of flight, the object in contact with the surface; and determining the location of the object based on at least the first time of flight, the second time of flight, the third time of flight and the fourth time of flight. Additionally or alternatively to one or more of the examples disclosed above, in some examples, the method can further comprise: determining a first location of a first edge of the object based on the first time of flight, a second location of a second edge of the object based on the second time of flight, a third location of a third edge of the object based on the third time of flight, and a fourth edge of the object based on the fourth time of flight; and determining the location of the object based on the first location of the first edge, the second location of second edge, the third location of the third edge, and the fourth location of the fourth edge. Additionally or alternatively to one or more of the examples disclosed above, in some examples, determining the location of the object can comprise determining a centroid of the object based on a bounding box formed by the first edge, the second edge, the third edge, and the fourth edge. Additionally or alternatively to one or more of the examples disclosed above, in some examples, the method can further comprise: determining a fifth time of flight between the first ultrasonic wave generated by the first transceiver of the plurality of transceivers and a fifth reflection received at the first transceiver; determining a sixth time of flight between the second ultrasonic wave generated by the second transceiver of the plurality of transceivers and a sixth reflection received at the second transceiver; determining a seventh time of flight between the third ultrasonic wave generated by the third transceiver of the plurality of transceivers and a seventh reflection received at the third transceiver; determining an eighth time of flight between the fourth ultrasonic wave generated by the fourth transceiver of the plurality of transceivers and an eighth reflection received at the fourth transceiver; detecting, based on at least one of the first time of flight, the second time of flight, the third time of flight, the fourth time of flight, the fifth time of flight, the sixth time of flight, the seventh time of flight, or the eighth time of flight, an additional object in contact with the surface; and determining a location of the additional object based on the location of the object and based on the first time of flight, the second time of flight, the third time of flight, the fourth time of flight, the fifth time of flight, the sixth time of flight, the seventh time of flight, and the eighth time of flight. Additionally or alternatively to one or more of the examples disclosed above, in some examples, the method can further comprise: determining a fifth time of flight between a fifth ultrasonic wave generated by the fifth transceiver of the plurality of transceivers and a fifth reflection received at the fifth transceiver; determining a sixth time of flight between a sixth ultrasonic wave generated by the sixth transceiver of the plurality of transceivers and a sixth reflection received at the sixth transceiver; determining a seventh time of flight between a seventh ultrasonic wave generated by the seventh transceiver of the plurality of transceivers and a seventh reflection received at the seventh transceiver; determining an eighth time of flight between an eighth ultrasonic wave generated by the eighth transceiver of the plurality of transceivers and an eighth reflection received at the eighth transceiver; detecting, based on at least one of the first time of flight, the second time of flight, the third time of flight, the fourth time of flight, the fifth time of flight, the sixth time of flight, the seventh time of flight, or the eighth time of flight, an additional object in contact with the surface; and determining the location of the object and a location of the additional object based on the first time of flight, the second time of flight, the third time of flight, the fourth time of flight, the fifth time of flight, the sixth time of flight, the seventh time of flight, and the eighth time of flight. Some examples of the disclosure are directed to a non-transitory computer-readable medium including instructions, which when executed by a device comprising a surface, a plurality of ultrasonic transceivers coupled to edges of the surface, and one or more processors, can cause the one or more processors to perform any of the above methods.

Some examples of the disclosure are directed to an acoustic sensing system. The acoustic sensing system can comprise: a surface; a plurality of ultrasonic transducers coupled to the surface, the plurality of ultrasonic transducers configured to generate and/or receive a plurality ultrasonic waves; and a processor coupled to the plurality of ultrasonic transducers and configured to determine a location of an object contacting the surface based on one or more received ultrasonic waves of the plurality of ultrasonic waves.

Some examples of the disclosure are directed to an acoustic touch sensing system. The acoustic touch sensing system can comprise: an acoustic touch sensing circuit configured to perform a first detection scan of a surface and configured to perform a second detection scan of the surface; and one or more processors coupled to the acoustic touch sensing circuit. At least one of the acoustic touch sensing circuit or the one or more processors can be capable of processing results of the first detection scan or results of the second detection scan. The results of the first detection scan can indicate a presence of an object touching the surface. The results of the second detection scan can indicate a location of the object touching the surface. Additionally or alternatively, in some examples, the one or more processors can comprise a host processor and an auxiliary processor. Additionally or alternatively, in some examples, the auxiliary processor can be configured to receive the results of the first detection scan and the results of the second detection scan. The auxiliary processor can be capable of: processing the results of the first detection scan to determine the presence of the object touching the surface; and processing the results of the second detection scan to determine the location of the object touching the surface. Additionally or alternatively, in some examples, the acoustic touch sensing circuit can be configured to average digital outputs of the first detection scan to generate the results of the first detection scan. Additionally or alternatively, in some examples, the acoustic touch sensing circuit can be configured to average digital outputs of the second detection scan to generate the results of the second detection scan. Additionally or alternatively, in some examples, the auxiliary processor can be configured to receive the results of the first detection scan and the host processor can be configured to receive the results of the second detection scan. The auxiliary processor can be capable of processing the results of the first detection scan to determine the presence of the object touching the surface. The host processor can be capable of processing the results of the second detection scan to determine the location of the object touching the surface. Additionally or alternatively, in some examples, the results of the first detection scan can be transferred to the auxiliary processor by a first communication channel and the results of the second detection scan can be transferred to the host processor by a second communication channel. The second communication channel can have a bandwidth greater than the first communication channel. Additionally or alternatively, in some examples, the acoustic touch sensing system can further comprise: an acoustic touch sensing digital signal processor configured to receive the results of the second detection scan. The acoustic touch sensing digital signal processor can be capable of processing results of the second detection scan to determine the location of the object touching the surface. Additionally or alternatively, in some examples, the acoustic touch sensing circuit can be capable of processing the results of the first detection scan and the results of the second detection scan to determine the presence and the location of the object touching the surface. Additionally or alternatively, in some examples, the acoustic touch sensing system can further comprise: a plurality of transducers coupled to the surface; and routing deposited along a side of the surface adjacent to the plurality of transducers. The acoustic touch sensing circuit can be coupled to the plurality of transducers via coupling of the acoustic touch sensing circuit to the routing on the routing deposited along the side of the surface. Additionally or alternatively, in some examples, the acoustic touch sensing system can further comprise: a plurality of transducers coupled to the surface. The acoustic touch sensing circuit can be coupled to the plurality of transducers via direct bonding between the plurality of transducers and the acoustic touch sensing circuit, via bonding between the plurality of transducers and a flexible circuit board coupled to the acoustic touch sensor circuit, or via bonding between the plurality of transducers and a rigid circuit board coupled to the acoustic touch sensor circuit. Additionally or alternatively, in some examples, the acoustic touch sensing circuit can comprise an acoustic transmit circuit and an acoustic receive circuit. The acoustic transmit circuit can be implemented on a first integrated circuit and the acoustic receive circuit can be implemented on a second integrated circuit, separate from the first integrated circuit. Additionally or alternatively, in some examples, the acoustic touch sensing system further can comprise: a plurality of transmit transducers and a plurality of receive transducers. The acoustic touch sensing circuit can be configured to generate an acoustic stimulation signal to apply to the plurality of transmit transducers. The acoustic touch sensing circuit can be configured to receive an acoustic receive signal from the plurality of receive transducers generated in response to the acoustic stimulation signal.

Some examples of the disclosure are directed to a method. The method can comprise: performing a first acoustic detection scan of a surface; processing results of the first acoustic detection scan to determine whether an object is contacting the surface; in accordance with a determination that the object is contacting the surface, performing a second acoustic detection scan of the surface; and processing results of the second acoustic detection scan to determine a location of the object contacting the surface. Additionally or alternatively, in some examples, performing the first acoustic detection scan can comprise: transmitting an acoustic wave into the surface from a first transducer; and receiving an acoustic reflection corresponding to an edge of the surface opposite the first transducer at the first transducer. Processing the results of the first acoustic detection scan to determine whether to object is contacting the surface can comprise: determining that the object is contacting the surface when the received acoustic reflection corresponding to the edge of the surface is attenuated more than a threshold amount below a baseline received acoustic reflection corresponding to the edge of the surface. Additionally or alternatively, in some examples, performing the first acoustic detection scan can comprise: transmitting an acoustic wave into the surface from a first transducer; and receiving the acoustic wave at a second transducer opposite the first transducer. Processing the results of the first acoustic detection scan to determine whether to object is contacting the surface can comprise: determining that the object is contacting the surface when the received acoustic wave is attenuated more than a threshold amount below a baseline received acoustic wave. Additionally or alternatively, in some examples, performing the second acoustic detection scan can comprise: transmitting, by a first transducer of a plurality of transducers, a first acoustic wave in the surface; receiving, by the first transducer of the plurality of transducers, a first acoustic reflection in the surface; transmitting, by a second transducer of the plurality of transducers, a second acoustic wave in the surface; receiving, by the second transducer of the plurality of transducers, a second acoustic reflection in the surface; transmitting, by a third transducer of the plurality of transducers, a third acoustic wave in the surface; receiving, by the third transducer of the plurality of transducers, a third acoustic reflection in the surface; transmitting, by a fourth transducer of the plurality of transducers, a fourth acoustic wave in the surface; and receiving, by the fourth transducer of the plurality of transducers, a fourth acoustic reflection in the surface. Additionally or alternatively, in some examples, processing the results of the second acoustic detection scan to determine the location of the object contacting the surface further can comprise: determining a first time of flight between the transmitted first acoustic wave and the received first acoustic reflection; determining a second time of flight between the transmitted second acoustic wave and the received second acoustic reflection; determining a third time of flight between the transmitted third acoustic wave and the received third acoustic reflection; determining a fourth time of flight between the transmitted fourth acoustic wave and the received fourth acoustic reflection; and determining the location of the object based on the first time of flight, the second time of flight, the third time of flight, and the fourth time of flight. Additionally or alternatively, in some examples, performing the first acoustic detection scan can comprise: transmitting an acoustic wave into the surface from a first transducer on a first side of the surface; and receiving an acoustic reflection corresponding to an edge of the surface opposite the first transducer at a second transducer on the first side of the surface. Processing the results of the first acoustic detection scan to determine whether to object is contacting the surface can comprise: determining that the object is contacting the surface when the received acoustic reflection corresponding to the edge of the surface is attenuated more than a threshold amount below a baseline received acoustic reflection corresponding to the edge of the surface. Additionally or alternatively, in some examples, performing the second acoustic detection scan can comprise: transmitting, by a first transmit transducer of a plurality of transducers, a first acoustic wave in the surface; receiving, by a first receive transducer of the plurality of transducers, a first acoustic reflection in the surface, the first receive transducer collocated with the first transmit transducer; transmitting, by a second transmit transducer of the plurality of transducers, a second acoustic wave in the surface; receiving, by a second receive transducer of the plurality of transducers, a second acoustic reflection in the surface, the second receive transducer collocated with the second transmit transducer; transmitting, by a third transmit transducer of the plurality of transducers, a third acoustic wave in the surface; receiving, by a third receive transducer of the plurality of transducers, a third acoustic reflection in the surface, the third receive transducer collocated with the third transmit transducer; transmitting, by a fourth transmit transducer of the plurality of transducers, a fourth acoustic wave in the surface; and receiving, by a fourth receive transducer of the plurality of transducers, a fourth acoustic reflection in the surface, the fourth receive transducer collocated with the fourth transmit transducer. Additionally or alternatively, in some examples, processing the results of the second acoustic detection scan to determine the location of the object contacting the surface further can comprise: determining a first time of flight between the transmitted first acoustic wave and the received first acoustic reflection; determining a second time of flight between the transmitted second acoustic wave and the received second acoustic reflection; determining a third time of flight between the transmitted third acoustic wave and the received third acoustic reflection; determining a fourth time of flight between the transmitted fourth acoustic wave and the received fourth acoustic reflection; and determining the location of the object based on the first time of flight, the second time of flight, the third time of flight, and the fourth time of flight.

Some examples of the disclosure are directed to a non-transitory computer readable storage medium. The non-transitory computer readable storage medium can store instructions, which when executed by a device comprising a surface, a plurality of acoustic transducers coupled to edges of the surface, an acoustic touch sensing circuit, and one or more processors, can cause the acoustic touch sensing circuit and the one or more processors to: in a first state: perform a first acoustic detection scan of the surface; and process results of the first acoustic detection scan to determine whether an object is contacting the surface; and in a second state: perform a second acoustic detection scan of the surface; and process results of the second acoustic detection scan to determine a location of the object contacting the surface. Additionally or alternatively, in some examples, the non-transitory computer readable storage medium can further comprise instructions, which executed by the device, cause the acoustic touch sensing circuit to transition from the first state to the second state when the object is determined to be contacting the surface based on processing the results of the first acoustic detection scan. Additionally or alternatively, in some examples, the non-transitory computer readable storage medium can further comprise instructions, which executed by the device, cause the acoustic touch sensing circuit to transition from the second state to the first state when no object is determined to be contacting the surface based on processing the results of the second acoustic detection scan for a threshold period of time or in response to receiving user input to power down a display of the device. Additionally or alternatively, in some examples, the first acoustic detection scan and the second acoustic detection scan can be performed by the acoustic touch sensing circuit. Additionally or alternatively, in some examples, processing the results of the first acoustic detection scan can be performed by a first processor of the one or more processors and processing the results of the second acoustic detection scan can be performed by a second processor of the one or more processors.

Some examples of the disclosure are directed to an acoustic touch sensing system. The acoustic touch sensing system can comprise: an acoustic touch sensing circuit configured to perform a touch detection scan of a surface. The acoustic touch sensing circuit can be configured to generate results indicative of an object touching the surface at a first location when an input device contacts the surface at the first location and generate results indicative of no object touching the surface at a second location when a liquid contacts the surface at the second location.

Some examples of the disclosure are directed to an electronic device comprising transmit circuitry configured to provide a stimulation signal to a transducer coupled to a surface of the device, a plurality of surface discontinuities on a surface of the device located proximate to the transducer, and receiver circuitry configured to capture a received signal based on motion of the transducer. Additionally or alternatively to one or more of the examples disclosed above, in some examples, the electronic device further comprises control circuitry configured to couple the transmit circuitry to the transducer, couple the receive circuitry to the transducer, stimulate the transducer to produce an excitation in the surface of the device proximate to the transducer, capture a first reflected energy at a first time based on a distance between the transducer and a first surface discontinuity of the plurality of surface discontinuities, and capture a second reflected energy at a second time based on a distance between the transducer and a second surface discontinuity of the plurality of surface discontinuities, wherein the second distance is greater than the first distance. Additionally or alternatively to one or more of the examples disclosed above, in some examples, sampling the first reflected energy comprises integrating received energy during a first integration window interval based on a duration of the stimulation of the transducer and a distance between the transducer and the first surface discontinuity. Additionally or alternatively to one or more of the examples disclosed above, in some examples, sampling the second reflected energy comprises integrating received energy during a second integration window having a same duration as the first integration window and beginning at a time after the first integration window begins. Additionally or alternatively to one or more of the examples disclosed above, in some examples, the first integration window and the second integration window are non-overlapping.

Additionally or alternatively to one or more of the examples disclosed above, in some examples, the electronic device further comprises a filter configured to shape the stimulation signal based on a transfer function of a system formed by the transducer, the surface of the device, and the plurality of surface discontinuities on the surface of the device located proximate to the transducer. Additionally or alternatively to one or more of the examples disclosed above, in some examples, the transducer is coupled to a cover glass of the device. Additionally or alternatively to one or more of the examples disclosed above, in some examples, the cover glass comprises a transparent display region and a non-transparent border region, the transducer being coupled to the non-transparent border region. Additionally or alternatively to one or more of the examples disclosed above, in some examples, the transducer is coupled to a metal housing of the device.

Additionally or alternatively to one or more of the examples disclosed above, in some examples, the electronic device further comprises a processor capable of determining a location of contact by an object with the surface of the device based on the first reflected energy and the second reflected energy. Additionally or alternatively to one or more of the examples disclosed above, in some examples, the determination is based on a comparison between baseline values of the first reflected energy and the second energy and captured values of the first reflected energy and second reflected energy. Additionally or alternatively to one or more of the examples disclosed above, in some examples, a determination that a difference between the first baseline value of the first reflected energy and the captured value of the first reflected energy exceeds a threshold difference corresponds to a contact by the object between the transducer and the first surface discontinuity of the plurality of surface discontinuities.

Additionally or alternatively to one or more of the examples disclosed above, in some examples, the electronic device further comprises a second transducer coupled to the surface of the device; a second plurality of surface discontinuities on the surface of the device located proximate to the second transducer wherein the control circuitry is further configured to decouple the transmit circuitry from the transducer, couple the transmit circuitry to the second transducer, decouple the receive circuitry from the transducer, couple the receive circuitry to the second transducer, stimulate the second transducer to produce an excitation in the surface of the device proximate to the second transducer, capture a third reflected energy at a third time based on a distance between the transducer and a third surface discontinuity of the second plurality of surface discontinuities, and capture a fourth reflected energy at a fourth time based on a distance between the transducer and a fourth surface discontinuity of the second plurality of surface discontinuities. Additionally or alternatively to one or more of the examples disclosed above, in some examples, the electronic device further comprises a demultiplexer for selectively coupling and uncoupling the transmit circuitry from the transducer; and a multiplexer for selectively coupling and decoupling the receive circuitry from the transducer. Additionally or alternatively to one or more of the examples disclosed above, in some examples, the demultiplexer connects non-selected transducers to ground.

Some examples of the disclosure are directed to an electronic device comprising a motion detector, an antenna element, an acoustic touch sensor capable of detecting whether an object is contacting a surface of the electronic device proximate to the antenna element, and control circuitry configured to determine whether the electronic device is moving, determine whether the object is contacting the surface of the electronic device proximate to the antenna element, in accordance with a determination that the electronic device is not moving, operate the antenna element at a nominal power level, and in accordance with a determination that the electronic device is moving and that the object is contacting the surface of the electronic device proximate to the antenna element, operate the antenna element at a reduced power level, lower than the nominal power level. Additionally or alternatively to one or more of the examples disclosed above, in some examples, the control circuitry is further configured to, in accordance with a determination that the electronic device is moving and that the object is not contacting the surface of the electronic device proximate to the antenna element, operate the antenna element at the nominal power level. Additionally or alternatively to one or more of the examples disclosed above, in some examples, determining whether the electronic device is moving comprises determining whether motion detected by the motion detector is consistent with motion of a human body. Additionally or alternatively to one or more of the examples disclosed above, in some examples, the acoustic touch sensor comprises an ultrasonic transducer, and a plurality of reflective barriers on a surface of the electronic device, proximate to the antenna element, wherein the ultrasonic transducer transmits an acoustic wave toward the plurality of reflective barriers, and receives reflected signals from the barriers.

Some examples of the disclosure are directed to a method comprising, determining whether an electronic device is moving, determining whether an object is contacting a surface of the electronic device proximate to an antenna element, in accordance with a determination that the electronic device is not moving, operating the antenna element at a nominal power level, and in accordance with a determination that the electronic device is moving and that the object is contacting the surface of the electronic device proximate to the antenna element, operating the antenna element at a reduced power level, lower than the nominal power level. Additionally or alternatively to one or more of the examples disclosed above, in some examples, in accordance with a determination that the electronic device is moving and that the object is not contacting the surface of the electronic device proximate to the antenna element, operating the antenna element at the nominal power level. Additionally or alternatively to one or more of the examples disclosed above, in some examples, determining whether the electronic device is moving comprises determining whether motion detected by the motion detector is consistent with motion of a human body.

Some examples of the disclosure are directed to an electronic device comprising a configurable antenna element, an acoustic touch sensor capable of detecting whether an object is contacting a surface of the electronic device proximate to the configurable antenna element, and in accordance with a determination that the object is contacting the surface of the electronic device proximate to the configurable antenna element, adjusting a parameter of the configurable antenna element to compensate for presence of the object. Additionally or alternatively to one or more of the examples disclosed above, in some examples, the acoustic touch sensor is configured to detect contact directly in a transmission path of the configurable antenna element. Additionally or alternatively to one or more of the examples disclosed above, in some examples, the acoustic touch sensor is capable of detecting whether an object is contacting a portion of the surface of the electronic device within a metal exclusion zone of the surface of the device. Additionally or alternatively to one or more of the examples disclosed above, in some examples, the metal exclusion zone corresponds to a location of the configurable antenna element within the electronic device. Additionally or alternatively to one or more of the examples disclosed above, in some examples, the acoustic touch sensor comprises an ultrasonic transducer and a plurality of reflective barriers on a surface of the electronic device, proximate to the antenna element, wherein the ultrasonic transducer transmits an acoustic wave toward the plurality of reflective barriers, and receives reflected signals from the barriers. Additionally or alternatively to one or more of the examples disclosed above, in some examples, a first reflective barrier of the plurality of reflective barriers exhibits an anisotropic reflectance characteristic that depends upon a direction of travel of an acoustic wave encountering the first reflective barrier.

Some examples of the disclosure are directed to an electronic device comprising: a plurality of acoustic touch sensors capable of detecting whether an object is contacting a specified portion of a surface of the electronic device, wherein a first acoustic touch sensor of the plurality of acoustic touch sensors comprises: a transducer coupled to a first side of the surface and configured to detect an object contacting a second opposing side of the surface. Additionally or alternatively to one or more of the examples disclosed above, in some examples, the transmitted acoustic energy is a compressive wave transmitted from the first side toward the direction of the opposing first side of the surface. Additionally or alternatively to one or more of the examples disclosed above, in some examples, the acoustic touch sensor is configured to transmit acoustic energy through the surface toward the second opposing side of the surface, and the acoustic touch sensor is capable of detecting whether the object is contacting the second opposing side directly across from the acoustic touch sensor. Additionally or alternatively to one or more of the examples disclosed above, in some examples, the acoustic touch sensor is configured to transmit acoustic along the first side of the surface, and the acoustic touch sensor is capable of detecting whether the object is contacting a second side of the surface in a location that is not directly across from the acoustic touch sensor. Additionally or alternatively to one or more of the examples disclosed above, in some examples, the transmitted acoustic energy is a shear horizontal wave. Additionally or alternatively to one or more of the examples disclosed above, in some examples, a portion of the surface is curved relative to the direction of motion of the transmitted acoustic energy, and the acoustic touch sensor is capable of detecting contact by an object on the curved portion of the surface.

Some examples of the disclosure are directed to a method comprising: transmitting acoustic energy from a transducer along a surface of an electronic device, and comparing received reflected energy to a baseline measurement to determine a presence and a location of an object contacting the surface, wherein the baseline measurement is a measurement of reflected acoustic energy from surface discontinuities at different positions along the surface of the electronic device.

Some examples of the disclosure are directed to an electronic device comprising: an antenna element, an acoustic touch sensor capable of detecting whether an object is contacting a surface of the electronic device proximate to the antenna element, and control circuitry configured to: in accordance with a determination that an object is contacting the surface of the electronic device proximate to the antenna element, adjusting a parameter of the antenna operation to compensate for the contacting object. Additionally or alternatively to one or more of the examples disclosed above, in some examples, adjusting the parameter of the antenna operation comprises adjusting an antenna loop length for the antenna element. Additionally or alternatively to one or more of the examples disclosed above, in some examples, adjusting the parameter of the antenna operation comprises adjusting a value of a variable load element. Additionally or alternatively to one or more of the examples disclosed above, in some examples, the variable load element is a variable capacitor. Additionally or alternatively to one or more of the examples disclosed above, in some examples, the acoustic touch sensor is coupled to a first side of the surface, the acoustic touch sensor is configured to transmit acoustic energy through the surface toward a second opposing side of the surface, and the acoustic touch sensor is capable of detecting whether the object is contacting the second opposing side directly across from the acoustic touch sensor.

Some examples of the disclosure are directed to an electronic device comprising: a housing, a plurality of acoustic transducers coupled to a surface of the housing, sense circuitry coupled to the plurality of acoustic transducers and configured to detect acoustic energy received by the plurality of acoustic transducers, an orientation sensor for detecting a rotational orientation of the electronic device, and a processor configured to: detect the rotational orientation of the electronic device, display an application on a display of the electronic device based on the orientation of the device, associate a first acoustic transducer of the plurality of acoustic transducers with a first input to the application in a first orientation, based on a change in the rotational orientation of the device, dissociate the first acoustic transducer from the first input to the application, and associate a second acoustic transducer of the plurality of acoustic transducers, different from the first acoustic transducer with the first input to the application in a second rotational orientation of the electronic device. Additionally or alternatively to one or more of the examples disclosed above, in some examples, the first acoustic transducer is associated with a second input to the application in the second orientation.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An acoustic sensing system, comprising:
   a surface;
   a plurality of ultrasonic transducers coupled to edges of the surface, wherein the plurality of ultrasonic transducers includes a first transducer coupled along a first edge of the surface, a second transducer coupled along a second edge of the surface, a third transducer coupled along a third edge of the surface and a fourth transducer coupled along a fourth edge of the surface, wherein the first edge, the second edge, the third edge, and the fourth edge are different edges of the surface, and wherein the plurality of ultrasonic transducers define an active detection region based on a position and dimensions of the ultrasonic transducers; and
   a processor coupled to the plurality of ultrasonic transducers and configured to:
      determine a first time of flight between a first ultrasonic wave generated by the first transducer of the plurality of transducers and a first reflection received at the first transducer;
      determine a second time of flight between a second ultrasonic wave generated by the second transducer of the plurality of transducers and a second reflection received at the second transducer;
      determine a third time of flight between a third ultrasonic wave generated by the third transducer of the plurality of transducers and a third reflection received at the third transducer;
      determine a fourth time of flight between a fourth ultrasonic wave generated by the fourth transducer of the plurality of transducers and a fourth reflection received at the fourth transducer;
      detect, based on the first time of flight, the second time of flight, the third time of flight, or the fourth time of flight, a first object in contact with the surface; and
      determine a location of the first object based on the first time of flight, the second time of flight, the third time of flight, and the fourth time of flight.

2. The acoustic sensing system of claim 1, the processor further configured to:
   determine a first location of a first edge of the first object based on the first time of flight, a second location of a second edge of the first object based on the second time of flight, a third location of a third edge of the first object based on the third time of flight, and a fourth location of a fourth edge of the first object based on the fourth time of flight; and
   determine the location of the first object based on the first location of the first edge, the second location of second edge, the third location of the third edge, and the fourth location of the fourth edge.

3. The acoustic sensing system of claim 2, wherein determining the location of the first object comprises determining a centroid based on a bounding box formed by the first edge, the second edge, the third edge, and the fourth edge.

4. The acoustic sensing system of claim 1, the processor further configured to:
   determine a fifth time of flight between the first ultrasonic wave generated by the first transducer of the plurality of transducers and a fifth reflection received at the first transducer;
   determine a sixth time of flight between the second ultrasonic wave generated by the second transducer of the plurality of transducers and a sixth reflection received at the second transducer;
   determine a seventh time of flight between the third ultrasonic wave generated by the third transducer of the plurality of transducers and a seventh reflection received at the third transducer;
   determine an eighth time of flight between the fourth ultrasonic wave generated by the fourth transducer of the plurality of transducers and an eighth reflection received at the fourth transducer;
   detect, based on at least one of the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and
   determine a location of the second object based on the location of the first object and based on the fifth time of flight, the sixth time of flight, the seventh time of flight, and the eighth time of flight.

5. The acoustic sensing system of claim 1, wherein the plurality of ultrasonic transducers includes a fifth transducer coupled along the first edge of the surface, a sixth transducer coupled along the second edge of the surface, a seventh transducer coupled along the third edge of the surface, and an eighth transducer coupled along the fourth edge of the surface; and
   wherein the processor further configured to:
      determine a fifth time of flight between a fifth ultrasonic wave generated by the fifth transducer of the plurality of transducers and a fifth reflection received at the fifth transducer;
      determine a sixth time of flight between a sixth ultrasonic wave generated by the sixth transducer of the plurality of transducers and a sixth reflection received at the sixth transducer;

determine a seventh time of flight between a seventh ultrasonic wave generated by the seventh transducer of the plurality of transducers and a seventh reflection received at the seventh transducer;

determine an eighth time of flight between an eighth ultrasonic wave generated by the eighth transducer of the plurality of transducers and an eighth reflection received at the eighth transducer;

detect, based on the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and determine the location of the first object and a location of the second object based on the first time of flight, the second time of flight, the third time of flight, the fourth time of flight, the fifth time of flight, the sixth time of flight, the seventh time of flight, and the eighth time of flight.

6. The acoustic sensing system of claim 1, wherein the first edge is perpendicular to the second edge.

7. The acoustic sensing system of claim 1, wherein at least two of the plurality of transducers are mounted on at least one edge of the surface.

8. The acoustic sensing system of claim 1, wherein the surface is a display screen.

9. A method of sensing for an acoustic sensing system comprising a surface and a plurality of ultrasonic transducers coupled to edges of the surface, wherein the plurality of ultrasonic transducers includes a first transducer coupled along a first edge of the surface, a second transducer coupled along a second edge of the surface, a third transducer coupled along a third edge of the surface and a fourth transducer coupled along a fourth edge of the surface, wherein the first edge, the second edge, the third edge, and the fourth edge are different edges of the surface, and wherein the plurality of ultrasonic transducers define an active detection region based on a position and dimensions of the ultrasonic transducers, the method comprising:

determining a first time of flight between a first ultrasonic wave generated by the first transducer of the plurality of transducers and a first reflection received at the first transducer;

determining a second time of flight between a second ultrasonic wave generated by the second transducer of the plurality of transducers and a second reflection received at the second transducer;

determining a third time of flight between a third ultrasonic wave generated by the third transducer of the plurality of transducers and a third reflection received at the third transducer;

determining a fourth time of flight between a fourth ultrasonic wave generated by the fourth transducer of the plurality of transducers and a fourth reflection received at the fourth transducer;

detecting, based on the first time of flight, the second time of flight, the third time of flight, or the fourth time of flight, a first object in contact with the surface; and determining a location of the first object based on the first time of flight and the second time of flight, the third time of flight, and the fourth time of flight.

10. The method of claim 9, further comprising:

determining a first location of a first edge of the first object based on the first time of flight, a second location of a second edge of the first object based on the second time of flight, a third location of a third edge of the first object based on the third time of flight, and a fourth location of a fourth edge of the first object based on the fourth time of flight; and determining the location of the first object based on the first location of the first edge, the second location of second edge, the third location of the third edge, and the fourth location of the fourth edge.

11. The method of claim 10, wherein determining the location of the first object comprises determining a centroid based on a bounding box formed by the first edge, the second edge, the third edge, and the fourth edge.

12. The method of claim 9, further comprising:

determining a fifth time of flight between the first ultrasonic wave generated by the first transducer of the plurality of transducers and a fifth reflection received at the first transducer;

determining a sixth time of flight between the second ultrasonic wave generated by the second transducer of the plurality of transducers and a sixth reflection received at the second transducer;

determining a seventh time of flight between the third ultrasonic wave generated by the third transducer of the plurality of transducers and a seventh reflection received at the third transducer;

determining an eighth time of flight between the fourth ultrasonic wave generated by the fourth transducer of the plurality of transducers and an eighth reflection received at the fourth transducer;

detecting, based on at least one of the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and determining a location of the second object based on the location of the first object and based on the fifth time of flight, the sixth time of flight, the seventh time of flight, and the eighth time of flight.

13. The method of claim 9, wherein the plurality of ultrasonic transducers includes a fifth transducer coupled along the first edge of the surface, a sixth transducer coupled along the second edge of the surface, a seventh transducer coupled along the third edge of the surface, and an eighth transducer coupled along the fourth edge of the surface; and wherein the method further comprising:

determining a fifth time of flight between a fifth ultrasonic wave generated by the fifth transducer of the plurality of transducers and a fifth reflection received at the fifth transducer;

determining a sixth time of flight between a sixth ultrasonic wave generated by the sixth transducer of the plurality of transducers and a sixth reflection received at the sixth transducer;

determining a seventh time of flight between a seventh ultrasonic wave generated by the seventh transducer of the plurality of transducers and a seventh reflection received at the seventh transducer;

determining an eighth time of flight between an eighth ultrasonic wave generated by the eighth transducer of the plurality of transducers and an eighth reflection received at the eighth transducer;

detecting, based on the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and determining the location of the first object and a location of the second object based on the first time of flight, the second time of flight, the third time of flight, the fourth time of flight, the fifth time of flight, the sixth time of flight, the seventh time of flight, and the eighth time of flight.

14. A non-transitory computer readable storage medium storing instructions, which when executed by a device comprising a surface, a plurality of ultrasonic transducers coupled to edges of the surface, wherein the plurality of ultrasonic transducers includes a first transducer coupled along a first edge of the surface, a second transducer coupled along a second edge of the surface, a third transducer coupled along a third edge of the surface and a fourth transducer coupled along a fourth edge of the surface, wherein the first edge, the second edge, the third edge, and the fourth edge are different edges of the surface, and wherein the plurality of ultrasonic transducers define an active detection region based on a position and dimensions of the ultrasonic transducers, and one or more processors, cause the one or more processors to perform a method comprising:

determining a first time of flight between a first ultrasonic wave generated by the first transducer of the plurality of transducers and a first reflection received at the first transducer;

determining a second time of flight between a second ultrasonic wave generated by the second transducer of the plurality of transducers and a second reflection received at the second transducer;

determining a third time of flight between a third ultrasonic wave generated by the third transducer of the plurality of transducers and a third reflection received at the third transducer;

determining a fourth time of flight between a fourth ultrasonic wave generated by the fourth transducer of the plurality of transducers and a fourth reflection received at the fourth transducer;

detecting, based on the first time of flight, the second time of flight, the third time of flight, or the fourth time of flight, a first object in contact with the surface; and determining a location of the first object based on the first time of flight and the second time of flight, the third time of flight, and the fourth time of flight.

15. The non-transitory computer readable storage medium of claim 14, the method further comprising:

determining a first location of a first edge of the first object based on the first time of flight, a second location of a second edge of the first object based on the second time of flight, a third location of a third edge of the first object based on the third time of flight, and a fourth location of a fourth edge of the first object based on the fourth time of flight; and determining the location of the first object based on the first location of the first edge, the second location of second edge, the third location of the third edge, and the fourth location of the fourth edge.

16. The non-transitory computer readable storage medium of claim 15, wherein determining the location of the first object comprises determining a centroid based on a bounding box formed by the first edge, the second edge, the third edge, and the fourth edge.

17. The non-transitory computer readable storage medium of claim 14, the method further comprising:

determining a fifth time of flight between the first ultrasonic wave generated by the first transducer of the plurality of transducers and a fifth reflection received at the first transducer;

determining a sixth time of flight between the second ultrasonic wave generated by the second transducer of the plurality of transducers and a sixth reflection received at the second transducer;

determining a seventh time of flight between the third ultrasonic wave generated by the third transducer of the plurality of transducers and a seventh reflection received at the third transducer;

determining an eighth time of flight between the fourth ultrasonic wave generated by the fourth transducer of the plurality of transducers and an eighth reflection received at the fourth transducer;

detecting, based on at least one of the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and determining a location of the second object based on the location of the first object and based on the fifth time of flight, the sixth time of flight, the seventh time of flight, and the eighth time of flight.

18. The non-transitory computer readable storage medium of claim 14, wherein the plurality of ultrasonic transducers includes a fifth transducer coupled along the first edge of the surface, a sixth transducer coupled along the second edge of the surface, a seventh transducer coupled along the third edge of the surface, and an eighth transducer coupled along the fourth edge of the surface; and wherein the method further comprising:

determining a fifth time of flight between a fifth ultrasonic wave generated by the fifth transducer of the plurality of transducers and a fifth reflection received at the fifth transducer;

determining a sixth time of flight between a sixth ultrasonic wave generated by the sixth transducer of the plurality of transducers and a sixth reflection received at the sixth transducer;

determining a seventh time of flight between a seventh ultrasonic wave generated by the seventh transducer of the plurality of transducers and a seventh reflection received at the seventh transducer;

determining an eighth time of flight between an eighth ultrasonic wave generated by the eighth transducer of the plurality of transducers and an eighth reflection received at the eighth transducer;

detecting, based on the first time of flight, the second time of flight, the third time of flight, the fourth time of flight, the fifth time of flight, the sixth time of flight, the seventh time of flight, or the eighth time of flight, the first object in contact with the surface and a second object, different from the first object, in contact with the surface; and determining the location of the first object and a location of the second object based on the first time of flight, the second time of flight, the third time of flight, the fourth time of flight, the fifth time of flight, the sixth time of flight, the seventh time of flight, and the eighth time of flight.

\* \* \* \* \*